United States Patent
McAtee et al.

(10) Patent No.: US 12,050,771 B2
(45) Date of Patent: Jul. 30, 2024

(54) WATCH THEATER MODE

(71) Applicant: Apple Inc., Cupertino, CA (US)

(72) Inventors: Kevin Tyler McAtee, San Francisco, CA (US); Baboo Gowreesunker, Mountain View, CA (US); Michael J. Lamb, San Jose, CA (US); Brent W. Schorsch, San Jose, CA (US); Kevin Lynch, Woodside, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/697,749

(22) Filed: Mar. 17, 2022

(65) Prior Publication Data

US 2022/0206681 A1   Jun. 30, 2022

Related U.S. Application Data

(63) Continuation of application No. 15/713,544, filed on Sep. 22, 2017, now Pat. No. 11,307,757.

(Continued)

(51) Int. Cl.
| | |
|---|---|
| *G06F 3/04883* | (2022.01) |
| *G06F 1/16* | (2006.01) |
| *G06F 1/3203* | (2019.01) |
| *G06F 1/3234* | (2019.01) |
| *G08B 3/10* | (2006.01) |
| *G08B 5/36* | (2006.01) |

(Continued)

(52) U.S. Cl.
CPC .......... *G06F 3/04883* (2013.01); *G06F 1/163* (2013.01); *G06F 1/1694* (2013.01); *G06F 1/3203* (2013.01); *G06F 1/3265* (2013.01); *G08B 3/10* (2013.01); *G08B 5/36* (2013.01); *G08B 25/08* (2013.01); *G06F 2200/1637* (2013.01); *G09G 5/10* (2013.01); *G09G 2320/0626* (2013.01); *G09G 2330/022* (2013.01)

(58) Field of Classification Search
CPC ........ G06F 3/04883; G06F 3/017; G06F 3/02; G06F 1/1694; G06F 1/3265; G06F 1/3203; G06F 1/3234; G06F 1/163; G08B 3/10; G08B 25/08; G08B 5/36; G09G 5/10; G09G 2330/022; G09G 2320/0626
USPC ........................................ 345/173, 158, 184
See application file for complete search history.

(56) References Cited

U.S. PATENT DOCUMENTS

| | | |
|---|---|---|
| 6,353,449 B1 | 3/2002 | Gregg et al. |
| 6,683,653 B1 | 1/2004 | Miyake et al. |

(Continued)

FOREIGN PATENT DOCUMENTS

| | | |
|---|---|---|
| CA | 2986980 A1 | 5/2019 |
| CN | 1870796 A | 11/2006 |

(Continued)

OTHER PUBLICATIONS

English Translation for CN104978904A, 20190117, pp. 1-3 (Year: 2019).*

(Continued)

*Primary Examiner* — Jimmy H Nguyen
(74) *Attorney, Agent, or Firm* — DLA Piper LLP (US)

(57) ABSTRACT

The present disclosure generally relates to receiving a user input corresponding to a rotation of a rotatable input mechanism and in accordance with the user input, adjusting a brightness level of a display screen during a brightening configuration session.

45 Claims, 31 Drawing Sheets

Related U.S. Application Data

(60) Provisional application No. 62/445,028, filed on Jan. 11, 2017, provisional application No. 62/441,274, filed on Dec. 31, 2016, provisional application No. 62/399,314, filed on Sep. 23, 2016.

(51) Int. Cl.
  *G08B 25/08* (2006.01)
  *G09G 5/10* (2006.01)

(56) References Cited

U.S. PATENT DOCUMENTS

| | | |
|---|---|---|
| 6,806,893 B1 | 10/2004 | Kolawa et al. |
| 6,982,695 B1 | 1/2006 | Canova et al. |
| 7,036,025 B2 | 4/2006 | Hunter |
| 7,113,809 B2 | 9/2006 | Noesgaard et al. |
| 8,041,968 B2 | 10/2011 | Tupman |
| 8,046,617 B2 | 10/2011 | Fleck et al. |
| 8,238,876 B2 | 8/2012 | Teng et al. |
| 8,245,143 B2 | 8/2012 | Yach et al. |
| 8,635,475 B2 | 1/2014 | Lin et al. |
| 8,725,842 B2 | 5/2014 | Al-Nasser |
| 8,775,844 B1 | 7/2014 | Peterson |
| 8,847,903 B2 | 9/2014 | Stokes et al. |
| 8,854,925 B1 | 10/2014 | Lee et al. |
| 9,152,211 B2 | 10/2015 | Gunn et al. |
| 9,152,212 B2 | 10/2015 | Gunn |
| 9,197,738 B2 | 11/2015 | Peev et al. |
| 9,436,269 B2 | 9/2016 | Yang |
| 9,557,806 B2 | 1/2017 | Väyrynen |
| 9,568,891 B2 | 2/2017 | Adams et al. |
| 9,609,230 B1 | 3/2017 | Bakshi et al. |
| 9,625,987 B1 | 4/2017 | Lapenna et al. |
| 9,635,255 B1 | 4/2017 | Baldwin |
| 9,651,922 B2 | 5/2017 | Hysek et al. |
| 9,756,172 B2 | 9/2017 | Piemonte et al. |
| 9,939,872 B2 | 4/2018 | Graham et al. |
| 10,183,622 B2 | 1/2019 | Taguchi et al. |
| 10,275,148 B2 | 4/2019 | Matas et al. |
| 10,317,977 B2 | 6/2019 | Yang |
| 10,459,887 B1 | 10/2019 | Dvortsov et al. |
| 10,649,644 B2 | 5/2020 | Ma |
| 10,852,905 B1 | 12/2020 | Guzman et al. |
| 10,878,782 B1 | 12/2020 | Guzman et al. |
| 10,908,559 B1 | 2/2021 | Guzman et al. |
| 10,936,345 B1 | 3/2021 | Guzman et al. |
| 11,435,887 B1 | 9/2022 | Mirho et al. |
| 2003/0169306 A1 | 9/2003 | Makipaa et al. |
| 2005/0052446 A1 | 3/2005 | Plut |
| 2005/0124389 A1 | 6/2005 | Yang |
| 2005/0168566 A1 | 8/2005 | Tada et al. |
| 2005/0272462 A1 | 12/2005 | Okamoto |
| 2006/0087502 A1 | 4/2006 | Karidis et al. |
| 2006/0128419 A1 | 6/2006 | Shimizu et al. |
| 2007/0146344 A1 | 6/2007 | Martin et al. |
| 2008/0005599 A1 | 1/2008 | Theocharous et al. |
| 2008/0143729 A1 | 6/2008 | Wyatt et al. |
| 2008/0167834 A1 | 7/2008 | Herz et al. |
| 2008/0168402 A1 | 7/2008 | Blumenberg |
| 2008/0174606 A1 | 7/2008 | Rengarajan et al. |
| 2008/0195961 A1 | 8/2008 | Bae et al. |
| 2008/0224988 A1 | 9/2008 | Whang |
| 2009/0066533 A1 | 3/2009 | Park et al. |
| 2009/0195497 A1 | 8/2009 | Fitzgerald et al. |
| 2009/0249247 A1 | 10/2009 | Tseng et al. |
| 2009/0284389 A1 | 11/2009 | Klassen et al. |
| 2009/0315834 A1 | 12/2009 | Nurmi et al. |
| 2010/0088597 A1 | 4/2010 | Shin et al. |
| 2010/0100841 A1 | 4/2010 | Shin et al. |
| 2010/0146437 A1 | 6/2010 | Woodcock et al. |
| 2010/0146463 A1 | 6/2010 | Cho et al. |
| 2010/0157742 A1 | 6/2010 | Relyea et al. |
| 2011/0003616 A1 | 1/2011 | Gorsica et al. |
| 2011/0003621 A1 | 1/2011 | Atsumi |
| 2011/0003665 A1 | 1/2011 | Burton et al. |
| 2011/0117902 A1 | 5/2011 | Chang et al. |
| 2011/0128311 A1 | 6/2011 | Wakatsuki et al. |
| 2011/0129311 A1 | 6/2011 | Itoh |
| 2011/0182151 A1 | 7/2011 | Geyer et al. |
| 2012/0013552 A1 | 1/2012 | Ahn |
| 2012/0019152 A1 | 1/2012 | Bamhoefer et al. |
| 2012/0077554 A1 | 3/2012 | Ahn et al. |
| 2012/0098639 A1 | 4/2012 | Ijäs |
| 2012/0127198 A1 | 5/2012 | Gundavarapu |
| 2012/0182226 A1 | 7/2012 | Tuli |
| 2012/0288139 A1 | 11/2012 | Singhar |
| 2012/0319984 A1 | 12/2012 | Borovsky et al. |
| 2012/0320081 A1 | 12/2012 | Kim et al. |
| 2013/0147825 A1 | 6/2013 | Martin et al. |
| 2013/0162611 A1 | 6/2013 | Lim et al. |
| 2013/0176293 A1 | 7/2013 | Pantfoerder |
| 2013/0345980 A1 | 12/2013 | Van Os et al. |
| 2014/0063049 A1 | 3/2014 | Armstrong-muntner |
| 2014/0086123 A1 | 3/2014 | Deivasigamani et al. |
| 2014/0139637 A1 | 5/2014 | Mistry et al. |
| 2014/0143737 A1 | 5/2014 | Mistry et al. |
| 2014/0155031 A1 | 6/2014 | Lee et al. |
| 2014/0189578 A1 | 7/2014 | Shuttleworth et al. |
| 2014/0192244 A1 | 7/2014 | Ishihara et al. |
| 2014/0201655 A1 | 7/2014 | Mahaffey et al. |
| 2014/0210708 A1 | 7/2014 | Simmons et al. |
| 2014/0210801 A1 | 7/2014 | Li |
| 2014/0256298 A1 | 9/2014 | Moss et al. |
| 2014/0267103 A1 | 9/2014 | Chaudhri |
| 2014/0285699 A1 | 9/2014 | Kato et al. |
| 2014/0310643 A1 | 10/2014 | Karmanenko et al. |
| 2014/0320434 A1 | 10/2014 | Pantel |
| 2014/0344820 A1 | 11/2014 | Kumar |
| 2014/0359477 A1 | 12/2014 | Chen |
| 2014/0361955 A1 | 12/2014 | Goncalves |
| 2014/0362105 A1 | 12/2014 | Kocienda et al. |
| 2015/0002735 A1 | 1/2015 | Moskovchenko |
| 2015/0061988 A1 | 3/2015 | Galu, Jr. |
| 2015/0062130 A1 | 3/2015 | Ho |
| 2015/0128042 A1 | 5/2015 | Churchill et al. |
| 2015/0185703 A1 | 7/2015 | Tanaka |
| 2015/0194137 A1 | 7/2015 | Wyatt |
| 2015/0207922 A1 | 7/2015 | Kobayashi et al. |
| 2015/0220299 A1 | 8/2015 | Kim et al. |
| 2015/0228048 A1 | 8/2015 | Heo et al. |
| 2015/0261284 A1 | 9/2015 | Lee et al. |
| 2015/0262548 A1 | 9/2015 | Lin |
| 2015/0277545 A1 | 10/2015 | Flowers et al. |
| 2015/0286285 A1 | 10/2015 | Pantelopoulos et al. |
| 2015/0286391 A1 | 10/2015 | Jacobs et al. |
| 2015/0346694 A1 | 12/2015 | Hoobler et al. |
| 2015/0346824 A1 | 12/2015 | Chen et al. |
| 2015/0365892 A1 | 12/2015 | Ma et al. |
| 2015/0379476 A1 | 12/2015 | Chaudhri et al. |
| 2016/0004345 A1 | 1/2016 | Imana |
| 2016/0018872 A1 | 1/2016 | Tu et al. |
| 2016/0034133 A1 | 2/2016 | Wilson et al. |
| 2016/0034152 A1 | 2/2016 | Wilson et al. |
| 2016/0041597 A1 | 2/2016 | Graham et al. |
| 2016/0044091 A1 | 2/2016 | Doumet |
| 2016/0049106 A1 | 2/2016 | Connell et al. |
| 2016/0058375 A1 | 3/2016 | Rothkopf |
| 2016/0062450 A1 | 3/2016 | Han et al. |
| 2016/0062589 A1 | 3/2016 | Wan et al. |
| 2016/0077718 A1 | 3/2016 | Kwon et al. |
| 2016/0098137 A1 | 4/2016 | Kim et al. |
| 2016/0134737 A1 | 5/2016 | Pulletikurty |
| 2016/0162112 A1 | 6/2016 | Lee et al. |
| 2016/0180780 A1 | 6/2016 | Chen et al. |
| 2016/0189328 A1 | 6/2016 | Vranjes et al. |
| 2016/0205167 A1 | 7/2016 | Kolam et al. |
| 2016/0205241 A1 | 7/2016 | Atsumi |
| 2016/0205244 A1 | 7/2016 | Dvortsov |
| 2016/0205267 A1 | 7/2016 | Vaughn et al. |
| 2016/0252978 A1 | 9/2016 | Yoo et al. |
| 2016/0259535 A1 | 9/2016 | Fleizach et al. |
| 2016/0313908 A1 | 10/2016 | Matas et al. |
| 2016/0342327 A1 | 11/2016 | Chi et al. |

(56) References Cited

U.S. PATENT DOCUMENTS

| | | |
|---|---|---|
| 2016/0357151 A1 | 12/2016 | Block et al. |
| 2016/0357282 A1 | 12/2016 | Block et al. |
| 2016/0357413 A1 | 12/2016 | Block et al. |
| 2017/0004798 A1 | 1/2017 | Park et al. |
| 2017/0040001 A1 | 2/2017 | Zhang et al. |
| 2017/0046024 A1 | 2/2017 | Dascola et al. |
| 2017/0061934 A1 | 3/2017 | Shin |
| 2017/0070716 A1 | 3/2017 | Kim et al. |
| 2017/0075316 A1 | 3/2017 | Berdinis et al. |
| 2017/0075563 A1 | 3/2017 | Bauer et al. |
| 2017/0109011 A1 | 4/2017 | Jiang |
| 2017/0123603 A1 | 5/2017 | Chang |
| 2017/0160898 A1 | 6/2017 | Lee et al. |
| 2017/0164292 A1 | 6/2017 | Santamaria et al. |
| 2017/0212648 A1 | 7/2017 | Choi et al. |
| 2017/0236497 A1 | 8/2017 | Huitema et al. |
| 2017/0257426 A1 | 9/2017 | Wilbur et al. |
| 2017/0277136 A1 | 9/2017 | Minami et al. |
| 2017/0322658 A1 | 11/2017 | Lee et al. |
| 2017/0325196 A1 | 11/2017 | Cho et al. |
| 2017/0357358 A1 | 12/2017 | Teutschler et al. |
| 2017/0357413 A1 | 12/2017 | Green |
| 2017/0357426 A1 | 12/2017 | Wilson et al. |
| 2017/0357427 A1 | 12/2017 | Wilson et al. |
| 2017/0357495 A1 | 12/2017 | Crane et al. |
| 2017/0358276 A1 | 12/2017 | Mese et al. |
| 2017/0371394 A1 | 12/2017 | Chan et al. |
| 2018/0011450 A1 | 1/2018 | Stackowski |
| 2018/0024619 A1 | 1/2018 | Kasuo et al. |
| 2018/0033311 A1 | 2/2018 | Berggren |
| 2018/0088733 A1 | 3/2018 | Syed et al. |
| 2018/0088797 A1 | 3/2018 | Mcatee et al. |
| 2018/0120927 A1 | 5/2018 | Ma et al. |
| 2018/0121060 A1 | 5/2018 | Jeong et al. |
| 2018/0150443 A1 | 5/2018 | Singleton |
| 2018/0174550 A1 | 6/2018 | Zhang et al. |
| 2018/0188925 A1 | 7/2018 | Na et al. |
| 2018/0261183 A1 | 9/2018 | Gou et al. |
| 2018/0275739 A1 | 9/2018 | Minami et al. |
| 2018/0336866 A1 | 11/2018 | Triverio et al. |
| 2018/0341389 A1 | 11/2018 | Kim et al. |
| 2018/0348844 A1 | 12/2018 | Lingutla et al. |
| 2018/0366068 A1 | 12/2018 | Liu et al. |
| 2018/0374429 A1 | 12/2018 | Nakamura |
| 2019/0018445 A1 | 1/2019 | Watanabe et al. |
| 2019/0069244 A1 | 2/2019 | Jeon et al. |
| 2019/0079576 A1 | 3/2019 | Liu et al. |
| 2019/0163142 A1 | 5/2019 | Chang et al. |
| 2019/0212707 A1 | 7/2019 | Minami et al. |
| 2019/0237003 A1 | 8/2019 | Cao et al. |
| 2019/0281154 A1 | 9/2019 | Choi et al. |
| 2019/0324620 A1 | 10/2019 | Gu et al. |
| 2020/0073122 A1 | 3/2020 | Rothkopf et al. |
| 2020/0242228 A1 | 7/2020 | Farraro et al. |
| 2020/0279539 A1 | 9/2020 | Triverio et al. |
| 2020/0319348 A1 | 10/2020 | Oshita et al. |
| 2020/0327862 A1 | 10/2020 | Sinha et al. |
| 2021/0149694 A1 | 5/2021 | Guzman et al. |
| 2021/0201732 A1 | 7/2021 | Ranjan et al. |
| 2022/0184309 A1 | 6/2022 | Rosinko et al. |
| 2022/0342514 A1 | 10/2022 | Chao et al. |
| 2022/0351702 A1 | 11/2022 | Triverio et al. |
| 2023/0071987 A1 | 3/2023 | Zeng et al. |
| 2023/0368750 A1 | 11/2023 | Stack et al. |

FOREIGN PATENT DOCUMENTS

| | | |
|---|---|---|
| CN | 1932590 A | 3/2007 |
| CN | 101273324 A | 9/2008 |
| CN | 100492288 C | 5/2009 |
| CN | 101432722 A | 5/2009 |
| CN | 101584124 A | 11/2009 |
| CN | 102067070 A | 5/2011 |
| CN | 102376265 A | 3/2012 |
| CN | 102681648 A | 9/2012 |
| CN | 102831404 A | 12/2012 |
| CN | 103019567 A | 4/2013 |
| CN | 103281419 A | 9/2013 |
| CN | 103294197 A | 9/2013 |
| CN | 103399661 A | 11/2013 |
| CN | 103544920 A | 1/2014 |
| CN | 103631496 A | 3/2014 |
| CN | 103853328 A | 6/2014 |
| CN | 103929662 A | 7/2014 |
| CN | 104978904 A | 10/2015 |
| CN | 105045079 A | 11/2015 |
| CN | 105204620 A | 12/2015 |
| CN | 105204931 A | 12/2015 |
| CN | 105264479 A | 1/2016 |
| CN | 105430154 A | 3/2016 |
| CN | 105516824 A | 4/2016 |
| CN | 105677179 A | 6/2016 |
| CN | 106056848 A | 10/2016 |
| CN | 106486044 A | 3/2017 |
| CN | 106598201 A | 4/2017 |
| CN | 106605201 A | 4/2017 |
| CN | 107239101 A | 10/2017 |
| CN | 107643677 A | 1/2018 |
| CN | 109313655 A | 2/2019 |
| CN | 109690445 A | 4/2019 |
| CN | 110471582 B | 10/2021 |
| EP | 1750242 A2 | 2/2007 |
| EP | 2175367 A2 | 4/2010 |
| EP | 2565602 A1 | 3/2013 |
| EP | 2449434 B1 | 3/2014 |
| EP | 2869292 A2 | 5/2015 |
| EP | 3376342 A1 | 9/2018 |
| EP | 3465408 B1 | 8/2020 |
| JP | 54-92359 A | 7/1979 |
| JP | 2002-259046 A | 9/2002 |
| JP | 2003-196593 A | 7/2003 |
| JP | 2004-251719 A | 9/2004 |
| JP | 2005-16962 A | 1/2005 |
| JP | 2006-287949 A | 10/2006 |
| JP | 2006-293340 A | 10/2006 |
| JP | 2012-531607 A | 12/2012 |
| JP | 2013-11931 A | 1/2013 |
| JP | 2016-20931 A | 2/2016 |
| JP | 2016-85364 A | 5/2016 |
| JP | 2017-531225 A | 10/2017 |
| KR | 10-2004-0107472 A | 12/2004 |
| KR | 10-2007-0025292 A | 3/2007 |
| KR | 10-0864578 B1 | 10/2008 |
| KR | 10-2010-0025846 A | 3/2010 |
| KR | 10-2010-0025853 A | 3/2010 |
| KR | 10-2014-0120470 A | 10/2014 |
| KR | 10-2015-0057307 A | 5/2015 |
| KR | 10-2015-0093090 A | 8/2015 |
| KR | 10-2016-0030832 A | 3/2016 |
| KR | 10-2016-0066813 A | 6/2016 |
| KR | 10-2016-0076957 A | 7/2016 |
| KR | 10-2018-0011581 A | 2/2018 |
| KR | 10-2018-0078355 A | 7/2018 |
| KR | 10-2019-0035800 A | 4/2019 |
| KR | 10-2019-0071285 A | 6/2019 |
| WO | 2006/131780 A1 | 12/2006 |
| WO | 2007/043222 A1 | 4/2007 |
| WO | 2007/124364 A2 | 11/2007 |
| WO | 2008/083360 A1 | 7/2008 |
| WO | 2008/085402 A1 | 7/2008 |
| WO | 2014/024366 A1 | 2/2014 |
| WO | 2014/105274 A1 | 7/2014 |
| WO | 2015/034965 A1 | 3/2015 |
| WO | 2016/022203 A1 | 2/2016 |
| WO | 2016/022496 A2 | 2/2016 |
| WO | 2016/036472 A1 | 3/2016 |
| WO | 2016/039587 A1 | 3/2016 |
| WO | 2016/144563 A1 | 9/2016 |
| WO | 2017/000522 A1 | 1/2017 |
| WO | 2017/027526 A1 | 2/2017 |
| WO | 2017/213937 A1 | 12/2017 |
| WO | 2018/048700 A1 | 3/2018 |
| WO | 2018/057271 A1 | 3/2018 |
| WO | 2018/213451 A1 | 11/2018 |

(56) References Cited

FOREIGN PATENT DOCUMENTS

| | | |
|---|---|---|
| WO | 2020/117189 A1 | 6/2020 |
| WO | 2020/236148 A1 | 11/2020 |
| WO | 2021/050190 A1 | 3/2021 |

OTHER PUBLICATIONS

Non-Final Office Action received for U.S. Appl. No. 17/676,034, mailed on Jan. 24, 2023, 15 pages.
Office Action received for Chinese Patent Application No. 202110453180.9, mailed on Dec. 26, 2022, 13 pages (8 pages of English Translation and 5 pages of Official Copy).
Corrected Notice of Allowance received for U.S. Appl. No. 16/792,096, mailed on Jan. 11, 2022, 3 pages.
International Preliminary Report on Patentability received for PCT Patent Application No. PCT/US2020/045814, mailed on Mar. 17, 2022, 12 pages.
Notice of Allowance received for Chinese Patent Application No. 202110194015.6, mailed on Mar. 9, 2022, 6 pages (3 pages of English Translation and 3 pages of Official Copy).
Notice of Allowance received for Korean Patent Application No. 10-2021-7036678, mailed on Mar. 7, 2022, 5 pages (1 page of English Translation and 4 pages of Official Copy).
Office Action received for European Patent Application No. 20180900.1, mailed on Feb. 14, 2022, 8 pages.
Notice of Acceptance received for Australian Patent Application No. 2020217354, mailed on May 31, 2022, 3 pages.
Notice of Allowance received for Chinese Patent Application No. 202110454541.1, mailed on May 31, 2022, 6 pages (3 pages of English Translation and 3 pages of Official Copy).
Office Action received for European Patent Application No. 21169911.1, mailed on Jun. 3, 2022, 5 pages.
Office Action received for European Patent Application No. 21177569.7, mailed on Jun. 9, 2022, 5 pages.
Notice of Allowance received for Korean Patent Application No. 10-2021-7030552, mailed on May 6, 2022, 5 pages (2 pages of English Translation and 3 pages of Official Copy).
Office Action received for European Patent Application No. 17853656.1, mailed on May 3, 2022, 7 pages.
Office Action received for European Patent Application No. 20761084.1, mailed on May 9, 2022, 9 pages.
Office Action received for Japanese Patent Application No. 2020-137007, mailed on May 9, 2022, 8 pages (4 pages of English Translation and 4 pages of Official Copy).
Non-Final Office Action received for U.S. Appl. No. 17/158,936, mailed on Nov. 30, 2022, 17 pages.
Office Action received for European Patent Application No. 21169911.1, mailed on Dec. 1, 2022, 4 pages.
Hoffman Chris, "5+ Cool Uses for Android's Daydream Mode", retrieved from—https://www.howtogeek.com/170990/5-cool-uses-for-androids-daydream-mode, Jul. 12, 2017, 8 pages.
Spears Ann, "dimming screen before/instead of screensaver?", retrieved from—https://discussions.apple.com/thread/339700, Jan. 28, 2006, 1 page.
International Search Report and Written Opinion received for PCT Patent Application No. PCT/US2022/026371, mailed on Oct. 12, 2022, 16 pages.
Invitation to Pay Additional Fees received for PCT Patent Application No. PCT/US2022/026371, mailed on Aug. 18, 2022, 9 pages.
Office Action received for Chinese Patent Application No. 201810467061.7, mailed on Apr. 11, 2022, 19 pages (11 pages of English Translation and 8 pages of Official Copy).
Office Action received for Indian Patent Application No. 202118025047, mailed on Apr. 26, 2022, 6 pages.
Intention to Grant received for European Patent Application No. 21177569.7, mailed on Oct. 27, 2022, 8 pages.
Office Action received for Australian Patent Application No. 2021245228, mailed on Aug. 31, 2022, 2 pages.
Office Action received for Korean Patent Application No. 10-2022-7027441, mailed on Aug. 24, 2022, 11 pages (6 pages of English Translation and 5 pages of Official Copy).
"AOD too dim. I've answered my own question to help others", Online Available: https://forums.androidcentral.com/samsung-galaxy-s9-s9-plus/874444-aod-too-dim-ive-answered-my-own-question-help-others.html, 3 pages.
"Brightness on lock screen", Online Available at: https://www.reddit.com/r/galaxys10/comments/b4d5fb/brightness_on_lock_screen/, 1 page.
"Create a Minimal Lock Screen with WidgetLocker", Online Available at: http://appstap192.blogspot.com/2012/01/create-minimal-lock-screen-with.html, 6 pages.
"Download Ultitorch for APK latest version app for android devices", Online Available at: https://apkgk.com/com.qasq.torchpro, 4 pages.
"Flashlight for Android Wear", Available online at: https://www.youtube.com/watch?v=HVNxxUI57BM, 6 pages.
"Flashlight for Android Wear", Online Available at: <https://www.youtube.com/watch?v=HVNxxUI57BM>, 5 pages.
"Free Flashlight Android App by Asus Best Flashlight App on Google Play", Online Available at: <https://www.youtube.com/watch?v=K_kFa7PoVsc>, 3 pages.
"Gear S3 Watch faces with great always on display (A O D)", Available online at: https://www.youtube.com/watch?v=2cxMnrMiGU8, 3 pages.
"Get the most out of Nova Launcher: Changing Icon Sizes", Online available at: https://www.androidguys.com/tips-tools/get-nova-launcher-changing-icon-sizes/, 6 pages.
"Get the most out of Nova Launcher: Changing Icon Sizes", Online Available at: https://www.androidguys.com/tips-tools/get-nova-launcher-changing-icon-sizes/, 3 pages.
"Get the most out of Nova Launcher: Customizing the Dock (Contest Included)", Online Available at: https://www.androidguys.com/tips-tools/get-nova-launcher-customizing-dockcontest-included/, 5 pages.
"Get This Look: 'Minimal' Zooper Widget", Online Available at: https://www.androidguys.com/featured/customize/get-look-minimal-zooper-widget/, 2 pages.
"How To Use Android Wear Smartwatch as a Flashlight!", Available online at: <https://howto.highonandroid.com/android-wear-tutorials/how-to-use-android-wear-smartwatch-as-a-flashlight-flashlight-app/>, 6 pages.
"How to: Use Always-on Apps with Android Wear", Available online at: https://www.youtube.com/watch?v=_-xYB9EBTaA, 3 pages.
"Huawei Watch FAQs-en_us-V2.8", Online available at https://maplindownloads.s3-eu-west-1.amazonaws.com/A27WH-9512.pdf, 135 pages.
"Huawei Watch GT Always on Mode Update is finally here! LK", Online Availabe at: https://www.youtube.com/watch?v=AJw_FIAf7v4, 4 pages.
"Looking for a launcher that changes the default homescreen or widgets based on wifi, location, or other context", Online Available at: https://www.reddit.com/r/androidapps/comments/35lu90/looking_for_a_launcher_that_changes_the_default/, 2 pages.
"New Android Wear Wrist Gestures in Marshmallow", Available online at: https://www.youtube.com/watch?v=0WhKuklpQ9A, 3 pages.
"Nova Launcher—Lock Screen Edit", Online Available at: https://forums.androidcentral.com/ask-question/835057-nova-launcher-lock-screen-edit.html, 2 pages.
"Samsung Gear S3—Display Always On! Cool!", Available online at: https://www.youtube.com/watch?v=ceeDinbPwOY, 3 pages.
"Steam's In-Game Home menu", Online Available at: <https://www.youtube.com/watch?v=jLoRFiPkcUw>, see 0;00-1;06., 3 pages.
"The 4 Best Free Flashlight Apps for Android and iOS", Online Available at: https://www.dailydot.com/debug/best-free-flashlight-apps/, 8 pages.
"Watch Commander: A Gesture-based Invocation System for Rectangular Smartwatches using B2B-Swipe", UIST'16 Adjunct, Available online at: https://dl.acm.org/doi/pdf/10.1145/2984751.2985697, pp. 37-39.
Advisory Action received for U.S. Appl. No. 16/792,096, mailed on Nov. 18, 2021, 4 pages.

(56) References Cited

OTHER PUBLICATIONS

Applicant Initiated Interview Summary received for U.S. Appl. No. 15/713,544, mailed on Apr. 6, 2020, 7 pages.
Applicant Initiated Interview Summary received for U.S. Appl. No. 15/713,544, mailed on Oct. 24, 2019, 4 pages.
Applicant Initiated Interview Summary received for U.S. Appl. No. 16/584,445, mailed on Mar. 17, 2020, 5 pages.
Applicant-Initiated Interview Summary received for U.S. Appl. No. 16/584,281, mailed on Mar. 9, 2020, 5 pages.
Applicant-Initiated Interview Summary received for U.S. Appl. No. 16/584,281, mailed on Sep. 14, 2020, 6 pages.
Applicant-Initiated Interview Summary received for U.S. Appl. No. 16/585,714, mailed on Jul. 20, 2020, 5 pages.
Applicant-Initiated Interview Summary received for U.S. Appl. No. 16/585,721, mailed on Aug. 31, 2020, 5 pages.
Applicant-Initiated Interview Summary received for U.S. Appl. No. 16/585,721, mailed on Mar. 13, 2020, 5 pages.
Applicant-Initiated Interview Summary received for U.S. Appl. No. 16/792,096, mailed on May 17, 2021, 6 pages.
Applicant-Initiated Interview Summary received for U.S. Appl. No. 16/792,096, mailed on Oct. 18, 2021, 6 pages.
Board Decision received for Chinese Patent Application No. 201780002643.1, mailed on Dec. 15, 2021, 2 pages.
Certificate of Examination received for Australian Patent Application No. 2018101947, mailed on Feb. 18, 2019, 2 pages.
Certificate of Examination received for Australian Patent Application No. 2020102158, mailed on Jun. 8, 2021, 2 pages.
Corrected Notice of Allowance received for U.S. Appl. No. 15/713,544, mailed on Feb. 3, 2022, 2 pages.
Corrected Notice of Allowance received for U.S. Appl. No. 15/713,544, mailed on Feb. 10, 2022, 2 pages.
Corrected Notice of Allowance received for U.S. Appl. No. 15/713,544, mailed on Feb. 23, 2022, 2 pages.
Corrected Notice of Allowance received for U.S. Appl. No. 15/791,829, mailed on Jan. 16, 2020, 2 pages.
Decision on Appeal received for U.S. Appl. No. 15/713,544, mailed on Dec. 14, 2021, 10 pages.
Decision to Grant received for Danish Patent Application No. PA201770387, mailed on Aug. 30, 2018, 2 pages.
Decision to Grant received for Danish Patent Application No. PA201970596, mailed on Feb. 26, 2021, 2 pages.
Decision to Grant received for Danish Patent Application No. PA201970597, mailed on Aug. 19, 2021, 2 pages.
Decision to Grant received for European Patent Application No. 18172554.0, mailed on Jul. 30, 2020, 2 pages.
Examiner's Answer to Appeal Brief received for U.S. Appl. No. 15/713,544, mailed on Apr. 5, 2021, 15 pages.
Examiner's Answer to Appeal Brief received for U.S. Appl. No. 15/713,544, mailed on Apr. 9, 2021, 15 pages.
Extended European Search Report received for European Patent Application No. 17853656.1, mailed on Jul. 3, 2019, 9 pages.
Extended European Search Report received for European Patent Application No. 18172554.0, mailed on Aug. 3, 2018, 10 pages.
Extended European Search Report received for European Patent Application No. 20180900.1, mailed on Sep. 18, 2020, 7 pages.
Extended European Search Report received for European Patent Application No. 21169911.1, mailed on Sep. 20, 2021, 9 pages.
Extended European Search Report received for European Patent Application No. 21177569.7, mailed on Sep. 20, 2021, 8 pages.
Final Office Action received for U.S. Appl. No. 15/713,544, mailed on Jul. 19, 2019, 20 pages.
Final Office Action received for U.S. Appl. No. 15/713,544, mailed on May 20, 2020, 14 pages.
Final Office Action received for U.S. Appl. No. 15/791,829, mailed on Mar. 7, 2019, 23 pages.
Final Office Action received for U.S. Appl. No. 16/584,281, mailed on Apr. 15, 2020, 26 pages.
Final Office Action received for U.S. Appl. No. 16/585,721, mailed on Apr. 1, 2020, 28 pages.
Final Office Action received for U.S. Appl. No. 16/792,096, mailed on Aug. 9, 2021, 17 pages.
Intention to Grant received for Danish Patent Application No. PA201770387, mailed on Apr. 4, 2018, 2 pages.
Intention to Grant received for Danish Patent Application No. PA201770387, mailed on May 24, 2018, 2 pages.
Intention to Grant Received for Danish Patent Application No. PA201970596, mailed on Dec. 1, 2020, 2 pages.
Intention to Grant received for Danish Patent Application No. PA201970597, mailed on Apr. 20, 2021, 2 pages.
Intention to Grant received for European Patent Application No. 18172554.0, mailed on Feb. 17, 2020, 8 pages.
International Preliminary Report on Patentability received for PCT Patent Application No. PCT/US2017/049793, mailed on Apr. 4, 2019, 15 pages.
International Preliminary Report on Patentability received for PCT Patent Application No. PCT/US2018/032385, mailed on Nov. 28, 2019, 10 pages.
International Search Report and Written Opinion received for PCT Patent Application No. PCT/US2017/049793, mailed on Dec. 27, 2017, 19 pages.
International Search Report and Written Opinion received for PCT Patent Application No. PCT/US2018/032385 mailed on Aug. 3, 2018, 14 pages.
International Search Report and Written Opinion received for PCT Patent Application No. PCT/US2020/045814, mailed on Jan. 20, 2021, 16 pages.
Invitation to Pay Additional Fees received for PCT Patent Application No. PCT/US2017/049793, mailed on Nov. 3, 2017, 2 pages.
Invitation to Pay Additional Fees received for PCT Patent Application No. PCT/US2020/045814, mailed on Nov. 18, 2020, 11 pages.
Invitation to Pay Search Fees received for European Patent Application No. 20761084.1, mailed on Dec. 7, 2021, 3 pages.
Non-Final Office Action received for U.S. Appl. No. 15/713,544, mailed on Dec. 11, 2019, 19 pages.
Non-Final Office Action received for U.S. Appl. No. 15/713,544, mailed on Jan. 24, 2019, 16 pages.
Non-Final Office Action received for U.S. Appl. No. 15/791,829, mailed on Nov. 8, 2018, 18 pages.
Non-Final Office Action received for U.S. Appl. No. 16/584,281, mailed on Dec. 10, 2019, 23 pages.
Non-Final Office Action received for U.S. Appl. No. 16/584,445, mailed on Dec. 26, 2019, 19 pages.
Non-Final Office Action received for U.S. Appl. No. 16/585,714, mailed on Apr. 16, 2020, 18 pages.
Non-Final Office Action received for U.S. Appl. No. 16/585,721, mailed on Dec. 27, 2019, 25 pages.
Non-Final Office Action received for U.S. Appl. No. 16/792,096, mailed on Feb. 12, 2021, 16 pages.
Notice of Acceptance received for Australian Patent Application No. 2017330211, mailed on May 11, 2020, 3 pages.
Notice of Acceptance received for Australian Patent Application No. 2020309093, mailed on Jul. 8, 2021, 3 pages.
Notice of Acceptance received for Australian Patent Application No. 2021202834, mailed on Jul. 15, 2021, 3 pages.
Notice of Acceptance received for Australian Patent Application No. 2021202836, mailed on Jun. 25, 2021, 3 pages.
Notice of Allowance received for Chinese Patent Application No. 201780002643.1, mailed on Jan. 6, 2022, 5 pages.
Notice of Allowance received for Japanese Patent Application No. 2019-511611, mailed on Jul. 20, 2020, 4 pages.
Notice of Allowance received for Korean Patent Application No. 10-2019-7005734, mailed on Oct. 20, 2020, 4 pages.
Notice of Allowance received for Korean Patent Application No. 10-2021-7002083, mailed on Jun. 18, 2021, 5 pages.
Notice of Allowance received for Korean Patent Application No. 10-2021-7002597, mailed on Feb. 25, 2021, 5 pages.
Notice of Allowance received for Korean Patent Application No. 10-2021-7013453, mailed on Aug. 11, 2021, 5 pages.
Notice of Allowance received for Korean Patent Application No. 10-2021-7013454, mailed on Aug. 12, 2021, 4 pages.

(56) References Cited

OTHER PUBLICATIONS

Notice of Allowance received for U.S. Appl. No. 15/713,544, mailed on Jan. 14, 2022, 5 pages.
Notice of Allowance received for U.S. Appl. No. 15/791,829, mailed on Oct. 4, 2019, 9 pages.
Notice of Allowance received for U.S. Appl. No. 16/584,281, mailed on Nov. 18, 2020, 8 pages.
Notice of Allowance received for U.S. Appl. No. 16/584,281, mailed on Sep. 29, 2020, 5 pages.
Notice of Allowance received for U.S. Appl. No. 16/584,445, mailed on Apr. 17, 2020, 9 pages.
Notice of Allowance received for U.S. Appl. No. 16/584,445, mailed on Jul. 23, 2020, 8 pages.
Notice of of Allowance received for U.S. Appl. No. 16/584,445, mailed on Jun. 24, 2020, 5 pages.
Notice of of Allowance received for U.S. Appl. No. 16/584,445, mailed on May 29, 2020, 5 pages.
Notice of Allowance received for U.S. Appl. No. 16/584,445, mailed on Oct. 21, 2020, 6 pages.
Notice of Allowance received for U.S. Appl. No. 16/585,714, mailed on Jan. 8, 2021, 8 pages.
Notice of Allowance received for U.S. Appl. No. 16/585,714, mailed on Jan. 27, 2021, 2 pages.
Notice of Allowance received for U.S. Appl. No. 16/585,714, mailed on Sep. 25, 2020, 15 pages.
Notice of Allowance received for U.S. Appl. No. 16/585,721, mailed on Oct. 30, 2020, 9 pages.
Notice of Allowance received for U.S. Appl. No. 16/585,721, mailed on Sep. 30, 2020, 15 pages.
Notice of Allowance received for U.S. Appl. No. 16/792,096, mailed on Dec. 29, 2021, 11 pages.
Office Action and Search Report received for Danish Patent Application No. PA201970598, mailed on Jan. 28, 2020, 6 pages.
Office Action received for Australian Patent Application No. 2017330211, mailed on Dec. 5, 2019, 3 pages.
Office Action received for Australian Patent Application No. 2018100179, mailed on Jun. 4, 2018, 4 pages.
Office Action received for Australian Patent Application No. 2018100179, mailed on Nov. 20, 2018, 7 pages.
Office Action received for Australian Patent Application No. 2018100179, mailed on Sep. 14, 2018, 4 pages.
Office Action received for Australian Patent Application No. 2020102158, mailed on Apr. 27, 2021, 5 pages.
Office Action received for Australian Patent Application No. 2020102158, mailed on Dec. 8, 2020, 9 pages.
Office Action received for Australian Patent Application No. 2020217354, mailed on Jan. 17, 2022, 5 pages.
Office Action received for Australian Patent Application No. 2020217354, mailed on Jul. 22, 2021, 3 pages.
Office Action received for Australian Patent Application No. 2020309093, mailed on Jan. 21, 2021, 3 pages.
Office Action received for Australian Patent Application No. 2021202834, mailed on May 28, 2021, 2 pages.
Office Action received for Chinese Patent Application No. 201780002643.1, mailed on Aug. 2, 2021, 20 pages.
Office Action received for Chinese Patent Application No. 201780002643.1, mailed on Dec. 31, 2020, 26 pages.
Office Action received for Chinese Patent Application No. 201780002643.1, mailed on Jun. 17, 2020, 30 pages.
Office Action received for Chinese Patent Application No. 201810467061.7, mailed on Aug. 15, 2019, 13 pages.
Office Action received for Chinese Patent Application No. 201810467061.7, mailed on Feb. 22, 2019, 19 pages.
Office Action received for Chinese Patent Application No. 2018104670617, mailed on Feb. 18, 2020, 12 pages.
Office Action received for Chinese Patent Application No. 202110194015.6, mailed on Sep. 28, 2021, 13 pages.
Office Action received for Chinese Patent Application No. 202110453180.9, mailed on Nov. 8, 2021, 21 pages.
Office Action received for Chinese Patent Application No. 202110454541.1, mailed on Oct. 20, 2021, 19 pages.
Office Action received for Danish Patent Application No. PA201770387, mailed on Feb. 1, 2018, 3 Pages.
Office Action received for Danish Patent Application No. PA201970596, mailed on May 6, 2020, 4 pages.
Office Action received for Danish Patent Application No. PA201970597, mailed on Oct. 29, 2020, 4 pages.
Office Action received for Danish Patent Application No. PA201970598, mailed on Apr. 15, 2021, 6 pages.
Office Action received for Danish Patent Application No. PA201970598, mailed on Oct. 9, 2020, 4 pages.
Office Action received for Danish Patent Application No. PA201970599, mailed on Jan. 23, 2020, 6 pages.
Office Action received for Danish Patent Application No. PA201970599, mailed on Mar. 1, 2021, 4 pages.
Office Action received for Danish Patent Application No. PA201970599, mailed on May 27, 2020, 4 pages.
Office Action received for European Patent Application No. 17853656.1, mailed on Mar. 25, 2021, 8 pages.
Office Action received for European Patent Application No. 18172554.0, mailed on Jul. 12, 2019, 10 Pages.
Office Action received for Japanese Patent Application No. 2019-511611, mailed on Feb. 28, 2020, 4 pages.
Office Action received for Japanese Patent Application No. 2020-137007, mailed on Jun. 21, 2021, 7 pages.
Office Action received for Korean Patent Application No. 10-2019-7005734, mailed on Feb. 24, 2020, 13 pages.
Office Action received for Korean Patent Application No. 10-2019-7005734, mailed on Jul. 14, 2020, 8 pages.
Office Action received for Korean Patent Application No. 10-2021-7002083, mailed on Feb. 10, 2021, 7 pages.
Office Action received for Korean Patent Application No. 10-2021-7013453, mailed on Jun. 5, 2021, 6 pages.
Office Action received for Korean Patent Application No. 10-2021-7013454, mailed on Jun. 5, 2021, 6 pages.
Office Action received for Korean Patent Application No. 10-2021-7030552, mailed on Nov. 22, 2021, 14 pages.
Office Action received for Korean Patent Application No. 10-2021-7036678, mailed on Dec. 22, 2021, 6 pages.
Search Report and Opinion received for Danish Patent Application No. PA201770387, mailed on Oct. 12, 2017, 8 pages.
Search Report and Opinion received for Danish Patent Application No. PA201970596, mailed on Dec. 4, 2019, 11 pages.
Search Report and Opinion received for Danish Patent Application No. PA201970597, mailed on Dec. 18, 2019, 10 pages.
Search Report and Opinion received for Danish Patent Application No. PA201970598, mailed on Oct. 31, 2019, 9 pages.
Search Report and Opinion received for Danish Patent Application No. PA201970599, mailed on Nov. 8, 2019, 12 pages.
Notice of Allowance received for Korean Patent Application No. 10-2022-7019205, mailed on Jan. 5, 2023, 8 pages (2 pages of English Translation and 6 pages of Official Copy).
Applicant-Initiated Interview Summary received for U.S. Appl. No. 17/158,936, mailed on Dec. 28, 2022, 4 pages.
Notice of Allowance received for Korean Patent Application No. 10-2022-7027441, mailed on Dec. 2, 2022, 7 pages (2 pages of English Translation and 5 pages of Official Copy).
Office Action received for European Patent Application No. 20761084.1, mailed on Dec. 14, 2022, 5 pages.
Office Action received for Chinese Patent Application No. 202110453180.9, mailed on Jun. 16, 2022, 14 pages (7 pages of English Translation and 7 pages of Official Copy).
Office Action received for Chinese Patent Application No. 201810467061.7, mailed on Jun. 22, 2022, 15 pages (1 page of English Translation and 14 pages of Official Copy).
Applicant-Initiated Interview Summary received for U.S. Appl. No. 17/676,034, mailed on Feb. 27, 2023, 4 pages.
Office Action received for Japanese Patent Application No. 2020-137007, mailed on Feb. 10, 2023, 4 pages (2 pages of English Translation & 2 pages of Official Copy).
Notice of Acceptance received for Australian Patent Application No. 2021245228, mailed on Oct. 4, 2022, 3 pages.

(56) References Cited

OTHER PUBLICATIONS

Notice of Allowance received for Japanese Patent Application No. 2022-512865, mailed on Oct. 3, 2022, 4 pages (1 page of English Translation and 3 pages of Official Copy).
Office Action received for Korean Patent Application No. 10-2022-7019205, mailed on Sep. 21, 2022, 6 pages (2 pages of English Translation and 4 pages of Official Copy).
Applicant Initiated Interview Summary received for U.S. Appl. No. 17/546,630, mailed on May 22, 2023, 4 pages.
Notice of Allowance received for Japanese Patent Application No. 2020-137007, mailed on May 29, 2023, 5 pages (1 page of English Translation & 4 pages of Official Copy).
Office Action received for Korean Patent Application No. 10-2023-7011744, mailed on May 15, 2023, 11 pages (5 pages of English Translation and 6 pages of Official Copy).
Decision to Grant received for European Patent Application No. 21169911.1, mailed on Jun. 29, 2023, 3 pages.
Final Office Action received for U.S. Appl. No. 17/546,630, mailed on Jun. 27, 2023, 31 pages.
Office Action received for European Patent Application No. 20180900.1, mailed on May 3, 2023, 6 pages.
Decision to Grant received for European Patent Application No. 21177569.7, mailed on Apr. 6, 2023, 3 pages.
Final Office Action received for U.S. Appl. No. 17/158,936, mailed on Apr. 7, 2023, 18 pages.
Intention to Grant received for European Patent Application No. 20761084.1, mailed on Mar. 27, 2023, 10 pages.
Non-Final Office Action received for U.S. Appl. No. 17/546,630, mailed on Mar. 30, 2023, 41 pages.
Intention to Grant received for European Patent Application No. 21169911.1, mailed on Mar. 6, 2023, 9 pages.
Office Action received for Australian Patent Application No. 2022228204, mailed on Jul. 27, 2023, 5 pages.
International Search Report and Written Opinion received for PCT Patent Application No. PCT/US2023/021409, mailed on Nov. 9, 2023, 23 pages.
Invitation to Pay Additional Fees and Partial International Search Report received for PCT Patent Application No. PCT/US2023/021409, mailed on Sep. 19, 2023, 17 pages.
Notice of Allowance received for U.S. Appl. No. 17/676,034, mailed on Nov. 17, 2023, 9 pages.
Office Action received for Chinese Patent Application No. 202210265746.X, mailed on Oct. 11, 2023, 13 pages (6 pages of English Translation and 7 pages of Official Copy).
Advisory Action received for U.S. Appl. No. 17/158,936, mailed on Jul. 24, 2023, 4 pages.
Applicant-Initiated Interview Summary received for U.S. Appl. No. 17/546,630. mailed on Aug. 9, 2023, 4 pages.
Applicant-Initiated Interview Summary received for U.S. Appl. No. 17/546,630, mailed on Nov. 6, 2023, 3 pages.
Applicant-Initiated Interview Summary received for U.S. Appl. No. 17/676,034, mailed on Oct. 31, 2023, 2 pages.
Applicant-Initiated Interview Summary received for U.S. Appl. No. 17/676,034, mailed on Sep. 18, 2023, 2 pages.
Decision to Grant received for European Patent Application No. 20761084.1, mailed on Jul. 27, 2023, 4 pages.
Extended European Search Report received for European Patent Application No. 23176305.3, mailed on Sep. 13, 2023, 8 pages.
Final Office Action received for U.S. Appl. No. 17/676,034, mailed on Jul. 24, 2023, 19 pages.
International Preliminary Report on Patentability received for PCT Patent Application No. PCT/US2022/026371, mailed on Nov. 9, 2023, 11 pages.
Non-Final Office Action received for U.S. Appl. No. 17/546,630, mailed on Oct. 3, 2023, 36 pages.
Non-Final Office Action received for U.S. Appl. No. 17/676,034, mailed on Oct. 11, 2023, 23 pages.
Notice of Acceptance received for Australian Patent Application No. 2022287595, mailed on Aug. 29, 2023, 3 pages.
Notice of Allowance received for Korean Patent Application No. 10-2023-7011744, mailed on Sep. 4, 2023, 8 pages (2 pages of English Translation and 6 pages of Official Copy).
Office Action received for Australian Patent Application No. 2022287595, mailed on Jul. 20, 2023, 3 pages.
Office Action received for Indian Patent Application No. 202118025048, mailed on Sep. 22, 2023, 8 pages.
Hoffman Chris, "5+ Cool Uses for Android's Daydream Mode", Online Available at: https://www.howtogeek.com/170990/5-cool-uses-for-androids-daydream-mode/, Jul. 12, 2017, 8 pages.
Houben et al., "WatchConnect: A Toolkit for Prototyping Smartwatch-Centric Cross-Device Applications", Proceedings of the 33rd Annual ACM Conference on Human Factors in Computing Systems, online available at: https://dl.acm.org/doi/10.1145/2702123.2702215, 2015. pp. 1247-1256.
Notice of Allowance received for Korean Patent Application No. 10-2023-7040267, mailed on Dec. 5, 2023, 8 pages (2 pages of English Translation and 6 pages of Official Copy).
Office Action received for European Patent Application No. 20180900.1, mailed on Dec. 21, 2023, 5 pages.
Office Action received for Japanese Patent Application No. 2022-174879, mailed on Dec. 8, 2023, 8 pages (4 pages of English Translation and 4 pages of Official Copy).
Office Action received for Australian Patent Application No. 2022228204, mailed on Feb. 15, 2024, 3 pages.
Supplemental Notice of Allowance received for U.S. Appl. No. 17/676,034, mailed on Feb. 14, 2024, 4 pages.
Office Action received for Chinese Patent Application No. 202210263607.3, mailed on Oct. 23, 2023, 18 pages (7 pages of English Translation and 11 pages of Official Copy).
Notice of Hearing received for Indian Patent Application No. 202118025047, mailed on Mar. 14, 2024, 2 pages.
Supplemental Notice of Allowance received for U.S. Appl. No. 17/676,034, mailed on Mar. 4, 2024, 10 pages.
Office Action received for European Patent Application No. 17853656.1, mailed on Apr. 24, 2024, 7 pages.
Notice of Allowance received for Chinese Patent Application No. 202210265746.X. mailed on Apr. 25, 2024, 4 pages (1 page of English Translation and 3 pages of Official Copy).
Office Action received for Chinese Patent Application No. 202210263607.3, mailed on Apr. 15, 2024, 12 pages (4 pages of English Translation and 8 pages of Official Copy).

\* cited by examiner

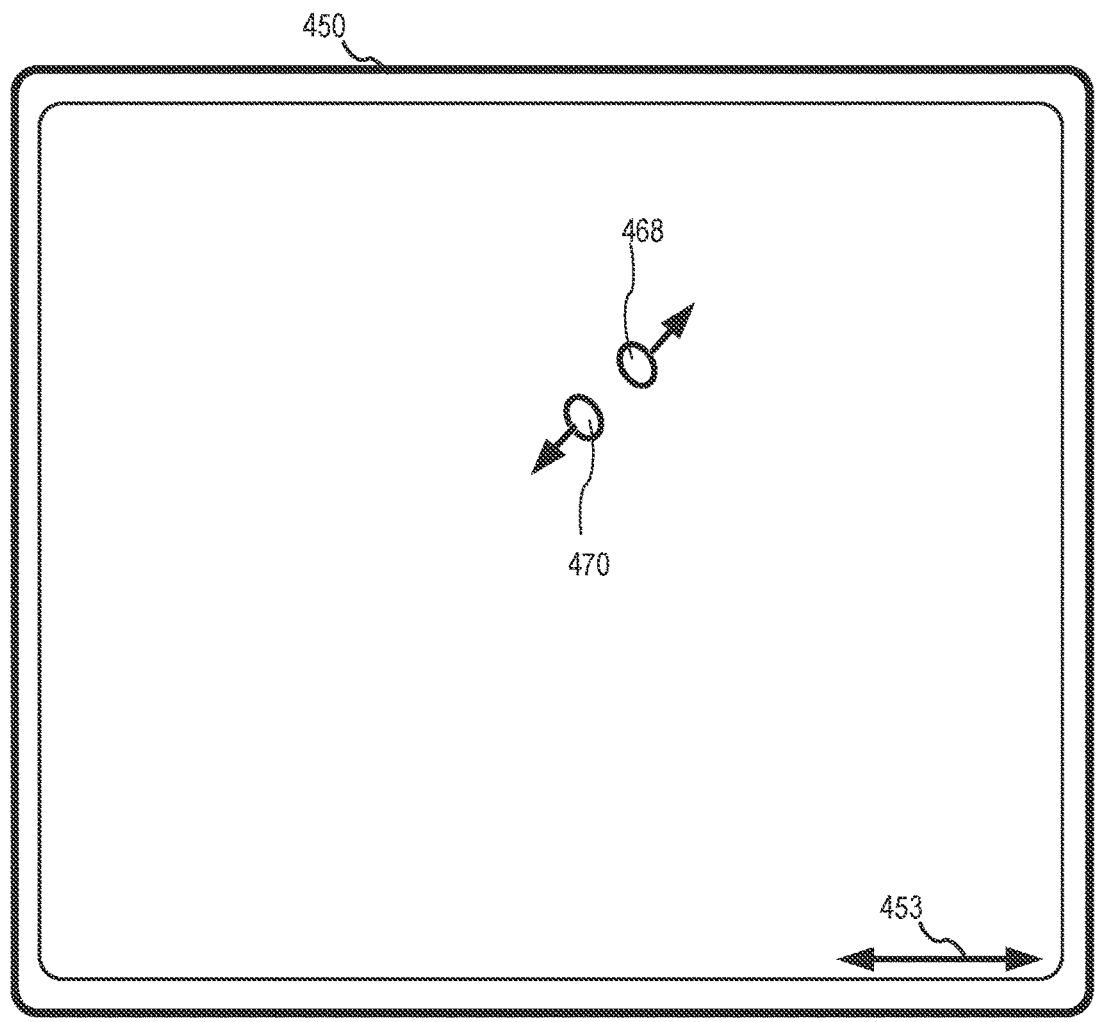
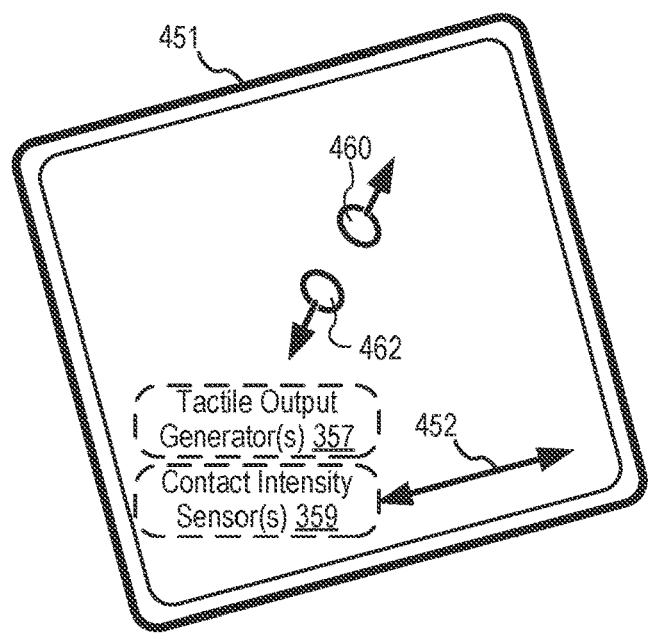
*FIG. 4B*

700 ⤵

702
Receive a first input corresponding to a rotation of the rotatable input mechanism.

704
In accordance with a determination that the first input meets a set of brightness adjustment criteria, wherein the set of brightness adjustment criteria includes a criterion that is met when a brightness level of the display screen is below a predetermined brightness level, increase the brightness level of the display screen.

708
Define a first rotation direction based on the first input as a request to increase the brightness level of the display screen during the brightness configuration session, and define a second rotation direction opposite the first rotation direction as a request to decrease the brightness level during the brightness configuration session.

710
Receive a second input having the second rotation direction opposite the first rotation direction, and in response to receiving the second input, decreasing the brightness level while maintaining the brightness configuration session.

706
In accordance with a determination that the first input does not meet the set of brightness adjustment criteria, forgo increasing the brightness level of the display screen.

1202
Receive a user input at the electronic device, wherein the user input is registered by the accelerometer.

1214
In accordance with a determination that the user input is received while the quiet mode is active and the user input is a physical input on a surface of the electronic device, activating, in response to the user input, the display screen from the inactive state.

1216
The physical input comprises a touch input on the display screen and activating the display screen comprises turning on the display screen.

1218
The electronic device includes a hardware button and the physical input comprises a depression of the hardware button, further wherein activating the display screen comprises turning on the display screen.

1220
The electronic device includes a rotatable input mechanism and the physical input comprises a rotation of the rotatable input mechanism.

1222
Activating the display screen comprises increasing a brightness level of the display screen toward a predetermined brightness level at a rate that varies in accordance with the rotational velocity of the rotation at the rotatable input mechanism.

1224
In accordance with the determination that the user input is received while the quiet mode is active, maintaining the quiet mode as active.

WATCH THEATER MODE

CROSS-REFERENCE TO RELATED APPLICATIONS

This application is a continuation of U.S. patent application Ser. No. 15/713,544, entitled "WATCH THEATER MODE," filed Sep. 22, 2017, which claims priority to U.S. provisional patent application 62/445,028, entitled "WATCH THEATER MODE," filed Jan. 11, 2017, U.S. provisional patent application 62/441,274, entitled "WATCH THEATER MODE," filed Dec. 31, 2016, and U.S. provisional patent application 62/399,314, entitled "WATCH ECLIPSE MODE," filed Sep. 23, 2016. The contents of which are hereby incorporated by reference in their entirety.

FIELD

The present disclosure relates generally to computer user interfaces, and more specifically to techniques for displaying user interfaces.

BACKGROUND

Electronic devices may include display screens for displaying user interfaces. Such display screens may be dimmed or brightened while displaying a user interface or other information. For example, screens can be dimmed or brightened in response to changes in lighting conditions, to reduce power consumption, to different use conditions, and/or to other situations.

BRIEF SUMMARY

Some techniques for adjusting a brightness level of a display screen on an electronic device, however, are generally cumbersome and inefficient. For example, some existing techniques use a complex and time-consuming user interface, which may include multiple key presses or keystrokes. Merely by way of example, a user may have to traverse through multiple screens of a settings user interface to adjust a brightness setting of the device. This is time-consuming and cumbersome particularly if the user wishes to alter the brightness level only temporarily, or if the user wishes to alternately brighten and then dim the display screen. Existing techniques require more time than necessary, wasting user time and device energy. This latter consideration is particularly important in battery-operated devices.

Accordingly, the present technique provides electronic devices with faster, more efficient methods and interfaces for adjusting the brightness level of a display screen. Such methods and interfaces optionally complement or replace other methods for adjusting brightness levels of display screens. Such methods and interfaces reduce the cognitive burden on a user and produce a more efficient human-machine interface. For battery-operated computing devices, such methods and interfaces conserve power and increase the time between battery charges. Some embodiments described below address issues with dimming and brightening display screens.

Example methods are disclosed herein. An example method includes, at an electronic device with a rotatable input mechanism and a display screen, receiving a first input corresponding to a rotation of the rotatable input mechanism; in accordance with a determination that the first input meets a set of brightness adjustment criteria, wherein the set of brightness adjustment criteria includes a criterion that is met when a brightness level of the display screen is below a predetermined brightness level, increasing the brightness level of the display screen; and in accordance with a determination that the first input does not meet the set of brightness adjustment criteria, forgoing increasing the brightness level of the display screen.

An example method includes, at an electronic device with a rotatable input mechanism and a display screen: receiving a first input corresponding to a rotation of the rotatable input mechanism, wherein the first input initiates a brightness configuration session. The method further includes, while receiving the first input: adjusting a brightness level of the display screen in accordance with the rotation of the rotatable input; in accordance with a determination that a set of exit configuration criteria is met, wherein the set of exit configuration criteria includes a criterion that is met when the brightness level of the display screen is above a predetermined brightness level: ending the brightness configuration session, and ceasing to adjust the brightness level of the screen in response to further rotation of the rotatable input mechanism; and in accordance with a determination that the set of exit configuration criteria is not met: maintaining the brightness configuration session, and continuing to adjust the brightness level of the display screen in accordance with further rotation of the rotatable input mechanism.

Exemplary devices are disclosed herein. An example electronic device includes a display screen, a rotatable input mechanism; one or more processors, a memory, and one or more programs, wherein the one or more programs are stored in the memory and configured to be executed by the one or more processors. The one or more programs include instructions for: receiving a first input corresponding to a rotation of the rotatable input mechanism; in accordance with a determination that the first input meets a set of brightness adjustment criteria, wherein the set of brightness adjustment criteria includes a criterion that is met when a brightness level of the display screen is below a predetermined brightness level, increasing the brightness level of the display screen; and in accordance with a determination that the first input does not meet the set of brightness adjustment criteria, forgoing increasing the brightness level of the display screen.

An example electronic device includes a display screen; a rotatable input mechanism; one or more processors; a memory; and one or more programs, wherein the one or more programs are stored in the memory and configured to be executed by the one or more processors. The one or more programs include instructions for: receiving a first input corresponding to a rotation of the rotatable input mechanism, wherein the first input initiates a brightness configuration session; while receiving the first input: adjusting a brightness level of the display screen in accordance with the rotation of the rotatable input; in accordance with a determination that a set of exit configuration criteria is met, wherein the set of exit configuration criteria includes a criterion that is met when the brightness level of the display screen is above a predetermined brightness level: ending the brightness configuration session, and ceasing to adjust the brightness level of the screen in response to further rotation of the rotatable input mechanism; and in accordance with a determination that the set of exit configuration criteria is not met: maintaining the brightness configuration session, and continuing to adjust the brightness level of the display screen in accordance with further rotation of the rotatable input mechanism Example non-transitory computer readable storage media are disclosed herein. An example non-transitory computer readable storage medium stores one or more programs, the one or more programs comprising instructions, which when executed by an electronic device with a display screen and a rotatable input mechanism, cause the device to: receive a first input corresponding to a rotation of the rotatable input mechanism; in accordance with a determination that the first input meets a set of brightness adjustment criteria, wherein the set of brightness adjustment criteria includes a criterion that is met when a brightness level of the display screen is below a predetermined brightness level, increase the brightness level of the display screen; and in accordance with a determination that the first input does not meet the set of brightness adjustment criteria, forgo increasing the brightness level of the display screen.

An example non-transitory computer readable storage medium stores one or more programs, the one or more programs comprising instructions, which when executed by an electronic device with a display screen and a rotatable input mechanism, cause the device to: receive a first input corresponding to a rotation of the rotatable input mechanism, wherein the first input initiates a brightness configuration session; while receiving the first input: adjust a brightness level of the display screen in accordance with the rotation of the rotatable input; in accordance with a determination that a set of exit configuration criteria is met, wherein the set of exit configuration criteria includes a criterion that is met when the brightness level of the display screen is above a predetermined brightness level: end the brightness configuration session, and cease to adjust the brightness level of the screen in response to further rotation of the rotatable input mechanism; and in accordance with a determination that the set of exit configuration criteria is not met: maintain the brightness configuration session, and continue to adjust the brightness level of the display screen in accordance with further rotation of the rotatable input mechanism.

In accordance with some embodiments, an electronic device includes a display screen; a rotatable input mechanism; means for receiving a first input corresponding to a rotation of the rotatable input mechanism; means for, in accordance with a determination that the first input meets a set of brightness adjustment criteria, wherein the set of brightness adjustment criteria includes a criterion that is met when a brightness level of the display screen is below a predetermined brightness level, increasing the brightness level of the display screen; and means for, in accordance with a determination that the first input does not meet the set of brightness adjustment criteria, forgoing increasing the brightness level of the display screen.

In accordance with some embodiments, an electronic device includes a display screen; a rotatable input mechanism; means for receiving a first input corresponding to a rotation of the rotatable input mechanism, wherein the first input initiates a brightness configuration session; means for, while receiving the first input: adjusting a brightness level of the display screen in accordance with the rotation of the rotatable input; means for, in accordance with a determination that a set of exit configuration criteria is met, wherein the set of exit configuration criteria includes a criterion that is met when the brightness level of the display screen is above a predetermined brightness level: ending the brightness configuration session, and ceasing to adjust the brightness level of the screen in response to further rotation of the rotatable input mechanism; and means for, in accordance with a determination that the set of exit configuration criteria is not met: maintaining the brightness configuration session, and continuing to adjust the brightness level of the display screen in accordance with further rotation of the rotatable input mechanism.

In accordance with some embodiments, an electronic device comprises a display screen; a rotatable input mechanism; one or more processors; a memory; and one or more programs, wherein the one or more programs are stored in the memory and configured to be executed by the one or more processors, the one or more programs including instructions for performing any of the methods disclosed herein.

In accordance with some embodiments, a non-transitory computer readable storage medium stores one or more programs, the one or more programs comprising instructions, which when executed by one or more processors of an electronic device, cause the device to perform any of the methods disclosed herein.

In accordance with some embodiments, an electronic device, comprises: a display screen unit; a rotatable input mechanism unit; and a processing unit coupled to the display screen unit and the rotatable input mechanism unit, the processing unit comprising: a receiving unit configured to receive a first input corresponding to a rotation of the rotatable input mechanism unit; an adjusting unit configured to: in accordance with a determination that the first input meets a set of brightness adjustment criteria, wherein the set of brightness adjustment criteria includes a criterion that is met when a brightness level of the display screen is below a predetermined brightness level, increase the brightness level of the display screen unit; and in accordance with a determination that the first input does not meet the set of brightness adjustment criteria, forgo increasing the brightness level of the display screen unit.

In accordance with some embodiments, an example electronic device comprises: display screen unit; a rotatable input mechanism unit; and a processing unit coupled to the display screen unit and the rotatable input mechanism unit, the processing unit comprising: a receiving unit configured to receive a first input corresponding to a rotation of the rotatable input mechanism unit, wherein the first input initiates a brightness configuration session; an adjusting unit configured to, while receiving the first input, adjusting a brightness level of the display screen unit in accordance with the rotation of the rotatable input mechanism unit; a session configuring unit configured to, while receiving the first input and in accordance with a determination that a set of exit configuration criteria is met, wherein the set of exit configuration criteria includes a criterion that is met when the brightness level of the display screen is above a predetermined brightness level, end the brightness configuration session; an adjusting unit configured to, while receiving the first input and in accordance with the determination that a set of exit configuration criteria is met, cease to adjust the brightness level of the display screen unit in response to further rotation of the rotatable input mechanism unit; the session configuring unit further configured to, in accordance with a determination that the set of exit configuration criteria is not met, maintain the brightness configuration session, and the adjusting unit further configured to, in accordance with a determination that the set of exit configuration criteria is not met, continue to adjust the brightness level of the display screen unit in accordance with further rotation of the rotatable input mechanism unit.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors. Example transitory computer readable storage media are disclosed herein. An example transitory computer readable storage medium stores one or more programs, the one or more programs comprising instructions, which when executed by an electronic device with a display screen and a rotatable input mechanism, cause the device to: receive a first input corresponding to a rotation of the rotatable input mechanism; in accordance with a determination that the first input meets a set of brightness adjustment criteria, wherein the set of brightness adjustment criteria includes a criterion that is met when a brightness level of the display screen is below a predetermined brightness level, increase the brightness level of the display screen; and in accordance with a determination that the first input does not meet the set of brightness adjustment criteria, forgo increasing the brightness level of the display screen.

An example transitory computer readable storage medium stores one or more programs, the one or more programs comprising instructions, which when executed by an electronic device with a display screen and a rotatable input mechanism, cause the device to: receive a first input corresponding to a rotation of the rotatable input mechanism, wherein the first input initiates a brightness configuration session; while receiving the first input: adjust a brightness level of the display screen in accordance with the rotation of the rotatable input; in accordance with a determination that a set of exit configuration criteria is met, wherein the set of exit configuration criteria includes a criterion that is met when the brightness level of the display screen is above a predetermined brightness level: end the brightness configuration session, and cease to adjust the brightness level of the screen in response to further rotation of the rotatable input mechanism; and in accordance with a determination that the set of exit configuration criteria is not met: maintain the brightness configuration session, and continue to adjust the brightness level of the display screen in accordance with further rotation of the rotatable input mechanism.

Thus, devices are provided with faster, more efficient methods and interfaces for adjusting a brightness level of a display screen of an electronic device, thereby increasing the effectiveness, efficiency, and user satisfaction with such devices. Such methods and interfaces may complement or replace other methods for adjusting brightness levels of display screens.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIG. 7 is a flow diagram illustrating an example method for adjusting a brightness level of a display screen, in accordance with some embodiments.

FIGS. 12A-12C are flow diagrams illustrating an example method for the quiet mode feature, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for adjusting a brightness level of a display screen. Such brightness levels may be a simulated brightness level (e.g., alpha-blending a variably transparent or opaque black layer with a displayed user interface to darken or brighten display of the user interface), a real brightness level (e.g., changing a brightness setting of a backlight of the device), and/or a combination thereof. There is a need to provide functions for adjusting the brightness level that are intuitive to the user and easy to access while allowing the user to be discrete. In practice, such techniques can reduce the cognitive burden on a user who wishes to adjust the brightness level, thereby enhancing productivity and ease of use. Further, such techniques can reduce processor and battery power otherwise wasted on redundant user inputs.

Figure 8:
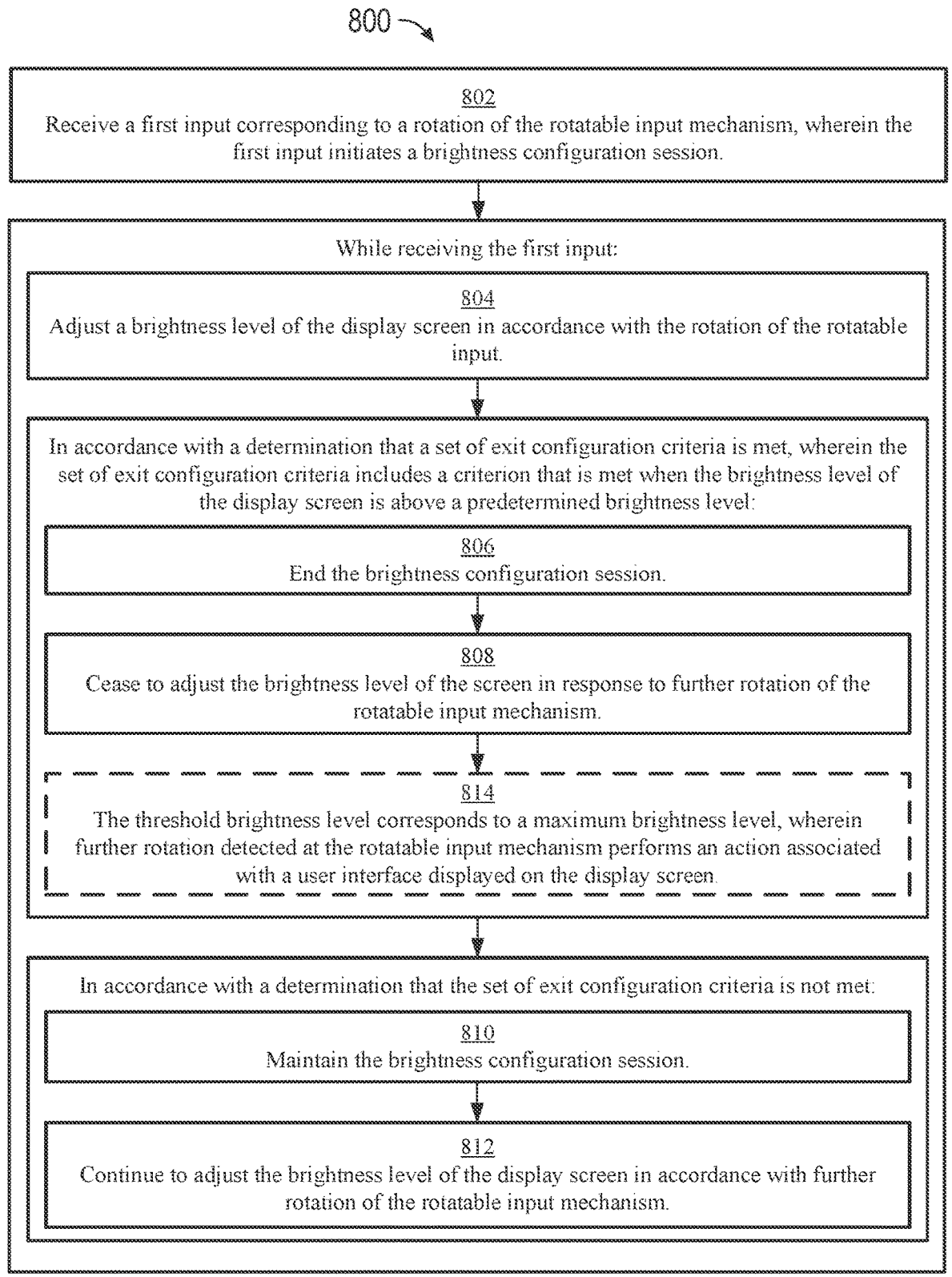
FIG. 8 is a flow diagram illustrating another example method for adjusting a brightness level of a display screen, in accordance with some embodiments.
Figure 11A:
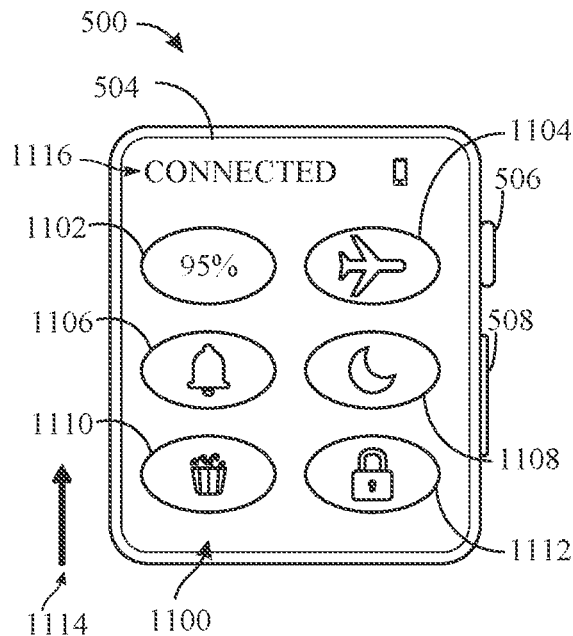
FIGS. 11A-11Q illustrate exemplary user interfaces demonstrating a quiet mode feature, in accordance with some embodiments.
Figure 11B:
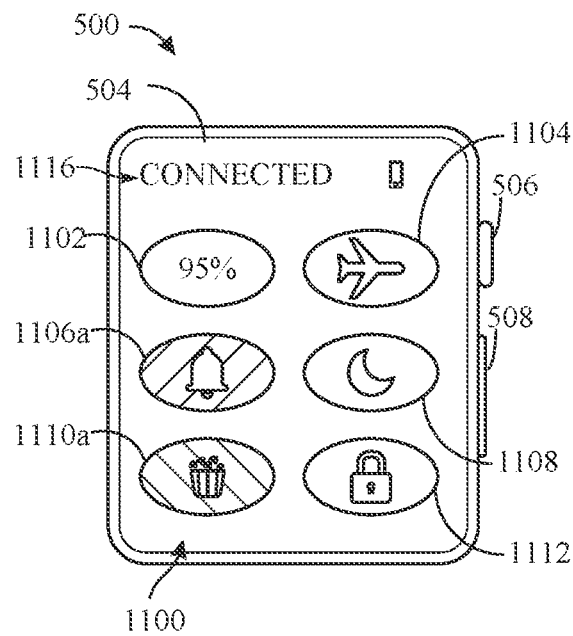
Figure 11Q:
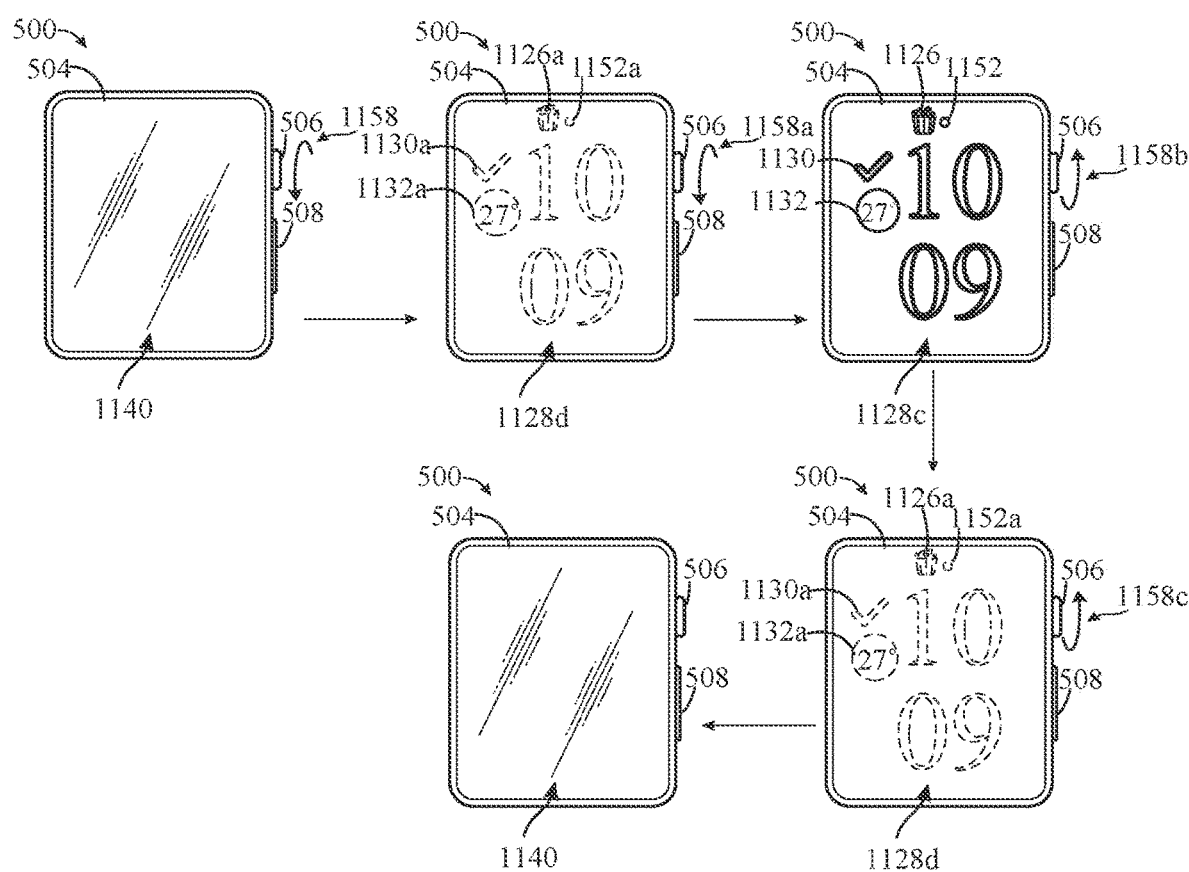
Figure 12B:
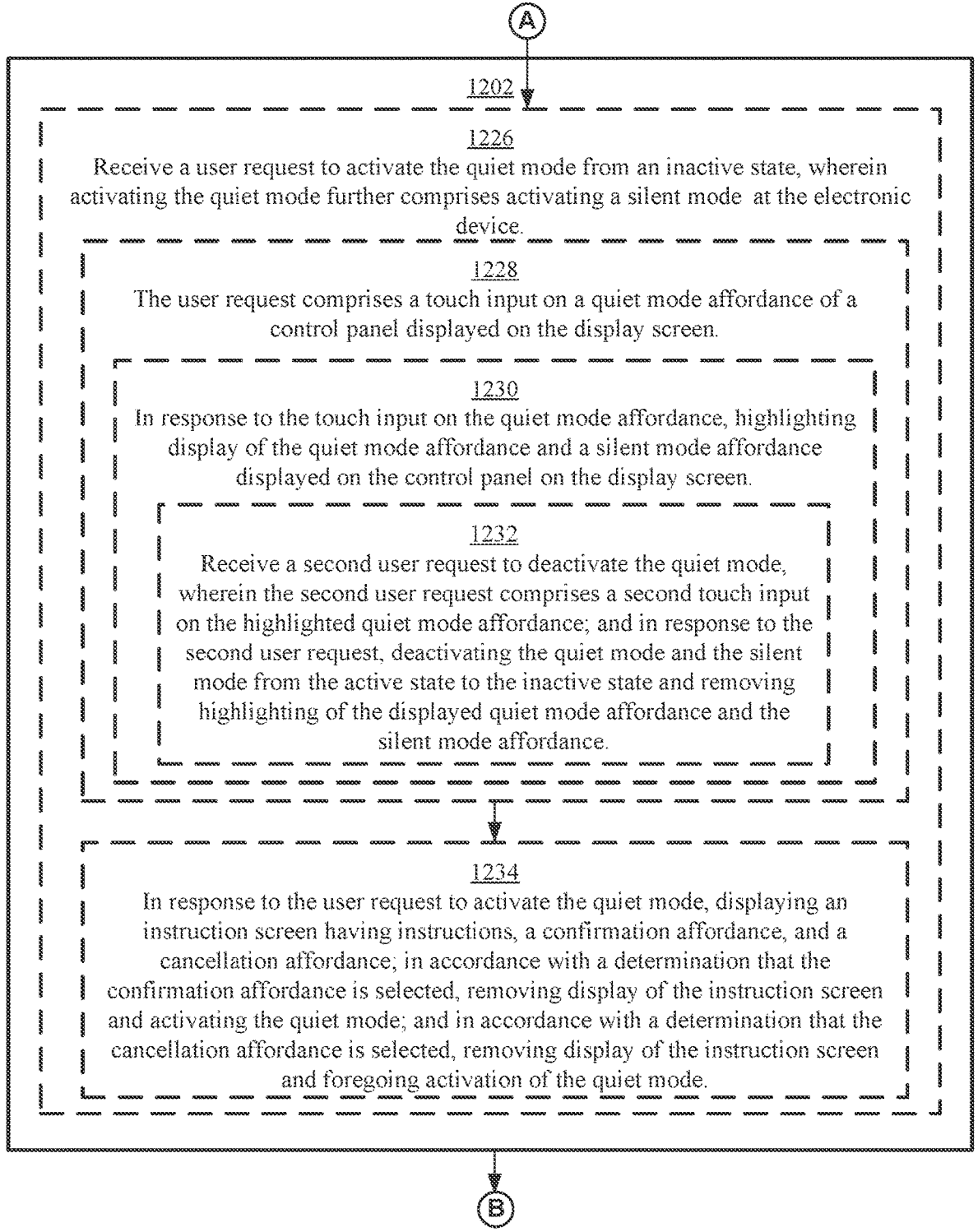
Figure 12C:
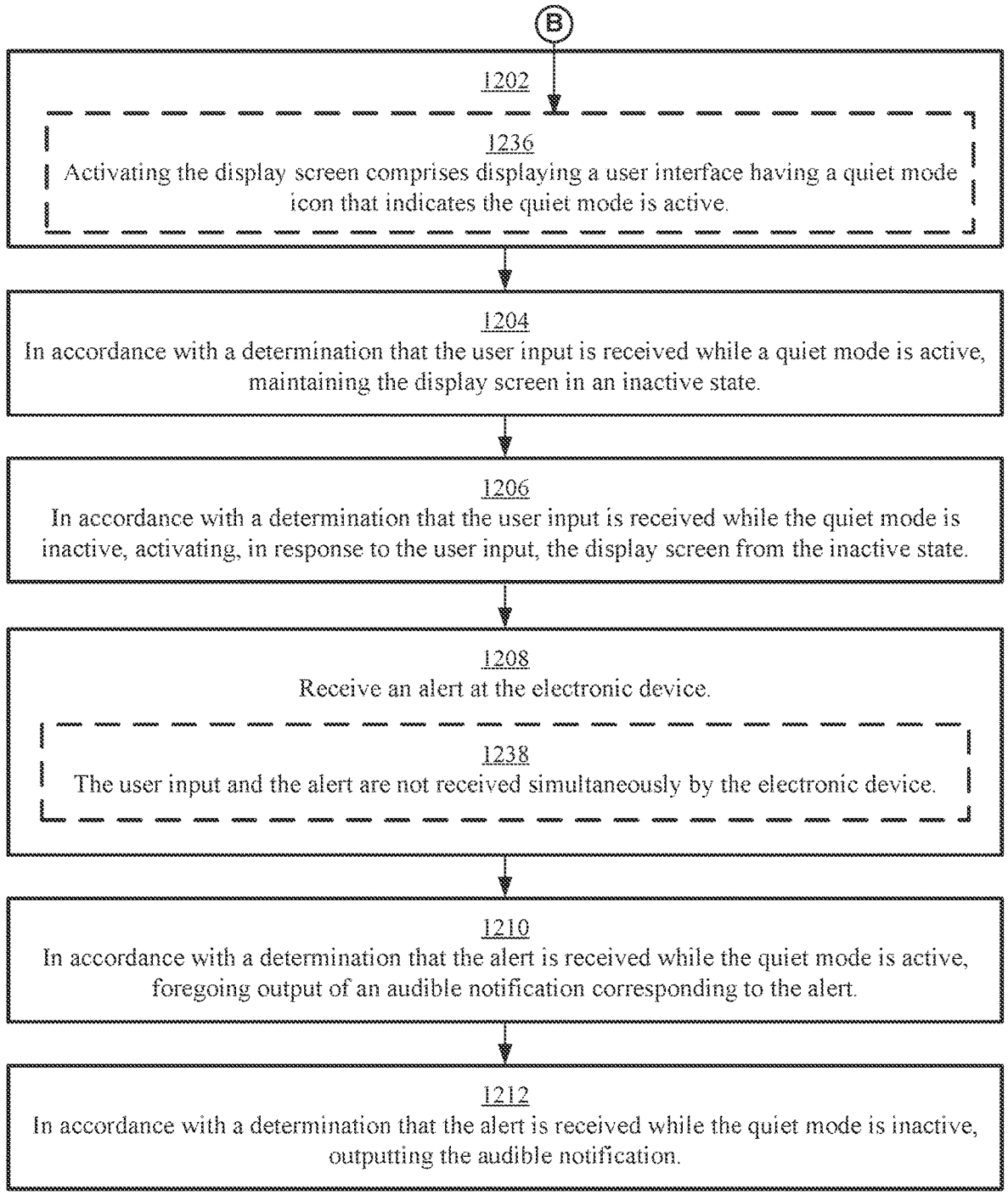

Below, FIGS. 1A-1B, 2, 3, 4A-4B, and 5A-5B provide a description of exemplary devices for performing the techniques for managing event notifications. FIGS. 6A-6J illustrate exemplary user interfaces for adjusting a brightness level of a display screen. FIGS. 7 and 8 are flow diagrams illustrating methods of adjusting brightness levels of a display screen in accordance with some embodiments. The user interfaces in FIGS. 6A-6J are used to illustrate the processes described below, including the processes in FIGS. 7 and 8. FIGS. 11A-11Q illustrate exemplary user interfaces for a quiet mode feature at an electronic device. FIGS. 12A-12C are flow diagrams illustrating methods for the quiet mode feature. The user interfaces in FIGS. 11A-11Q are used to illustrate the processes described below, including the processes in FIGS. 12A-12C. It is noted that the processes and user interfaces described in all figures of this disclosure are not limited to the above-described correspondences. For example, FIG. 11Q illustrates an exemplary user interface for adjusting the brightness level of the display screen, as described in the processes at FIGS. 7 and 8.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
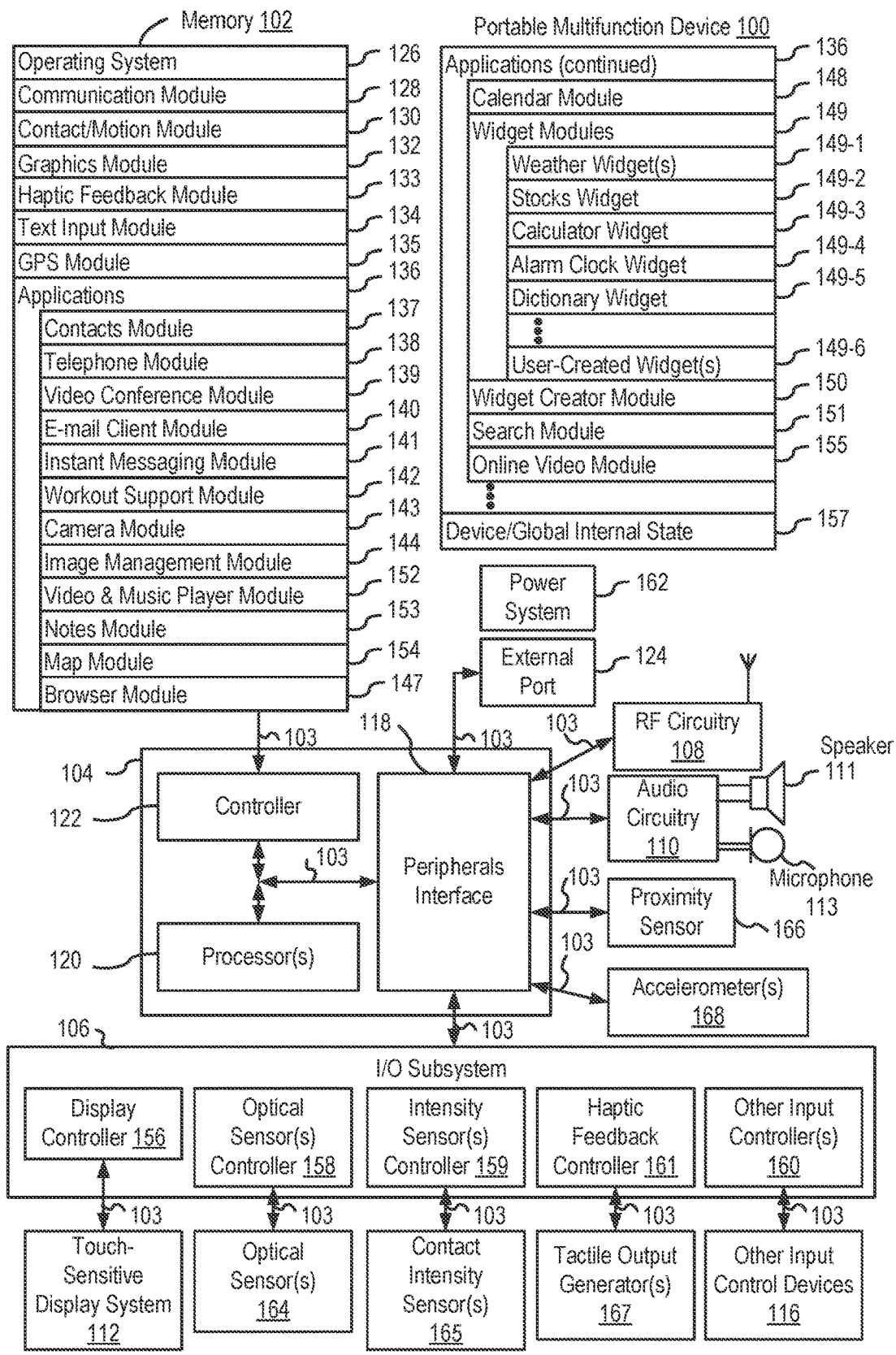
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
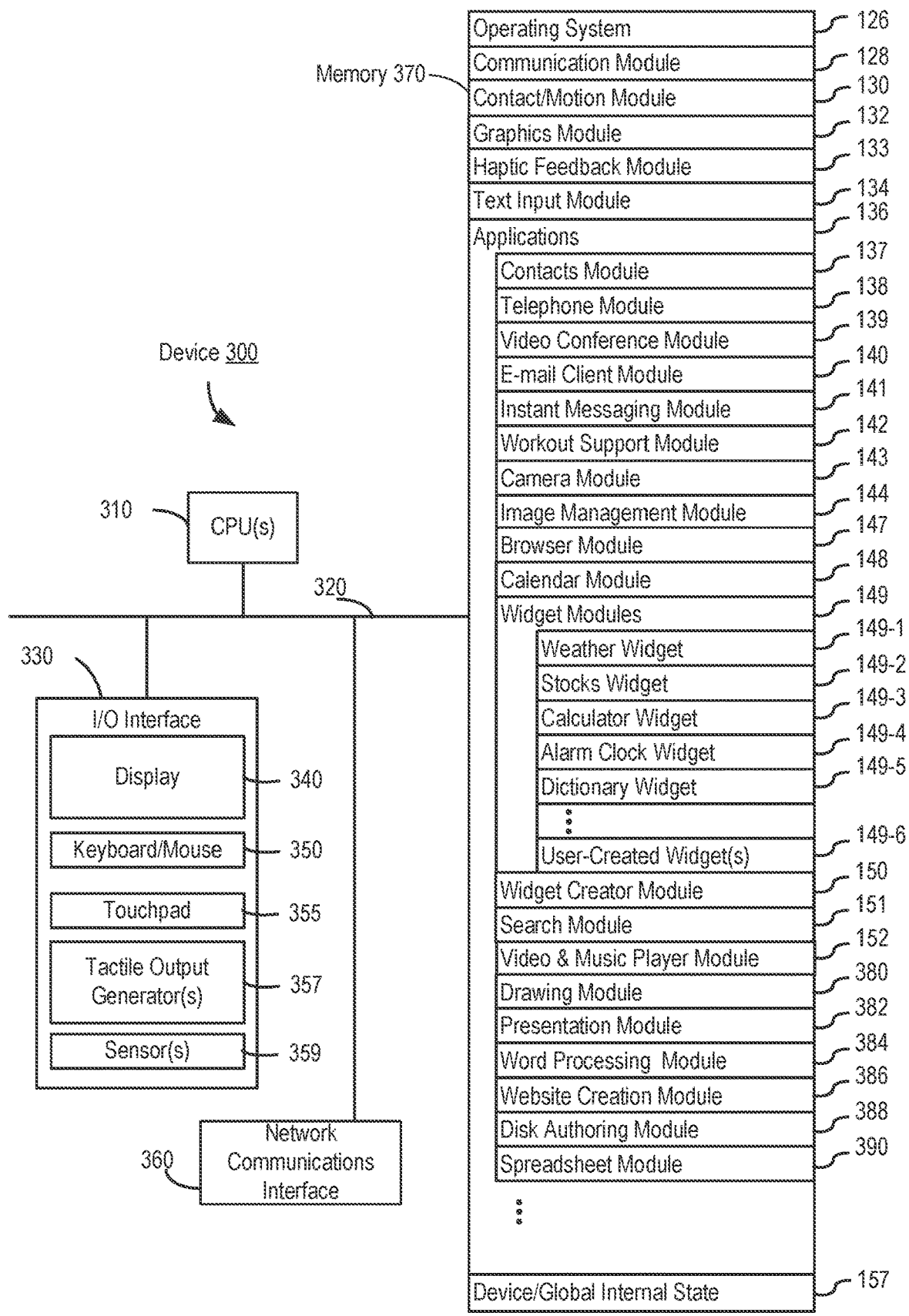
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
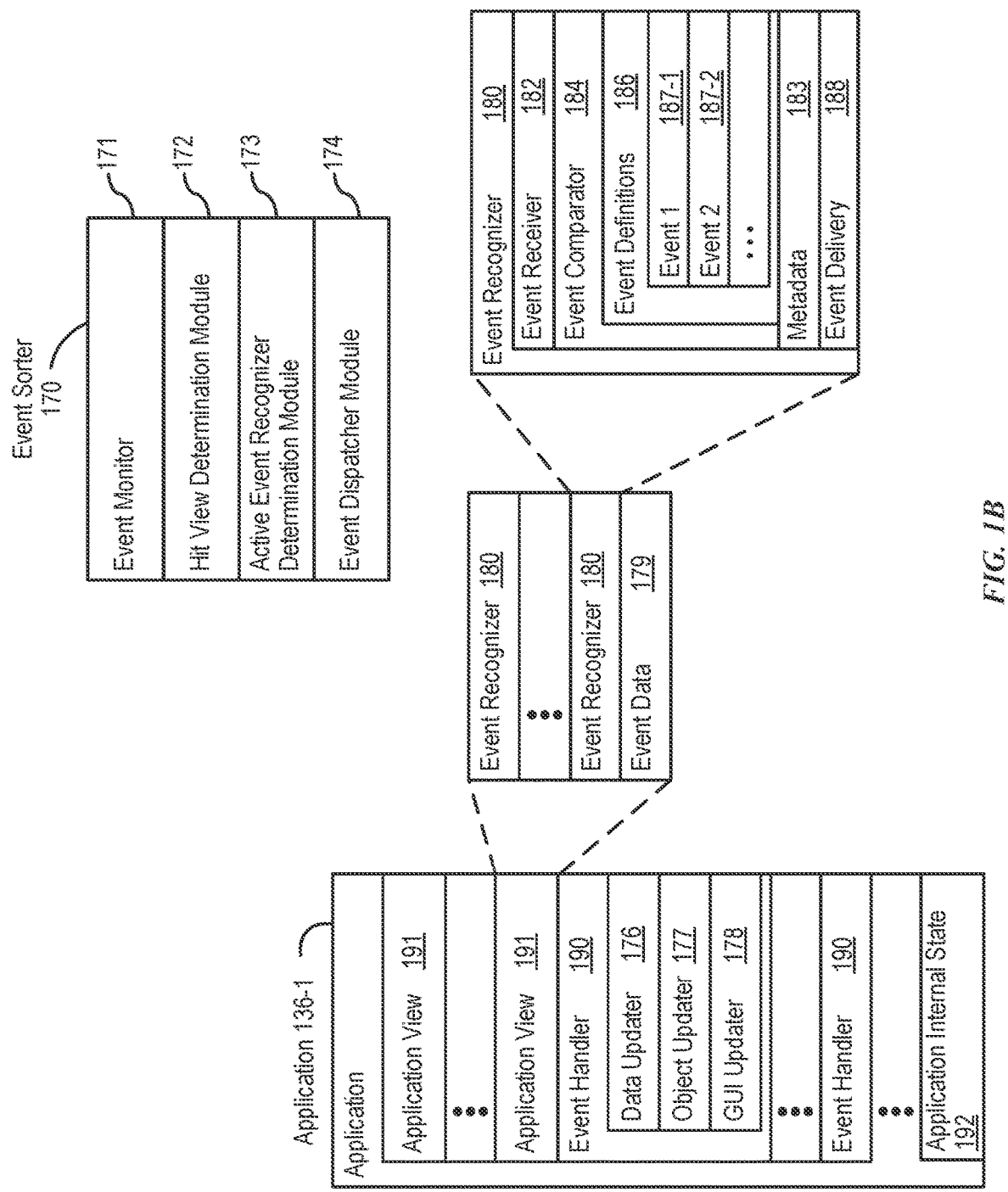
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
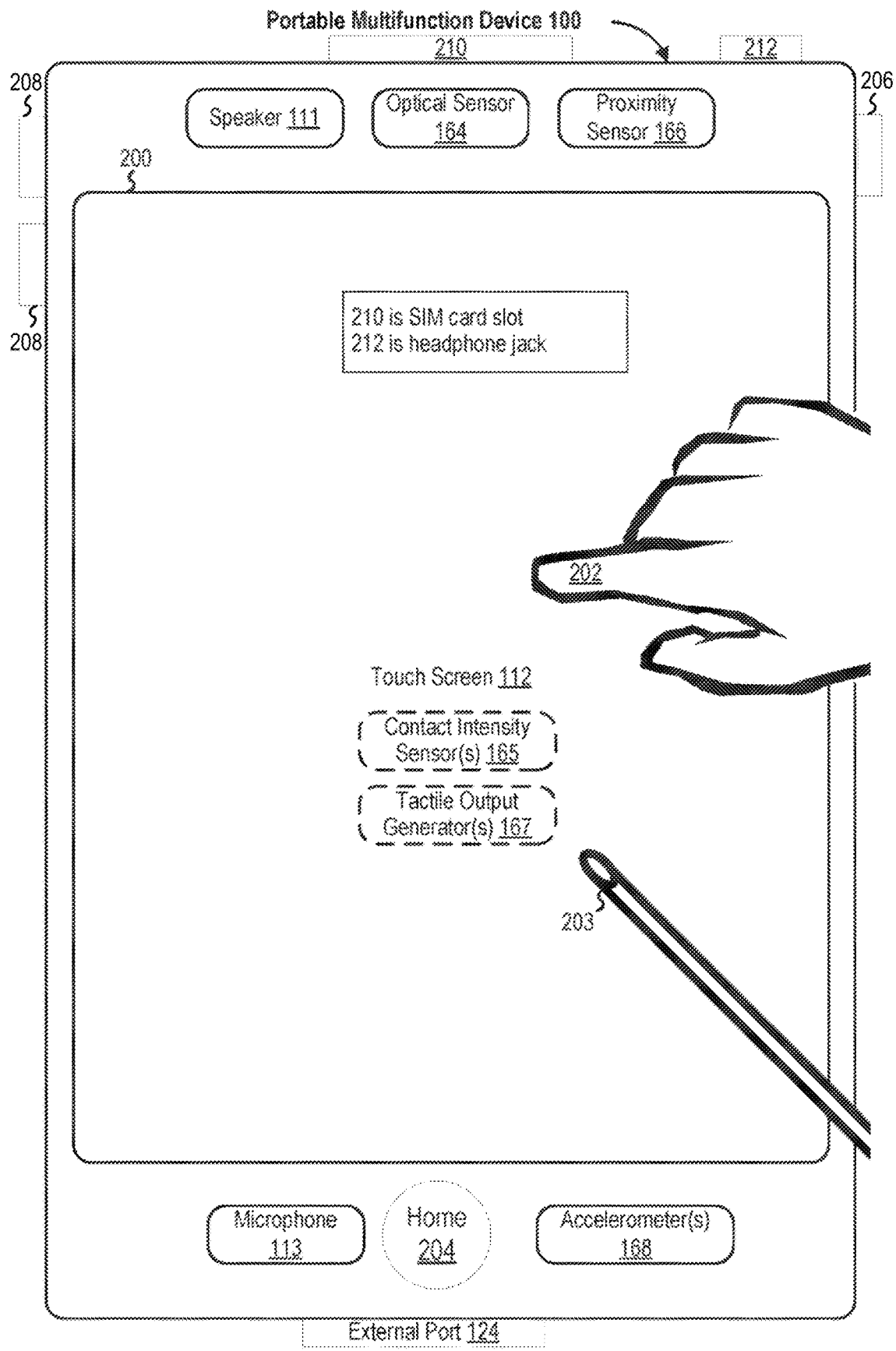
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
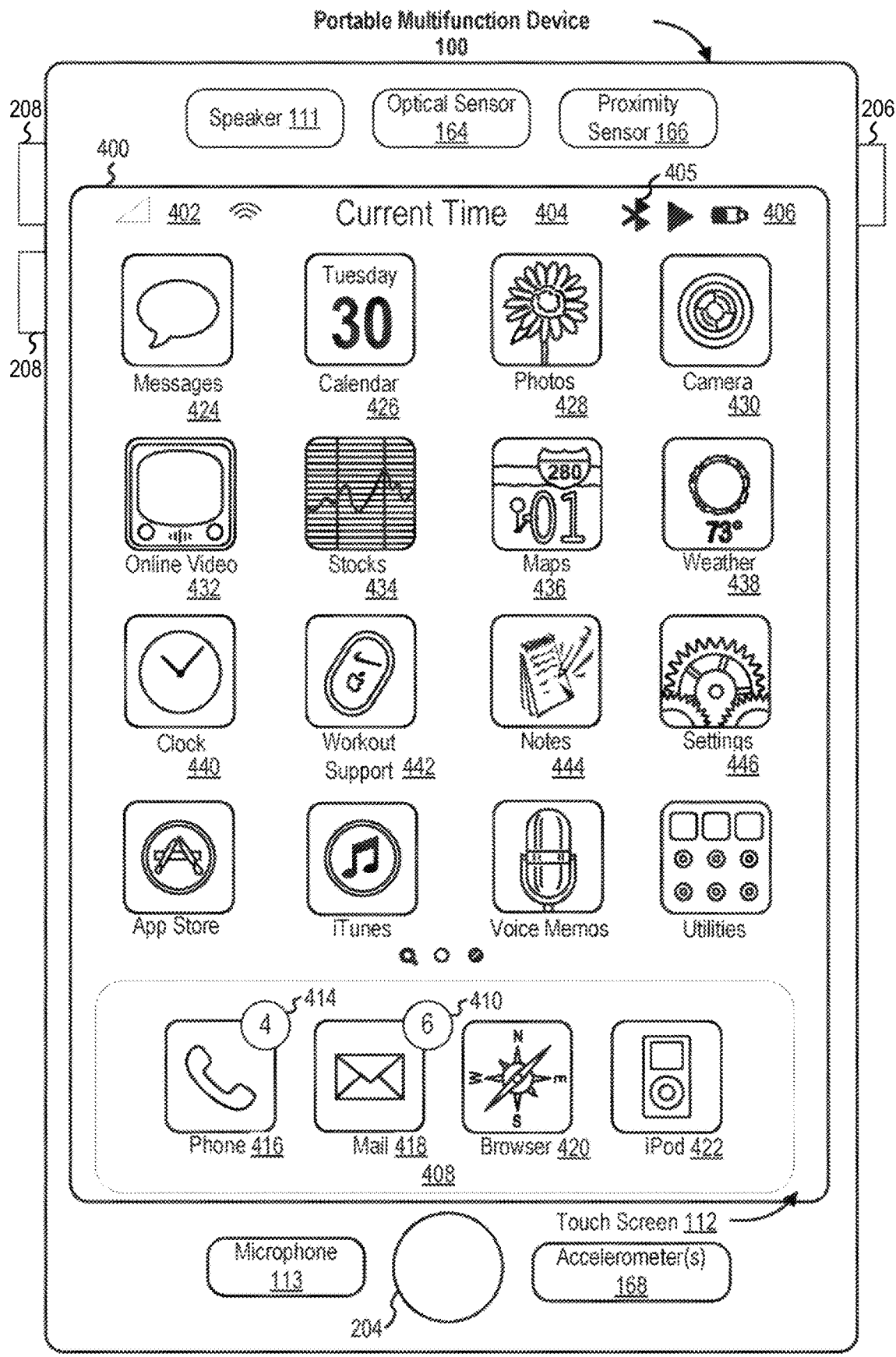
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
Icon 416 for telephone module 138, labeled "Phone," which optionally includes an indicator 414 of the number of missed calls or voicemail messages;
Icon 418 for e-mail client module 140, labeled "Mail," which optionally includes an indicator 410 of the number of unread e-mails;
Icon 420 for browser module 147, labeled "Browser;" and
Icon 422 for video and music player module 152, also referred to as iPod (trademark of Apple Inc.) module 152, labeled "iPod;" and
Icons for other applications, such as:
Icon 424 for IM module 141, labeled "Messages;"
Icon 426 for calendar module 148, labeled "Calendar;"
Icon 428 for image management module 144, labeled "Photos;"
Icon 430 for camera module 143, labeled "Camera;"
Icon 432 for online video module 155, labeled "Online Video;"
Icon 434 for stocks widget 149-2, labeled "Stocks;"
Icon 436 for map module 154, labeled "Maps;"
Icon 438 for weather widget 149-1, labeled "Weather;"
Icon 440 for alarm clock widget 149-4, labeled "Clock;"
Icon 442 for workout support module 142, labeled "Workout Support;"
Icon 444 for notes module 153, labeled "Notes;" and
Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
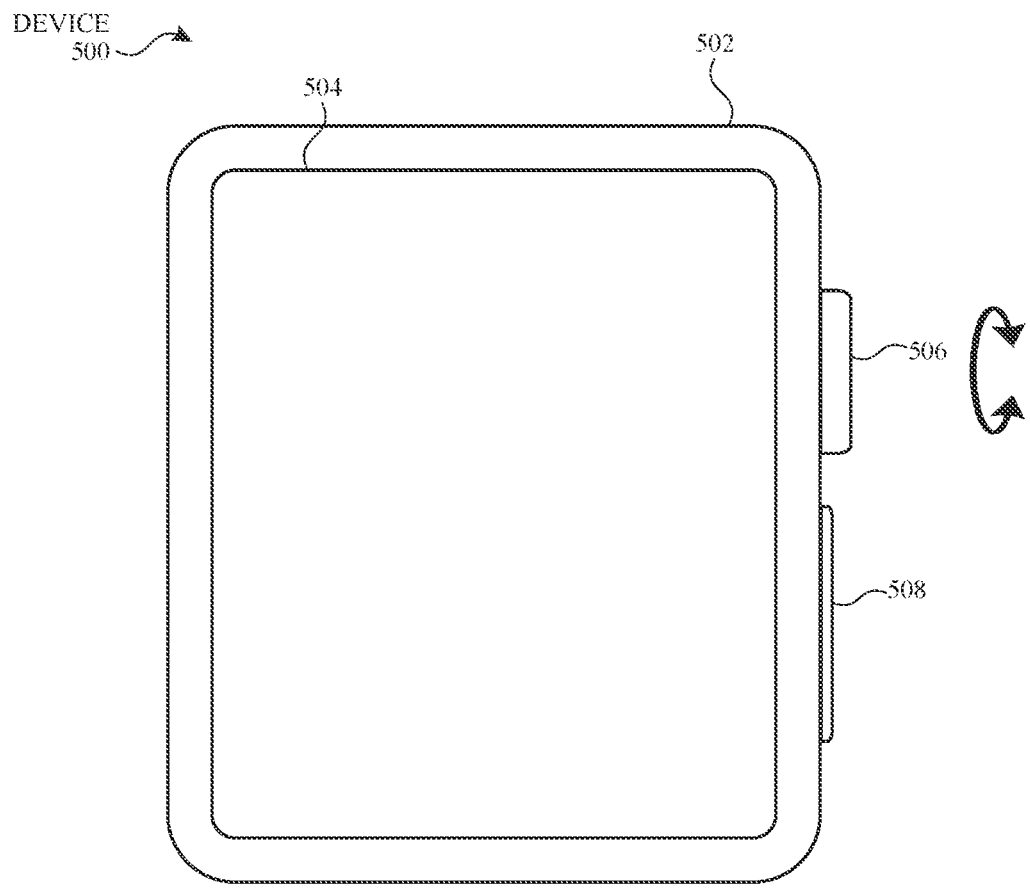
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
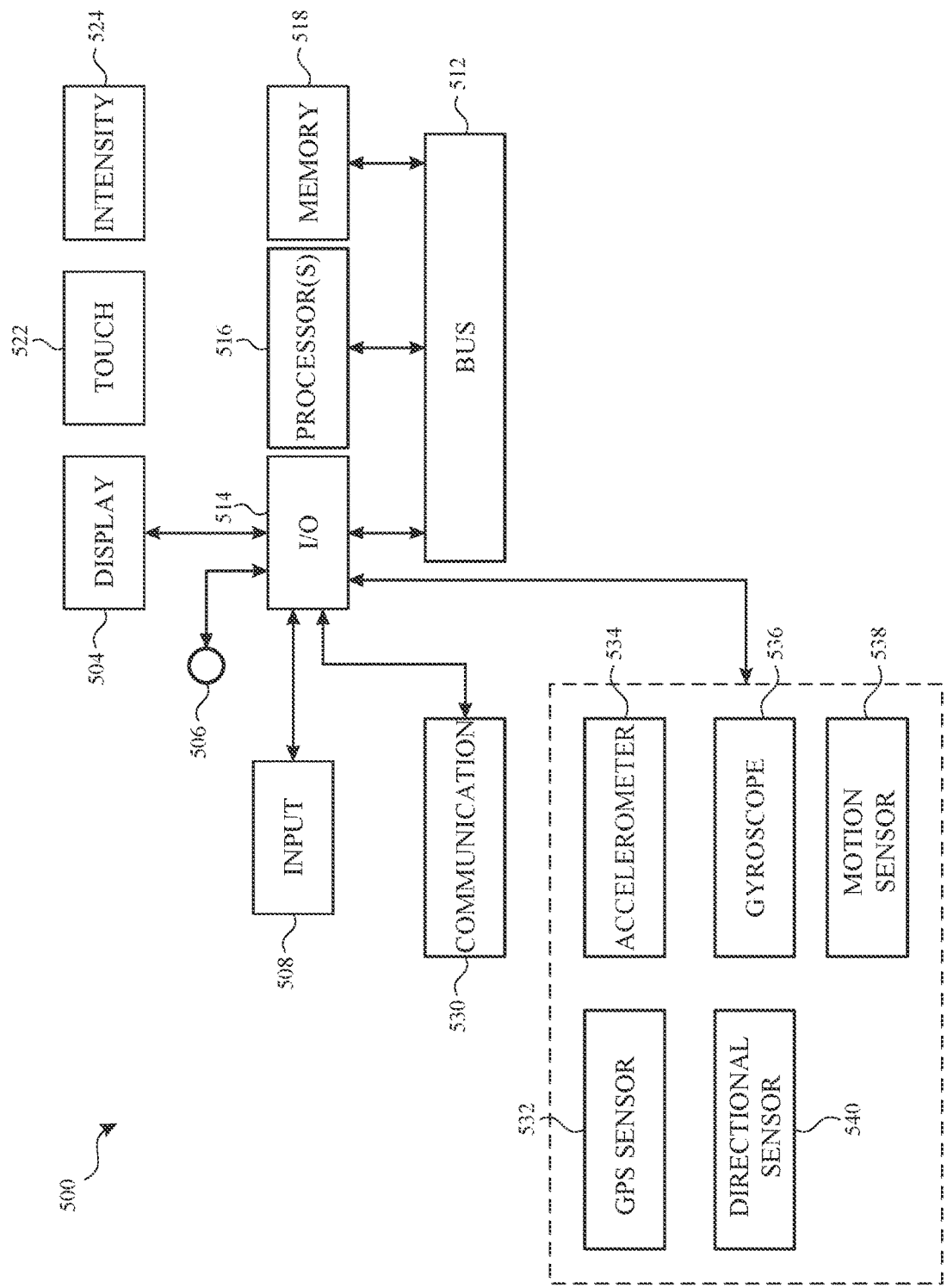
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 and 800 (FIGS. 7 and 8). Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1, 3, and 5). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6J illustrate exemplary user interfaces that demonstrate adjusting the brightness level of the display screen, in accordance with some embodiments. The user interfaces in these figures are used to illustrate the processes described below, including the processes in FIGS. 7 and 8.

Figure 6A:
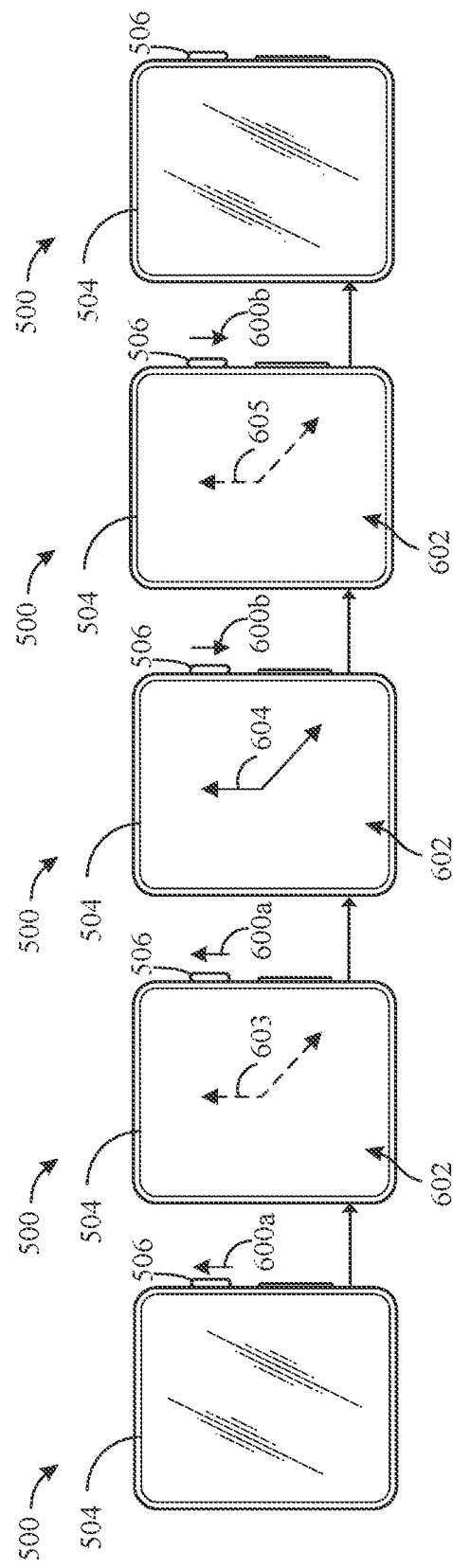
FIGS. 6A-6J illustrate exemplary user interfaces demonstrating adjustment of the brightness level, in accordance with some embodiments.

FIG. 6A illustrates an electronic device 500 transitioning between several states. The electronic device 500 has a touch-sensitive display screen 504 and rotatable input mechanism 506, among other elements which may be found above and/or as discussed at FIG. 5A. In the present example, device 500 is a wearable device such as a smart watch and rotatable input mechanism 506 is a rotatable crown.

At FIG. 6A, initially, the display screen 504 is off, inactive, or otherwise in a sleep, dark, or power saving mode. While the display screen 504 is off, a first input such as a rotation of the rotatable input mechanism 506 is detected, as indicated by arrow 600a. The device 500 determines whether the first input 600a meets a set of brightness configuration criteria. In response to a determination that the first input 600a meets the set of brightness adjustment criteria, the device 500 gradually increases the brightness level of the display screen 504, which displays user interface 602 (e.g., clock user interface with clock hands). In some examples, the brightness level changes in accordance with (or proportional to) a rotational speed of the first input 600a. For instance, a user rotates the rotatable input mechanism 506 faster or slower to change the brightness level quickly or more gradually. As shown in FIG. 6A, the clock user interface 602 includes clock hands and transitions from a first state 603 to a second, brighter state 604 as the first input 600a is received.

In response to a determination that the first input 600a does not meet the set of brightness adjustment criteria, the device 500 does not increase the brightness level of the display screen 504. In some examples, if the first input 600a is received while the display screen 504 is in the off or dark state, the display screen 504 may remain in the off state. Merely by way of example, a setting for the brightness adjustment mode may be turned off.

As further shown in FIG. 6A, the device 500 can receive a second input having a second rotation direction that is opposite the first rotation direction, as indicated by arrow 600b. In response to receiving the second input 600b, the device 500 can decrease the brightness level toward a minimum brightness level. For example, the clock user interface 602 transitions from the second state 604 to a third, less bright and more faded state 605. As shown in FIG. 6A, a user may continue to rotate the rotatable input mechanism 506 in the second direction until the display screen 504 gradually turns off.

It is contemplated that the direction of the first input 600a can be in either of two directions of rotation offered by the rotatable input mechanism 506, while the second input 600b corresponds to a direction opposite the first direction. In some examples, the set of brightness criteria includes a criterion that the first input must include a rotational direction in a predetermined direction to initiate adjustment of the brightness level. For ease of illustration, FIGS. 6A-6D illustrate a clockwise direction of rotation for the first input at the rotatable input mechanism 506, although in some examples, the first input may include a counterclockwise direction of rotation (see, e.g, FIG. 6E below).

As discussed further below, the set of brightness adjustment criteria can be based on one or more states of the device while the first input is received, a threshold rotational speed, a threshold duration of rotation, a predetermined direction of rotation, and/or any combination thereof. In some examples, increasing the brightness level includes using alpha blending without altering a backlight of the electronic device to create a simulated or real backlight level. For instance, the device can alpha blend a user interface 602 displayed on the display screen 504 with an increasingly transparent masking layer to increasingly brighten the display screen 504 so that the user interface 602 screen fades in. In that case, the masking layer becomes less and less alpha as the brightness level of the display screen 504 increases. In some examples, the device can alpha blend the user interface with a semi-transparent masking layer to yield a semi-bright user interface 602 displayed on the display screen 504. In some examples, the device can alpha blend the user interface with an opaque black masking layer, such as a layer that increases in alpha to yield an absolute black screen so that the display screen 504 can appear to be off or asleep.

Figure 6B:
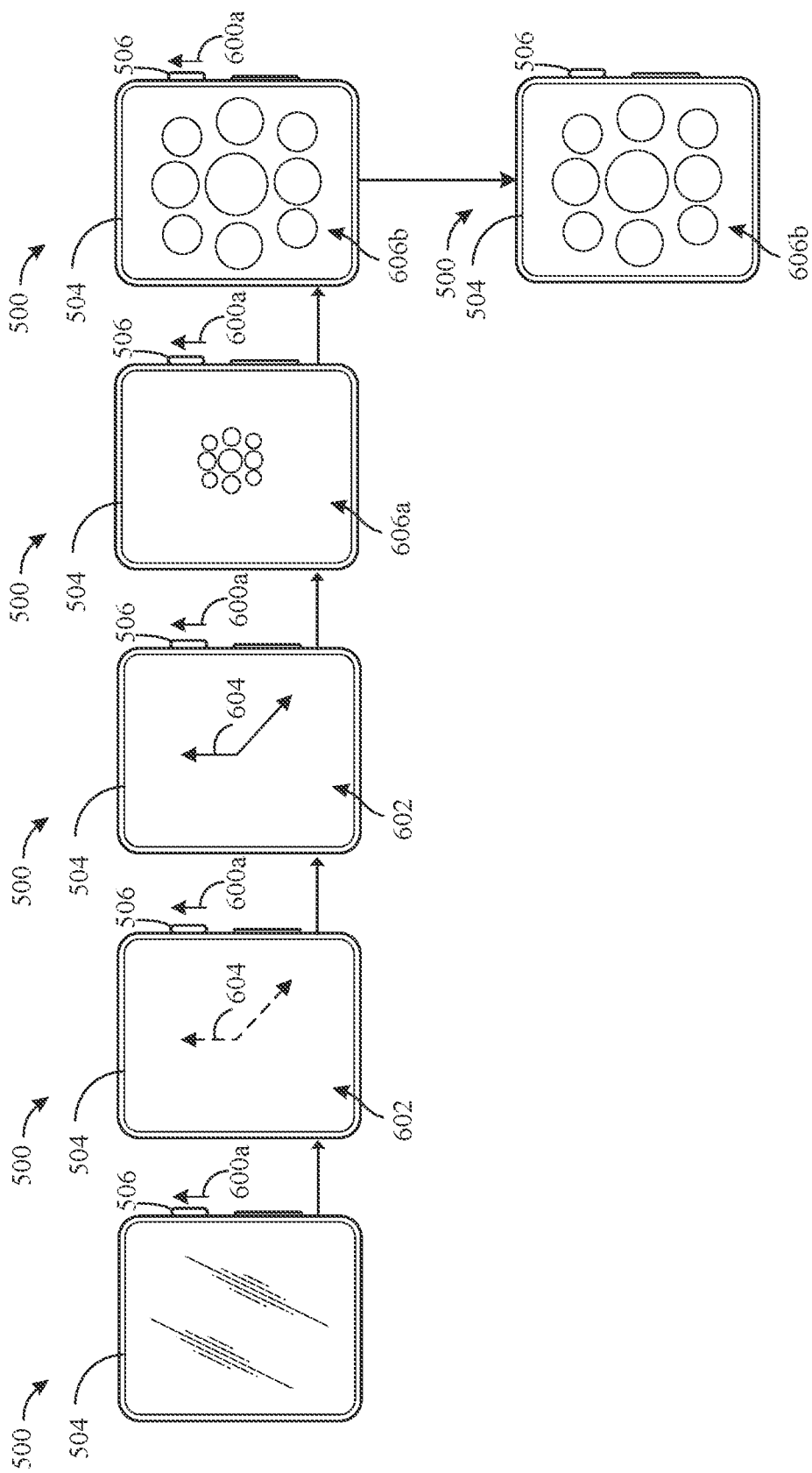

In an example shown in FIG. 6B, a user may continue to rotate the rotatable input mechanism 506 in the first direction defined by the first input 600*a*. In this case, a maximum brightness level may be reached such that continued rotation of the rotatable input mechanism 506 causes other functions on the device to be activated. For example, a home applications user interface 606*a* or 606*b* having a plurality of application affordances for launching applications on the display screen 504 may be displayed at the maximum brightness level. In this case, continued rotation of the rotational input mechanism 506 may transition the first user interface 602 to the second user interface 606*a* or 606*b*, and continue to zoom into the second user interface 606*a* or 606*b* (e.g., from first zoom level 606*a* to second zoom level 606*b*) until a maximum zoom level is reached. It is contemplated that a zooming speed is proportional to the rotational speed of the rotational input mechanism 506. In some examples, a user may resume to an initial dark or inactive state by other gestures, such as covering the display screen 504 over a substantially entire surface of the display screen 504, by depressing, rather than rotating, the rotatable input mechanism 506, or other gestures. Further as shown in FIG. 6B, continued rotation of the rotational input mechanism after the maximum brightness level has been reached and/or after zooming has been completed may not change the display screen 504 or contents displayed thereon. For example, while the second user interface at the second zoom level 606*b* is displayed, further detection of the first input 600*a* does not alter the display screen 504.

Figure 6C:
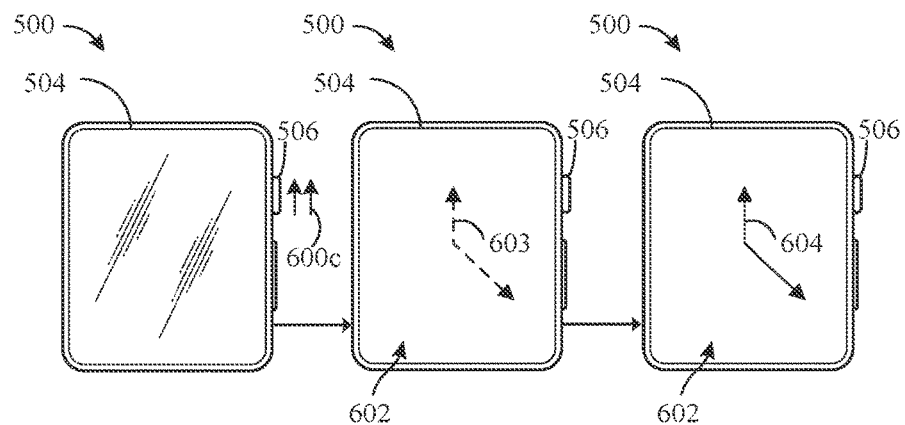

Turning to FIG. 6C, in some examples, device 600 can automatically brighten or dim the display screen 504 to a maximum or minimum brightness level, respectively. For example, while in the display off state, a first user input corresponding to quick rotation or flick, as indicated by arrows 600*c*, (e.g., flick in either direction) of the rotatable input mechanism 506 is registered as a request to automatically increase the brightness level to a maximum brightness level (e.g., from first state 603 to second state 604 of the clock user interface 602). In this case, as shown in FIG. 6C, no further user input or rotation is required after the quick gesture, as the device automatically brightens the display screen 504 to a maximum brightness level. In some examples, while the display screen 504 is at the maximum brightness level, a user flick in a second direction opposite the first direction can automatically dim the display screen 504 toward the minimum brightness level (e.g., turn screen off). Other user gestures may also automatically brighten or dim the screen, such as a user tap detected on the display screen 504 (see, e.g., FIG. 6F below).

Figure 6D:
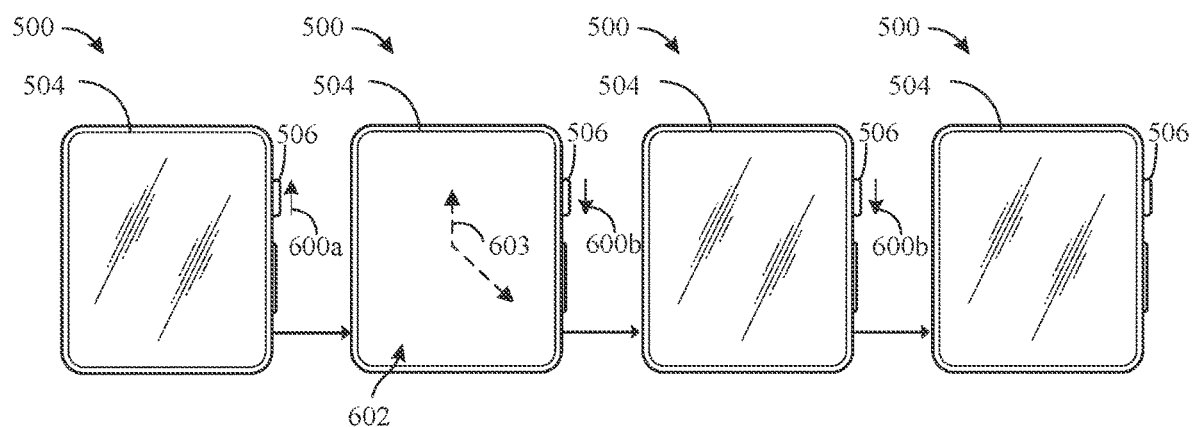

Turning now to FIG. 6D, in some examples, the first input 600*a* increases the brightness level of the display screen toward the maximum brightness level (e.g., the clock user interface 602 is semi-faded in to the first state 603), but prior to reaching the maximum brightness level (e.g., user input ceases before reaching the maximum), the second user input 600*b* having the second direction opposite the first direction is received. In response to the second input 600*b*, the device decreases the brightness level toward the initial, dark state, where further continued rotation in the second direction after the minimum brightness level does not alter the brightness level of the display screen 504. It is contemplated that the user may alternately brighten or dim the display screen 504 as desired by simply rotating the rotatable input mechanism 506 in opposing directions.

Figure 6E:
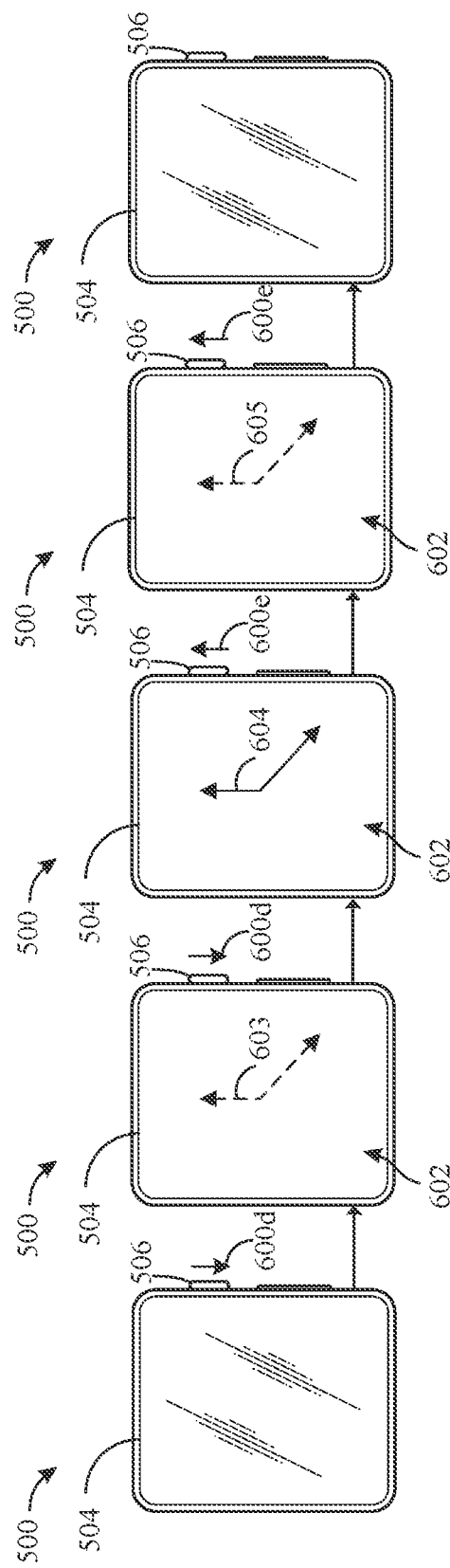

FIG. 6E demonstrates an example new brightness configuration session that is different from the brightness configuration session shown in FIG. 6A. For example, in FIG. 6E first input 600*d* includes a rotation in a counterclockwise direction, which is opposite the direction of rotation of the first input 600*a* in FIG. 6A. Still, the first input 600*d* at FIG. 6E, upon meeting brightness configuration criteria, is defined as a request increase a brightness level of the display screen 504 such that rotations in the first direction increase the brightness of the display screen, and subsequent rotational inputs in a second direction 600*e* opposite the first direction decrease the brightness level.

Figure 6F:
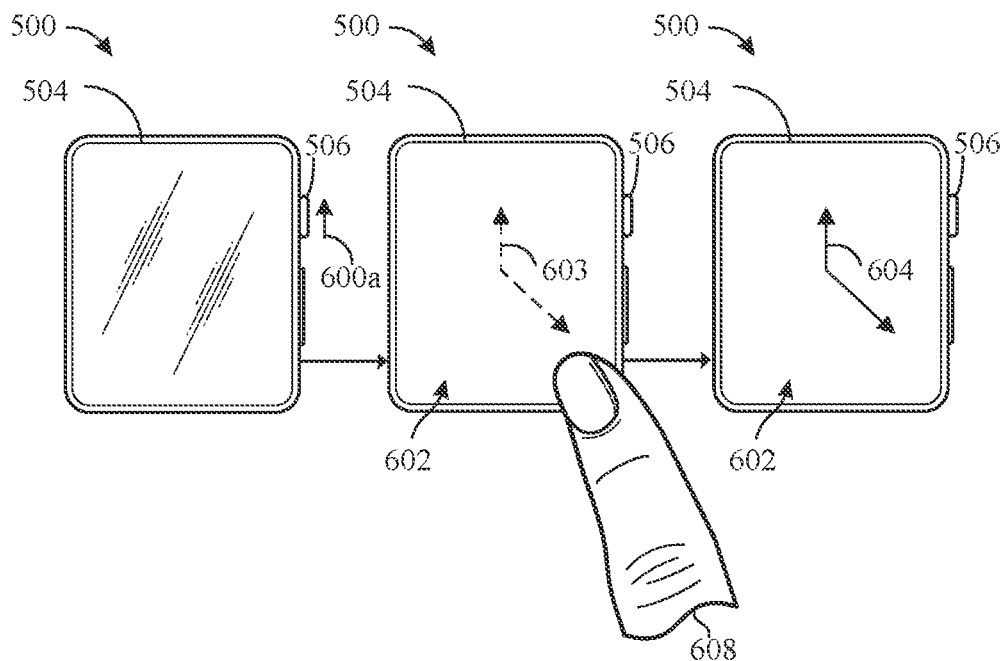

Turning to FIG. 6F, in another example, while the display screen is off, first input 600*a* in a first direction of rotation at the rotatable input mechanism 506 is detected, causing gradual fade-in of the user interface 602 (e.g., clock user interface 602 fades into view at first state 603). A touch gesture 608 (e.g., tap on display screen 504) is detected while the display screen is at a brightness level that is lower than a predetermined brightness level. In response to the touch gesture 608, the device automatically adjusts the brightness level at a constant and accelerated rate toward the maximum brightness level (e.g., clock user interface 602 progresses in brightness from first state 603 to second state 604). In this way, the touch gesture 608 completes the brightness level adjustment without need for further user input at the rotatable input mechanism 506. In another example, where a user input at the rotatable input mechanism 506 includes a rotation that corresponds to decreasing the brightness level, a subsequent touch gesture can complete the dimming or fading-out of the user interface 602 until the minimum brightness level is reached (e.g., display screen off).

Figure 6G:
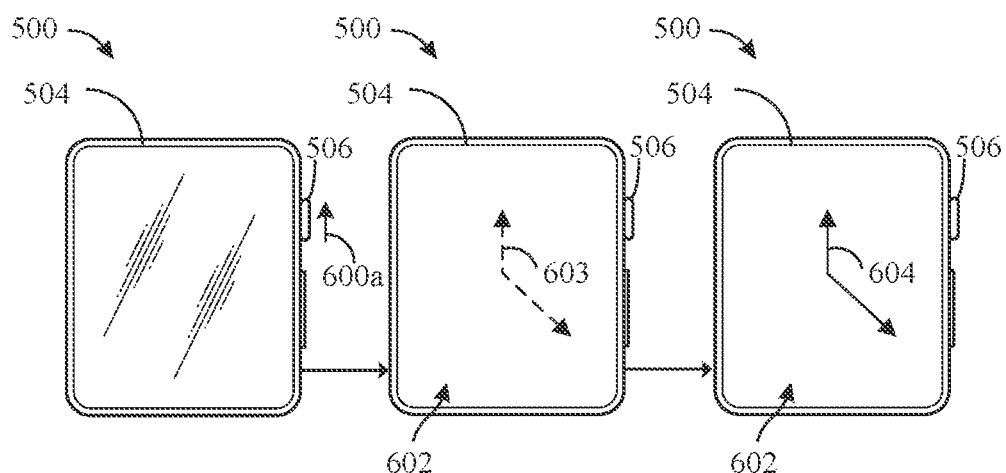

As shown in FIG. 6G, the device automatically completes adjusting the brightness level to meet a maximum brightness level upon reaching a threshold upper level. Here, first input 600*a* causes the clock user interface 602 to fade into view at first state 603, in which the brightness level of the first state 603 satisfies the threshold upper level for automatic brightening. As such, the clock user interface 602 continues to automatically progress from first state 603 to second state 604 that includes the maximum brightness level. As shown, no user input is required once the first state 603 is reached to progress to second state 604. In practice, the user does not need to provide further rotational inputs, or any inputs, once automatic adjustment is instantiated by meeting the maximum threshold brightness level (see, e.g., FIG. 6G). In similar fashion, the device may automatically complete adjusting the brightness level to meet a minimum brightness level upon reaching a threshold lower level.

Figure 6H:
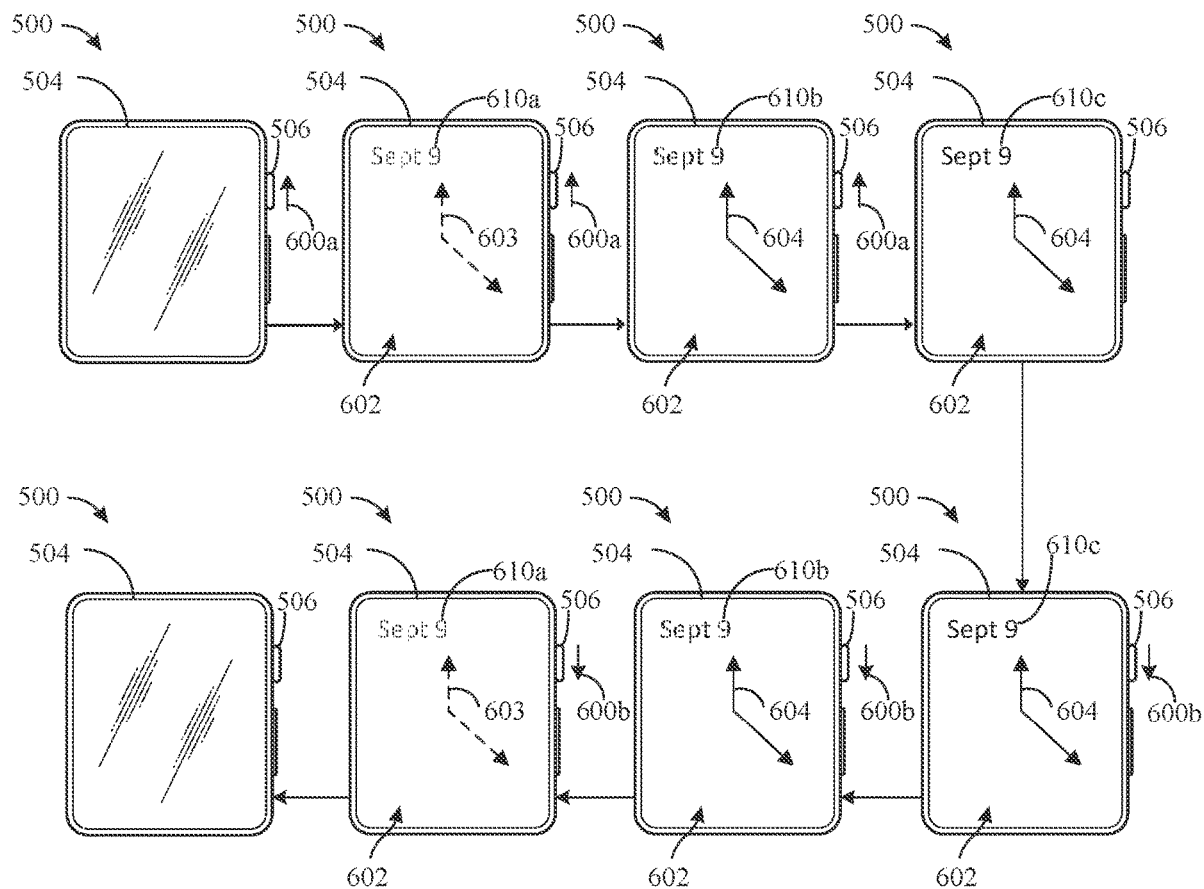

As shown in FIG. 6H, differential brightening of a user interface 602 having first element (e.g., clock hands) and second element (e.g., date, "September 9") is implemented on the display screen 504. The device 500 adjusts a brightness level of the first element at a different rate than a brightness level of the second element. The brightness levels of the first element and second element can be adjusted simultaneously at the different rates so that the first element reaches a maximum brightness level more quickly than the second element. Each of the different rates may further be dependent on the rate of rotation at the rotatable input mechanism 506. As demonstrated at FIG. 6H, rotation of the rotatable input mechanism 506 causes faster fade-in of the first element (e.g., clock hands transition from first state 603 to second state 604 which includes the maximum brightness level) and slower fade-in of the second element (e.g., date transitions from first state 610a, to second state 610b, to third state 610c which includes the maximum brightness level), such that the first element reaches the maximum brightness level more quickly than the second element. As further shown in FIG. 6H, when decreasing the brightness level of the display screen 504 in response to second input 600b, the second element (date) may begin to fade out first and more quickly than the first element (clock hands), such that the first element is displayed just before the display screen 504 turns off.

Figure 6I:
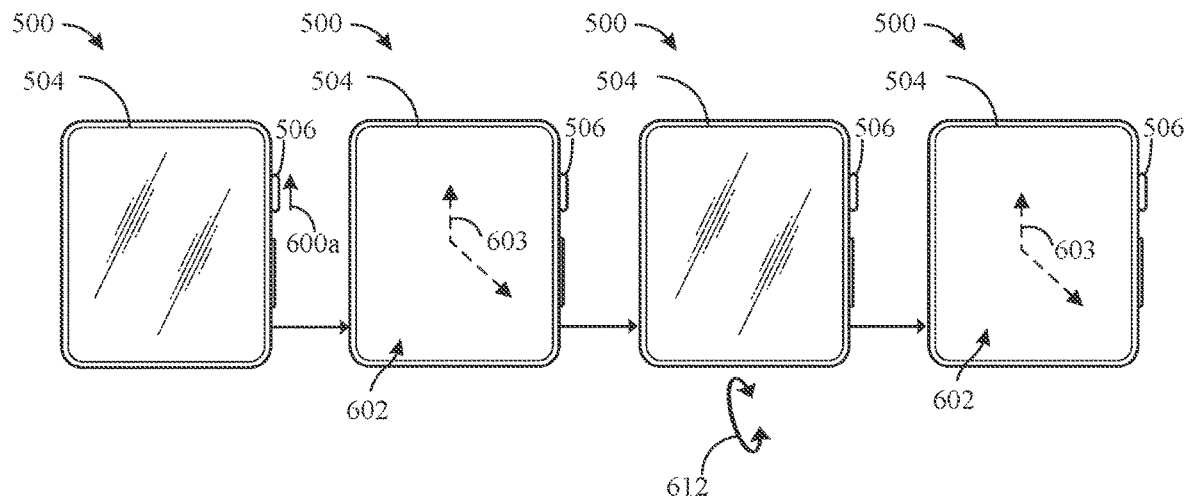

Turning now to FIG. 6I, in response to first input 600a, the device 500 fades-in user interface 602 to first state 603. While in the first state 603, no user input is detected at the device or on the display screen 504 for a predetermined period of time. After lapse of the predetermined period of time, the user interface 602 fades away toward the minimum brightness level, such as the display off state. While in the display off state, the device detects a user input 612 (e.g., wrist turn or wrist raise) to turn on the display screen 504. When the user input 612 is received within a predefined timeframe from when the display becomes inactive, the device turns on the display screen 504 by resuming to a brightness level (e.g., first state 603) detected prior to turning off the display screen (see, e.g., FIG. 6I). The device may gradually fade-in the previously displayed user interface 602 to the previously-detected brightness level, or instantaneously display the user interface 602 at the previous brightness level without a fade-in effect. As shown, the previously detected brightness level may be between the maximum and minimum brightness levels (e.g., first state 603), and the defined directions of rotation for increasing and decreasing the brightness level may still apply once resumed.

Figure 6J:
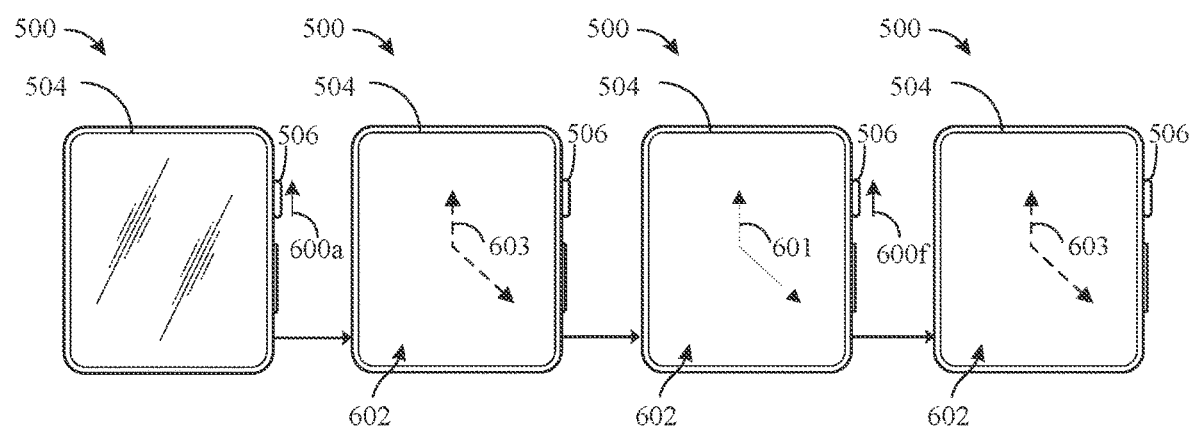

As shown in FIG. 6J, in response to first input 600a, the device gradually fades-in the user interface 602 to first state 603. After lapse of the predetermined period of time where no user input is detected, the display screen 504 automatically decreases in brightness level to a faded state 601. While automatically decreasing the brightness level, the device detects a second user input 600f having the same rotational direction as the first direction of the first input 600a. In response to detecting the second user input 600f, the device increase the brightness level back to first state 603 and thereby resumes or otherwise re-enters the brightness configuration session.

FIG. 7 is a flow diagram illustrating a method for adjusting a brightness level of a display screen using an electronic device in accordance with some embodiments. Method 700 is performed at a device (e.g., 100, 300, 500) with a display screen and a rotatable input mechanism. Some operations in method 700 are, optionally, combined, the order of some operations are, optionally, changed, and some operations are, optionally, omitted.

As described below, method 700 provides an intuitive way for adjusting a brightness level of a display screen. The method reduces the cognitive burden on a user for adjusting a brightness level of the display screen, thereby creating a more efficient human-machine interface. For battery-operated computing devices, enabling a user to adjust a brightness level of the display screen faster and more efficiently conserves power and increases the time between battery charges.

As shown in method 700, the device (702) can optionally receive a first input (e.g., first input 600a of FIG. 6A) corresponding to a rotation of a rotatable input mechanism (e.g., rotatable input mechanism 506 of FIG. 6A). In some cases, the device can detect a rotational speed and a first direction of the rotation at the rotatable input mechanism. Receiving input at the rotational input mechanism enhances the operability of the device by enabling the user to access brightness configuration features quickly and efficiently.

The device (704) can optionally, in accordance with or in response to a determination that the first input (e.g., first input 600a of FIG. 6A) meets a set of brightness adjustment criteria, increase the brightness level of the display screen (e.g., display screen 504 of FIG. 6A). The set of brightness adjustment criteria can include a criterion that is met when a brightness level of the display screen is below a predetermined brightness level. In some examples, the predetermined brightness level is a level that corresponds to the display screen being initially off, inactive, or dark. In some examples, the determination is based on a state of the electronic device when the first input is received. Such states can include a state of the display screen and whether the display screen is in an on or awake state, or off or asleep state. In some examples, the state of the electronic device can include a setting of the electronic device, such as a setting of a screen brightening capability feature and whether that setting is on or off. Increasing the brightness level of the display screen in response to a determination that the user input at the rotatable input mechanism meets the set of brightness configuration criteria enhances the operability of the device by permitting other types of inputs directed to activating other functions at the device to be received at the same input-receiving mechanism, which further reduces the need for additional input-receiving components.

In some examples, the determination that the first input meets a set of brightness adjustment criteria is based on a rotational speed of the rotation of the rotatable input mechanism that meets a threshold rotational speed. In some examples, the determination is based on whether a duration of the rotation of the rotatable input mechanism in the first direction meets a threshold duration. In some examples, the determination is based on whether the first direction of the rotation corresponds to a predetermined direction, and/or whether the first direction at a first rotational speed meets the threshold rotational speed or the threshold duration.

The device (706) can optionally, in accordance with a determination that the first input (e.g., first input 600a of FIG. 6A) does not meet the set of brightness adjustment criteria, forgo increasing the brightness level of the display screen. For example, the device can maintain a current brightness level of the display screen. The brightness level of the display screen is not altered in response to the first input. In some examples, the display screen remains off or dark. In some examples, another function is performed at the device in response to the first input where the function is other than adjusting the brightness level of the display screen. The other function can be determined based on the first input. Forgoing adjustment of the brightness level of the display screen in response to a determination that the user input at the rotatable input mechanism does not meet the set of brightness configuration criteria enhances the operability of the device by permitting other types of inputs directed to activating other functions to be received at the same input-receiving mechanism, which further reduces the need for additional input-receiving components. Enabling the rotatable input mechanism to receive other types of inputs directed to other functions enhances versatility of the additional hardware component provided on limited-sized electronic devices, such as the wearable watch contemplated herein, In some embodiments, in response to or based on receiving the first input, the device determines whether the set of brightness adjustment criteria is met. For example, the device can determine whether the first input corresponds to a request to brighten the display screen from a dark or sleep state.

In some embodiments, the set of brightness adjustment criteria includes a criterion that is met when the display screen is initially off. For example, an initial brightness level of the display screen is below the predetermined brightness level, which may correspond to a low brightness level or lack of brightness for an off state. Initiating the screen brightening capabilities from an off or dark state of the display screen permits the user to access a wide range of brightness levels, which may offer enhanced user privacy and satisfaction.

In some embodiments, the set of brightness adjustment criteria includes a criterion that is met when a brightness adjustment mode is on. For example, the brightness adjustment function can be active or enabled through a systems setting interface. Requiring that the brightness adjustment mode is on as a criterion for satisfying the set of brightness adjustment criteria enhances operability of the device by preventing unintended rotational inputs from altering the brightness level and allows the user to customize when and how the screen brightening feature is applied.

In some embodiments, in accordance with the determination that the first input does not meet the set of brightness adjustment criteria, the device performs a function other than adjusting the brightness level. For instance, the device can forgo entering a brightness configuration session.

In some embodiments, in accordance with the determination that the first input meets the set of brightness adjustment criteria, the device enters a brightness configuration session. For example, the device starts a brightness configuration session that defines the direction of the rotation as a request to increase the brightness level and adjusts the brightness level.

As shown in method 700, in some embodiments, the device (708), in accordance with the determination that the first input meets the set of brightness adjustment criteria, defines a first rotation direction based on the first input as a request to increase the brightness level of the display screen during the brightness configuration session. Defining may include registering or setting the first direction of the rotation as a direction corresponding to increasing brightness of the display screen. The device can define a second rotation direction opposite the first rotation direction as a request to decrease the brightness level during the brightness configuration session (see, e.g., first input 600*a* and second input 600*b* in FIG. 6A). In some cases, the defined requests for increasing or decreasing the brightness level are temporarily defined for the particular brightness configuration session, until the display screen turns off, and/or until a maximum/minimum brightness level is met. In some cases, subsequent rotational inputs in the first or second direction no longer alter the brightness, and/or are redefined when a subsequent rotational input is received when the display screen is off. Defining or redefining can include overwriting a previously stored direction of rotation that was previously associated with a request to increase the brightness level (and similarly, a previously stored direction associated with decreasing the brightness level). Defining the first rotation direction based on the first input as a request to increase the brightness level enhances operability of the device by allowing any rotational direction of the user input to access the brightness configuration features described herein, which enhances operability of the device and reduces a number of inputs needed.

As shown in method 700, in some embodiments, the device (710), after receiving the first input, can receive a second input (e.g., second input 600*b* at FIG. 6A) having the second rotation direction opposite the first rotation direction, and in response to receiving the second input, decrease the brightness level while maintaining the brightness configuration session. For example, in some cases, the second input is received within a threshold time period of receiving the first input. In some examples, the second input immediately follows the first input when the direction of rotation changes from the first direction to the second direction. The brightness configuration session may be maintained while receiving the second input. Decreasing the brightness level (while maintaining the brightness configuration session) in response to the second input enhances operability of the device by providing the user with a quick and efficient way to reduce the brightness level after it has been increased according to the first input. This reduces power usage and improves battery life of the device, while saving user time.

In some embodiments, the device can define a new brightness configuration session with new directions of rotation. For example, the device can optionally, upon lapse of a threshold period of time after receiving the first input, exit the brightness configuration session. After exiting the brightness configuration session, the device can receive a third input corresponding to rotation of the rotatable input mechanism in a third direction opposite the first direction (see, e.g., first input 600*a* at FIG. 6A and opposite first input 600*d* at FIG. 6E). In accordance with a determination that the third input meets the set of brightness adjustment criteria, the device can increase the brightness level and entering a new brightness configuration session. In practice, direction-independence of the rotatable input mechanism for initiating the screen brightening functions disclosed herein enhances operability of the device by permitting any user to adjust the screen brightness quickly and efficiently, without requiring the user to recall or guess at which direction to rotate.

In some cases, lapse of the threshold period of time may correspond to a pause in user input. In some cases, the second input is received after a threshold time period of receiving the first input. After the threshold period of time, the first direction is no longer associated with a request to increase the screen brightness level because the request is reset. In some examples, in the new brightness configuration session, the third direction is associated with a request to increase the brightness level of the display screen and a fourth direction opposite the third direction decreases the brightness level (see, e.g., first input 600*a* at FIG. 6A and opposite first input 600*d* at FIG. 6E).

In some embodiments, while in the new brightness configuration session, the device receives a fourth input corresponding to a rotation in a fourth rotation direction opposite the third rotation direction. Still in some cases, the fourth direction can be in the same direction as the first direction of the first input, and/or is opposite the second direction of the first input. In response to receiving the fourth input, the device can decrease the brightness level while maintaining the subsequent brightness configuration session (see, e.g., second input 600*b* at FIG. 6A and opposite second input 600*e* at FIG. 6E).

In some embodiments, increasing the brightness level of the display screen includes changing the brightness level at a variable rate based on a rotational velocity of the rotational input. For example, the device can adjust the brightness level based on a rotational velocity of the user input. An initial rotational component of the first rotational input can turn the display screen on (e.g., wakes display screen), and the user can gradually increase from an alpha-blend absolute black screen to a brighter screen at a variable rate that varies in accordance with, or is proportional to, the rotational velocity created by the user input. Changing the brightness level at the variable rate that varies based on the rotational velocity of the rotational input allows the user to decide, while viewing the device, how quickly and to what level the brightness level of the display screen should change, which enhances operability of the device and user satisfaction.

In some embodiments, the device adjusts the brightness level by alpha blending a user interface displayed on the display screen with a masking layer, such as a black or opaque layer. The masking layer can increase in transparency (or otherwise decrease in opacity) to increase the brightness level towards a maximum brightness level. In some examples, increasing or decreasing changes to the masking layer occurs in response to, and/or at a rate proportional to the rotational velocity and direction of the input. The masking layer can decrease in transparency (or otherwise increase in opacity) to decrease the brightness level towards a minimum brightness level. In practice, alpha blending adjusts the brightness level without having to alter a backlight level, which may reduce power usage and improve battery life of the device. In some cases, an opaque masking layer is a fully saturated black layer. In some examples, the maximum and minimum brightness levels depend on maximum and minimum backlight levels that are further based on a user configuration and/or an ambient light level detected at an ambient light sensor ("ALS"). In some examples, a night screen brightening session includes a different color hue, such as a red-tone masking layer for alpha blending. Different screen brightening sessions can be enabled according to ALS readings or time-of-day.

In some embodiments, in accordance with a determination that a maximum brightness level is met, the device ceases the alpha blending and removes the masking layer. For example, the device can cease display or output of the masking layer. In some examples, the masking layer is fully transparent. A fully or sufficiently transparent masking layer can remain displayed even if a brightening configuration session is exited. In some examples, the device removes a clear masking layer when exiting the brightening configuration session.

In some embodiments, the device receives a fifth input corresponding to rotation at the rotatable input mechanism and determines that a rotational velocity of the fifth input detected at the rotatable input mechanism exceeds a threshold rotational velocity per unit time. In accordance with the determination, the device automatically adjusts the brightness level toward a predetermined brightness level (see, e.g., FIG. 6C). For example, in response to detecting a flick (see, e.g., flick 600c at FIG. 6C) gesture at the crown (e.g., rotatable input mechanism 506 at FIG. 6C), the device increases the brightness level at a constant and accelerated rate without further user input at the crown. It is contemplated that the device can meet a predetermined maximum/minimum brightness level and complete brightening/dimming based on a direction of the flick. While adjusting the brightness level at a constant speed, an amount of time to reach a maximum or minimum brightness level can depend on a distance of a current brightness level from either extreme at the time of registering the flicking of the crown. Automatically adjusting the brightness level toward the predetermined brightness level in response to a rotational velocity of the input exceeding a threshold rotational velocity (e.g., a quick flick) enhances operability of the device by providing rapid screen brightening, which saves user time and frees up the user's hands for attending to other activities.

In some examples, the set of brightness adjustment criteria can include a criterion that is met when an input meets automatic brightness adjustment criteria, where the automatic brightness adjustment criteria including a criterion that is met when a rotational velocity of the input exceeds or meets a threshold rotational velocity (see, e.g., FIG. 6C). In response to meeting the automatic brightness adjustment criteria, the device increases the brightness to a predetermined level, such as maximum brightness level. The predetermined level can be independent of a degree of rotation, rotational speed, and/or rotational velocity of the input mechanism. In some examples, the input is a flick at the crown.

In another embodiment, the device can detect a touch gesture on the display screen, while the screen is at a brightness level lower than a predetermined brightness level, and/or within a period of time after receiving the first input. In response to detecting the touch gesture, the device can automatically adjust the brightness level at a constant accelerated rate toward the predetermined brightness level to meet a predetermined maximum and/or minimum brightness level and complete the brightening or dimming (see, e.g., FIG. 6F). In some examples, the touch gesture is a tap gesture (see, e.g., touch gesture 608 at FIG. 6F) on the touch-sensitive display screen. In some examples, completing the brightening or dimming when the screen tap is detected is based on the first or second direction of the rotation of the rotatable input mechanism. The device can brighten or dim the screen based on a current brightness level relative to a threshold point. In some examples, the tap gesture initiates an accelerated brightening or dimming of the brightness level, where an amount of time to reach a maximum or minimum brightness level depends on a distance of a current brightness level from either extreme at the time of registering the tap gesture. Automatically brightening the screen provides quick and efficient access to a brightened screen and reduces a duration or number of inputs required by the user.

In some embodiments, the device automatically completes adjusting the brightness level to meet a maximum or a minimum brightness level upon reaching a threshold brightness level. In practice, the user may not need to provide further rotational inputs once automatic adjustment is instantiated (see, e.g., FIG. 6G).

In some embodiments, the device provides differential brightening of a user interface displayed on the display screen. For example, in some embodiments, the device displays a user interface on the display screen having at least a first displayed element and a second displayed element. The device can adjust a brightness level of the first displayed element at a different rate than a brightness level of the second displayed element. The brightness levels of the first displayed element and second displayed element can be adjusted simultaneously at the different rates. In some examples, the device differentially applies alpha blending by adjusting the brightness level of a predetermined subset of the displayed elements at a first rate that is distinct from a second rate at which remaining displayed elements are adjusted. For example, a digital time or clock hands displayed on the user interface can increase in brightness level (see, e.g., first state 603 and second state 604 of clock hands at FIG. 6H) before remaining or environmental elements increase in brightness (see, e.g., first state 610*a*, second state 610*b*, and third state 610*c* of the displayed date (September 9) at FIG. 6H). Differentially brightening different displayed elements on a user interface subject to the screen brightening capabilities disclosed herein provides a clean user interface and allows the user to quickly identify and process desired information.

Note that details of the processes described above with respect to method 700 (e.g., FIG. 7) are also applicable in an analogous manner to the methods described below. For example, method 700 optionally includes one or more of the characteristics of the various methods described below with reference to method 800. For example, method 700 can include maintaining and/or ending a brightness configuration session that permits adjustment of the brightness level, whereby a determination to maintain or end the brightness configuration session can be processed while receiving the first input. As discussed below, such determinations can be based on whether a set of exit configuration criteria is met while receiving the first input. For brevity, these details are not repeated below.

FIG. 8 is a flow diagram illustrating a method for maintaining or exiting a brightness configuration session using an electronic device in accordance with some embodiments. Method 800 is performed at a device (e.g., 100, 300, 500) with a display screen and a rotatable input mechanism. Some operations in method 800 are, optionally, combined, the order of some operations are, optionally, changed, and some operations are, optionally, omitted.

As described below, method 800 provides an intuitive way for maintaining or exiting a brightness configuration session in which a brightness level of a display screen can be adjusted. The method reduces the cognitive burden on a user for adjusting the brightness level of the display screen, thereby creating a more efficient human-machine interface. For battery-operated computing devices, enabling a user to adjust the brightness level of the display screen faster and more efficiently conserves power and increases the time between battery charges.

As shown in method 800, the device (802) can optionally receive a first input (e.g., first input 600*a* at FIG. 6A) corresponding to a rotation of the rotatable input mechanism, wherein the first input initiates a brightness configuration session (see, e.g., rotatable input mechanism 506 at FIG. 6A). For example, the device can detect a rotational speed and direction of the rotatable input mechanism and start the brightness configuration session.

The device (804) can optionally, while receiving the first input, adjust a brightness level of the display screen in accordance with the rotation of the rotatable input mechanism. In some examples, receiving the first input includes detecting that the crown is being rotated. Increasing or decreasing the brightness level can be based on a direction of the rotation and/or a rotational velocity of the rotation. In some examples, adjusting the brightness level fades in or out any user interface element(s) displayed on the display screen (e.g., display screen 504), such as any application that may be running, a clock user interface, and so on (see, e.g., FIG. 6A).

The device can optionally, while receiving the first input, in accordance with a determination that a set of exit configuration criteria is met, wherein the set of exit configuration criteria includes a criterion that is met when the brightness level of the display screen is above a predetermined brightness level, (806) end the brightness configuration session and (808) cease to adjust the brightness level of the screen in response to further rotation of the rotatable input mechanism (see, e.g., FIG. 6B). The exit configuration criteria may include criteria for ceasing adjusting the brightness level or for exiting the brightness configuration session. The exit configuration criteria can include, for example: reaching a threshold brightness level, detecting user input other than an input for adjusting a screen brightness level, and/or detecting rotational velocity of the crown below a minimum rotational velocity, including no rotation of the crown. In some examples, by terminating the brightness configuration session, further rotations of the crown can be detected and registered but do not cause adjustment of the brightness level. Ceasing to adjust the brightness level in response to further rotations of the rotatable input mechanism enhances operability of the device by conveying to the user that the brightness configuration session has concluded and other features or functions may be available for activation at that time.

The device can optionally, while receiving the first input, in accordance with a determination that the set of exit configuration criteria is not met, (810) maintain the brightness configuration session, and (812) continue to adjust the brightness level of the display screen in accordance with further rotation of the rotatable input mechanism (see, e.g., FIG. 6A). For instance, the device can continue the brightness configuration session, in which crown rotations are continued to be registered and/or detected in the active session.

In some embodiments, the device can, while receiving the first input, determine whether the set of exit configuration criteria is met.

In some embodiments, the set of exit configuration criteria includes a criterion that is met when the brightness level meets a threshold brightness level. In some examples, the threshold brightness level is a maximum brightness level.

As shown in method 800, in some embodiments, the threshold brightness level corresponds to a maximum brightness level, wherein further rotation detected at the rotatable input mechanism causes the device to (814) perform an action associated with a user interface displayed on the display screen. In some examples, further rotations do not alter the brightness level but zoom into and/or out of a user interface of the device, such as zooming into a home screen containing a plurality of icons and/or application affordances for launching applications (see, e.g., zooming of user interface 606*a,b* at FIG. 6B). Performing an action associated with a user interface displayed on the display screen once the maximum brightness level has been reached allows the device to efficiently transition into other functions, such as zooming into a menu of selectable affordances, in a streamlined manner without requiring additional different inputs by the user to make such transitions.

In some embodiments, the threshold brightness level corresponds to a minimum brightness level, wherein the display screen enters an inactive state (e.g., turns off) and continued rotation of the rotatable element in the first input does not alter the brightness level of the display screen. In some examples, entering the inactive state corresponds to turning the device off, where the device stays off despite any further rotations (see, e.g., second input 600*b* at FIG. 6D).

In some embodiments, the set of exit configuration criteria includes a criterion that is met when a user request for a function other than adjusting the brightness level is received. For example, the user can select an affordance, activate a hardware button, input a voice command, and/or detect an input that corresponds to a function other than adjusting the brightness level. The user request can include a subsequent input that is a tap or press received on the display screen and causes instant brightening and activation of any function in accordance with the location of the tap or button press (see, e.g., FIG. 6F).

In some embodiments, the device can, in response to receiving the user request for a function other than adjusting the brightness level, automatically increase the brightness level to a maximum brightness level (see, e.g., FIGS. 6C and 6F).

In some embodiments, the device can, in response to receiving the user request for a function other than adjusting the brightness level, maintain the brightness level at an adjusted brightness level while further user interaction with the electronic device is detected. For example, instead of fully fading up, the device can maintain an adjusted brightness level while full user interaction with user interface is permitted. The adjusted brightness level can be lower than a full or maximum brightness level. In some examples, further adjustment of the brightness level is not permitted or registered from inputs received at rotatable element when the brightening session has been exited. In that case, the adjusted brightness level can be maintained until the display turns off.

In some embodiments, the function comprises turning off the display screen, and/or entering an inactive or sleep mode. For example, the user request can include a gesture such as a lowered wrist or palm to the display screen, whereby subsequent rotations at the rotatable input mechanism would instantiate a new brightness configuration session. Permitting the user to quickly turn off the display screen reduces power usage and improves battery life, while permitting the user to establish a new brightness configuration session if desired.

In some embodiments, the device detects a user input to turn on the display screen and turns on the display screen by resuming to a brightness level detected prior to turning off the display screen (see, e.g., user input 612 at FIG. 6I). In some examples, the device resumes to a previously determined brightness level when the user input is a wrist raise. The last-adjusted brightness level can be persistent for a number of times upon next wrist raises. In some examples, a new brightness configuration session is entered upon the next wrist raise. The new brightness configuration session may have a different rotational direction of the rotatable input mechanism that is defined or otherwise causes increasing the brightness level of the display screen. Resuming to a previously-detected brightness level enhances operability of the device by allowing the user to quickly bring up a brightness level of the previous session if the session had been inadvertently abandoned, and further reduces any need for additional user inputs to return to the previously-set brightness level.

In some embodiments, the set of exit configuration criteria includes a criterion that is met when a user rotates the rotatable input mechanism below a minimum rotational velocity. For example, the device may exit the brightness configuration session when a detected rotation is absent or too slow.

In some embodiments, the set of exit configuration criteria includes a criterion that is met when no user input is detected for a predetermined period of time. For example, the device may determine that the user is inactive or that there is a pause after the first input for a predetermined period of time, which may be about 4 seconds.

In some embodiments, the device can, after lapse of the predetermined period of time wherein no user input is detected, automatically decrease the brightness level of the display screen to a minimum brightness level and detect a second user input while automatically decreasing the brightness level. In response to detecting the second user input, the device can automatically increase the brightness level to resume to an original brightness level detected before lapse of the predetermined period of time and re-enter or otherwise resume the brightness configuration session (see, e.g., FIG. 6J). For example, the device can automatically fade-down the brightness level to a display off state. When a subsequent crown rotation (see, e.g., input 600f at FIG. 6J) is detected during the automatic fade-down, the same brightness configuration session can be resumed or maintained as active. In some cases, the brightness configuration session is not exited until lapse of the timeout period. Automatically decreasing the brightness level upon a lack of user input reduces power usage and improves battery life of the device. Permitting a subsequent user input to resume to a brightness level where the fade-down initiated allows the user to access a previously-displayed brightness level without requiring additional inputs for setting the device back to the previous brightness level.

In some embodiments, the device can, in response to meeting the set of exit configuration criteria, initiate a delay period for a predetermined period of time, detect a subsequent user input corresponding to a subsequent rotation of the rotatable input mechanism during the delay period, and adjust the brightness level in accordance with the subsequent user input while maintaining the brightness configuration session. Initiating the delay period for the predetermined period of time may occur before or after ending the brightness configuration session. In some examples, the delay period is approximately 1 second. Delay can occur upon reaching a maximum brightness level before allowing non-brightening functions to be activated by crown rotation (e.g., zooming functions at FIG. 6B). Delay can occur upon reaching minimum brightness level before turning display off. The brightness configuration session can be terminated after lapse of the delay period unless a user input corresponding to adjusting the brightness level is received. In some examples, a lack of user input during the delay period causes automatic fade-down of display screen and device to exit the brightness configuration session and/or turn display off.

Note that details of the processes described above with respect to method 800 (e.g., FIG. 8) are also applicable in an analogous manner to the methods described above in FIG. 7. For example, method 800 optionally includes one or more of the characteristics of the various methods described above with reference to method 700. For example, method 800 can include, in response to receiving the first input corresponding to rotation at the rotatable input mechanism, defining a first rotation direction as a request to increase the brightness level, and defining a second rotation direction opposite the first rotation direction to decrease the brightness level during the brightness configuration session. For brevity, these details are not repeated.

Figure 9:
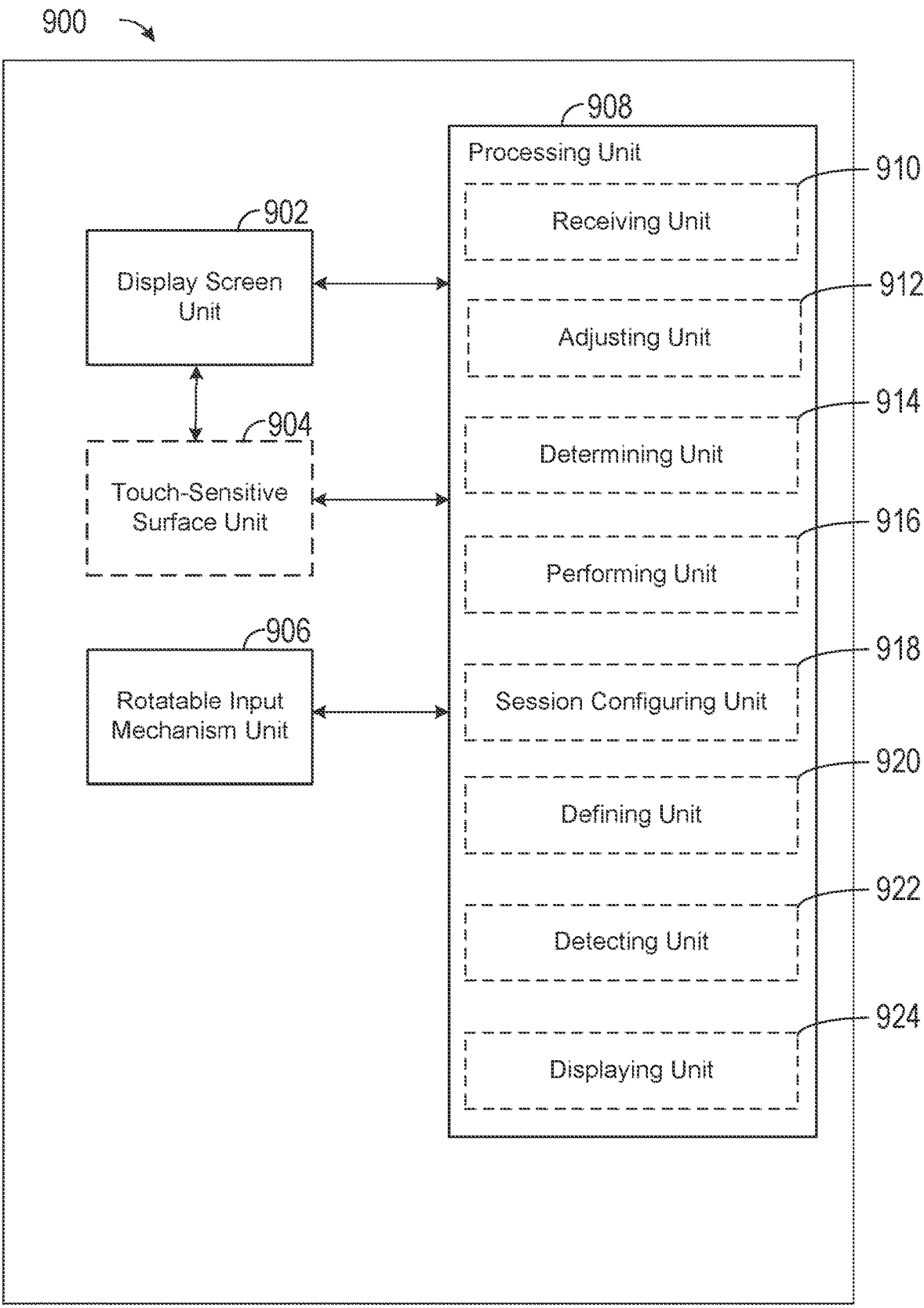
FIGS. 9 and 10 are functional block diagrams of example electronic devices, in accordance with some embodiments.

In accordance with some embodiments, FIG. 9 shows an exemplary functional block diagram of an electronic device 900 configured in accordance with the principles of the various described embodiments. In accordance with some embodiments, the functional blocks of electronic device 900 are configured to perform the techniques described above. The functional blocks of the device 900 are, optionally, implemented by hardware, software, or a combination of hardware and software to carry out the principles of the various described examples. It is understood by persons of skill in the art that the functional blocks described in FIG. 9 are, optionally, combined or separated into sub-blocks to implement the principles of the various described examples. Therefore, the description herein optionally supports any possible combination or separation or further definition of the functional blocks described herein.

As shown in FIG. 9, an electronic device 900 includes a display unit 902 configured to display a graphic user interface, optionally, a touch-sensitive surface unit 904 configured to receive touch contacts, a rotatable input mechanism unit 906, and a processing unit 908 coupled to the display unit 902 and, optionally, the touch-sensitive surface unit 904, and the rotatable input mechanism unit 906. In some embodiments, the processing unit 908 includes a receiving unit 910, an adjusting unit 912, a determining unit 914, a performing unit 916, a session configuring unit 918, a defining unit 920, a detecting unit 922, and a displaying unit 924.

The processing unit 908 is configured to: receive (e.g., with receiving unit 910) a first input corresponding to a rotation of the rotatable input mechanism unit; in accordance with a determination that the first input meets a set of brightness adjustment criteria, wherein the set of brightness adjustment criteria includes a criterion that is met when a brightness level of the display screen is below a predetermined brightness level, increase (e.g., with adjusting unit 912) the brightness level of the display screen unit; and in accordance with a determination that the first input does not meet the set of brightness adjustment criteria, forgo increasing (e.g., with adjusting unit 912) the brightness level of the display screen unit.

In some embodiments, processing unit 908 is further configured to: in response to receiving the first input, determine (e.g., with determining unit 914) whether the set of brightness adjustment criteria is met.

In some embodiments, the set of brightness adjustment criteria includes a criterion that is met when the display screen unit is initially off.

In some embodiments, the set of brightness adjustment criteria includes a criterion that is met when a brightness adjustment mode is on.

In some embodiments, processing unit 908 is further configured to: in accordance with the determination that the first input does not meet the set of brightness adjustment criteria, perform (e.g., with performing unit 916) a function other than adjusting the brightness level.

In some embodiments, processing unit 908 is further configured to: in accordance with the determination that the first input meets the set of brightness adjustment criteria, enter (e.g., with session configuring unit 918) a brightness configuration session.

In some embodiments, processing unit 908 is further configured to: in accordance with the determination that the first input meets the set of brightness adjustment criteria: define (e.g., with defining unit 920) a first rotation direction based on the first input as a request to increase the brightness level of the display screen unit during the brightness configuration session, and define (e.g., with defining unit 920) a second rotation direction opposite the first rotation direction as a request to decrease the brightness level during the brightness configuration session.

In some embodiments, processing unit 908 is further configured to: after receiving the first input: receive (e.g., with receiving unit 910) a second input having the second rotation direction opposite the first rotation direction, and in response to receiving the second input, decrease (e.g., with adjusting unit 912) the brightness level while maintaining (e.g., with session configuring unit 918) the brightness configuration session.

In some embodiments, processing unit 908 is further configured to: upon lapse of a threshold period of time after receiving the first input, exit (e.g., with session configuring unit 918) the brightness configuration session; after exiting the brightness configuration session, receive (e.g., with receiving unit 910) a third input corresponding to rotation of the rotatable input mechanism unit in a third direction opposite the first direction; and in accordance with a determination that the third input meets the set of brightness adjustment criteria, increase (e.g., with adjusting unit 912) the brightness level and entering a new brightness configuration session.

In some embodiments, processing unit 908 is further configured to: while in the new brightness configuration session, receive (e.g., with receiving unit 910) a fourth input corresponding to a rotation in a fourth rotation direction opposite the third rotation direction; and in response to receiving the fourth input, decrease (e.g., with adjusting unit 912) the brightness level while maintaining (e.g., with session configuring unit 918) the subsequent brightness configuration session.

In some embodiments, further wherein increasing the brightness level of the display screen comprises changing (e.g., with adjusting unit 912) the brightness level at a variable rate based on a rotational velocity of the rotational input.

In some embodiments, processing unit 908 is further configured to: adjust (e.g., with adjusting unit 912) the brightness level by alpha blending a user interface displayed on the display screen with a masking layer, wherein the masking layer alternately: increases (e.g., with adjusting unit 912) in transparency to increase the brightness level towards a maximum brightness level; and decreases (e.g., with adjusting unit 912) in transparency to decrease the brightness level towards a minimum brightness level.

In some embodiments, processing unit 908 is further configured to: in accordance with a determination that a maximum brightness level is met, cease (e.g., with adjusting unit 912) the alpha blending and remove (e.g., with adjusting unit 912) the masking layer.

In some embodiments, processing unit 908 is further configured to: receive (e.g., with receiving unit 910) a fifth input corresponding to rotation at the rotatable input mechanism unit; determine (e.g., with determining unit 914) that a rotational velocity of the fifth input detected at the rotatable input mechanism unit exceeds a threshold rotational velocity per unit time; and in accordance with the determination, automatically adjust (e.g., with adjusting unit 912) the brightness level toward a predetermined brightness level.

In some embodiments, processing unit 908 is further configured to: detect (e.g. with detecting unit 922) a touch gesture on the display screen unit, while the display screen unit is at a brightness level lower than a predetermined brightness level, within a period of time after receiving the first input; and in response to detecting the touch gesture, automatically adjust (e.g., with adjusting unit 912) the brightness level toward the predetermined brightness level.

In some embodiments, processing unit 908 is further configured to: automatically complete adjusting (e.g., with adjusting unit 912) the brightness level to meet a maximum or a minimum brightness level upon reaching a threshold level.

In some embodiments, processing unit 908 is further configured to: display (e.g., with displaying unit 924) a user interface on the display screen unit comprising at least a first displayed element and a second displayed element, wherein a brightness level of the first displayed element is adjusted at a different rate than a brightness level of the second displayed element, further wherein the brightness levels of the first displayed element and second displayed element are adjusted simultaneously.

Figure 10:
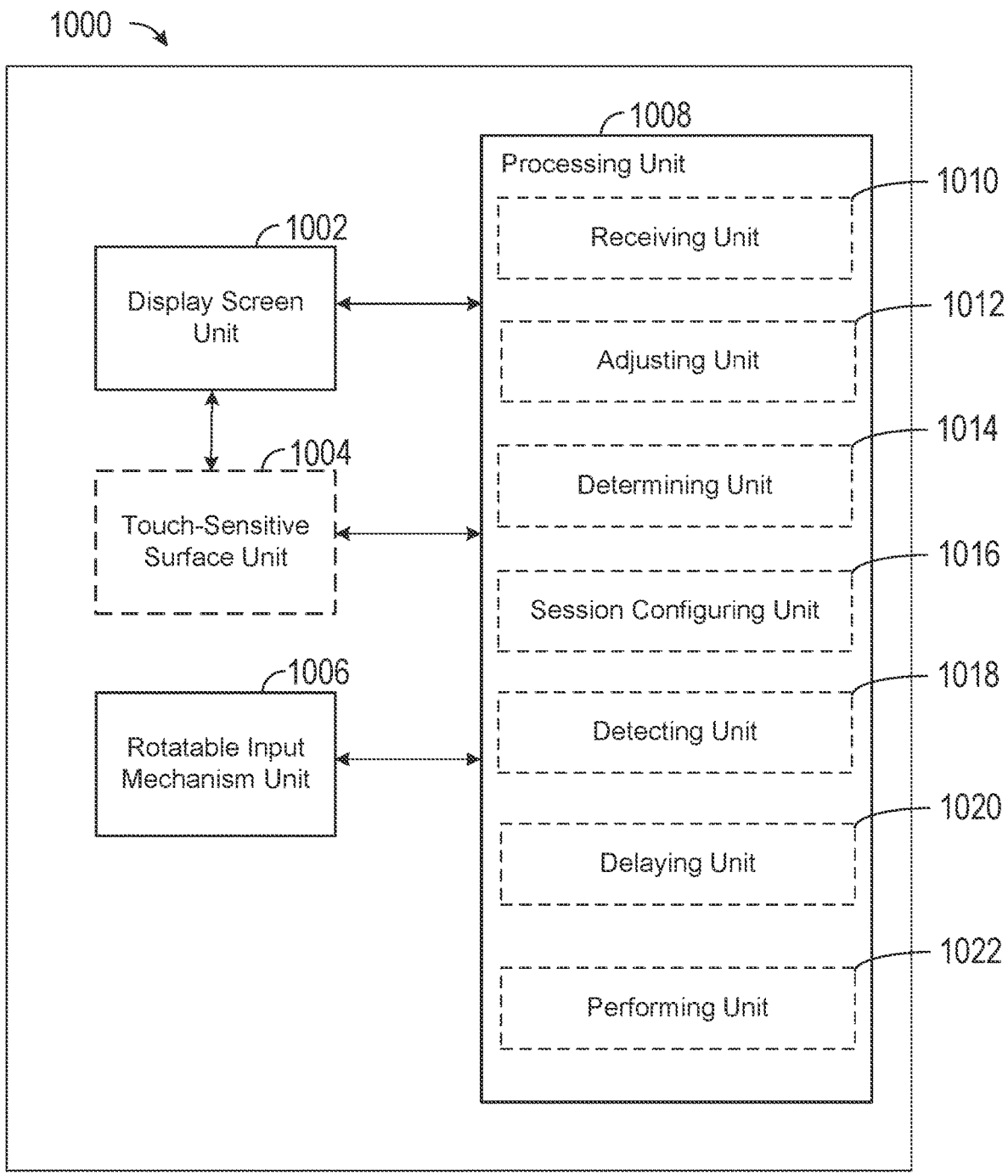

In accordance with some embodiments, FIG. 10 shows an exemplary functional block diagram of an electronic device 1000 configured in accordance with the principles of the various described embodiments. In accordance with some embodiments, the functional blocks of electronic device 1000 are configured to perform the techniques described above, such as those in method 800. The functional blocks of the device 1000 are, optionally, implemented by hardware, software, or a combination of hardware and software to carry out the principles of the various described examples. It is understood by persons of skill in the art that the functional blocks described in FIG. 10 are, optionally, combined or separated into sub-blocks to implement the principles of the various described examples. Therefore, the description herein optionally supports any possible combination or separation or further definition of the functional blocks described herein.

As shown in FIG. 10, an electronic device 1000 includes a display unit 1002 configured to display a graphic user interface, optionally, a touch-sensitive surface unit 1004 configured to receive touch contacts, a rotatable input mechanism unit 1006, and a processing unit 1008 coupled to the display unit 1002 and, optionally, the touch-sensitive surface unit 1004, and the rotatable input mechanism unit 1006. In some embodiments, the processing unit 1008 includes a receiving unit 1010, an adjusting unit 1012, a determining unit 1014, a session configuring unit 1016, a detecting unit 1018, a delaying unit 1020, and a performing unit 1022.

In some embodiments, processing unit 1008 is further configured to: receive (e.g., with receiving unit 1010) a first input corresponding to a rotation of the rotatable input mechanism unit, wherein the first input initiates a brightness configuration session; while receiving the first input: adjusting (e.g., with adjusting unit 1012) a brightness level of the display screen unit in accordance with the rotation of the rotatable input mechanism unit; in accordance with a determination that a set of exit configuration criteria is met, wherein the set of exit configuration criteria includes a criterion that is met when the brightness level of the display screen is above a predetermined brightness level: end (e.g., with session configuring unit 1016) the brightness configuration session, and cease (e.g., with adjusting unit 1012) to adjust the brightness level of the display screen unit in response to further rotation of the rotatable input mechanism unit; and in accordance with a determination that the set of exit configuration criteria is not met: maintain (e.g., with session configuring unit 1016) the brightness configuration session, and continue to adjust (e.g., with adjusting unit 1012) the brightness level of the display screen unit in accordance with further rotation of the rotatable input mechanism unit.

In some embodiments, processing unit 1008 is further configured to: while receiving the first input, determine (e.g., with determining unit 1014) whether the set of exit configuration criteria is met.

In some embodiments, the set of exit configuration criteria includes a criterion that is met when the brightness level meets a threshold brightness level.

In some embodiments, the threshold brightness level corresponds to a maximum brightness level, wherein further rotation detected at the rotatable input mechanism unit performs (e.g., with performing unit 1022) an action associated with a user interface displayed on the display screen unit.

In some embodiments, the threshold brightness level corresponds to a minimum brightness level, wherein the display screen unit enters (e.g., with adjusting unit 1012) an inactive state and continued rotation of the rotatable input mechanism unit in the first input does not alter the brightness level of the display screen unit.

In some embodiments, the set of exit configuration criteria includes a criterion that is met when a user request for a function other than adjusting the brightness level is received (e.g., with receiving unit 1010).

In some embodiments, processing unit 1008 is further configured to: in response to receiving (e.g., with receiving unit 1010) the user request for a function other than adjusting the brightness level, automatically increase (e.g., with adjusting unit 1012) the brightness level to a maximum brightness level.

In some embodiments, processing unit 1008 is further configured to: in response to receiving (e.g., with receiving unit 1010) the user request for a function other than adjusting the brightness level, maintain (e.g., with adjusting unit 1012) the brightness level at an adjusted brightness level while further user interaction with the electronic device is detected.

In some embodiments, the function comprises turning off the display screen unit.

In some embodiments, processing unit 1008 is further configured to: detect (e.g., with detecting unit 1018) a user input to turn on the display screen unit; and turn on the display screen unit by resuming (e.g., with adjusting unit 1012) to a brightness level detected prior to turning off the display screen unit.

In some embodiments, the set of exit configuration criteria includes a criterion that is met when a user rotates the rotatable input mechanism unit below a minimum rotational velocity.

In some embodiments, the set of exit configuration criteria includes a criterion that is met when no user input is detected for a predetermined period of time.

In some embodiments, processing unit 1008 is further configured to: after lapse of the predetermined period of time wherein no user input is detected, automatically decrease (e.g., with adjusting unit 1012) the brightness level of the display screen to a minimum brightness level; detect (e.g., with detecting unit 1018) a second user input while automatically decreasing the brightness level; in response to detecting (e.g., with detecting unit 1018) the second user input, automatically increase (e.g., with adjusting unit 1012) the brightness level to resume to an original brightness level detected before lapse of the predetermined period of time; and re-enter (e.g., with session configuring unit 1016) the brightness configuration session.

In some embodiments, processing unit 1008 is further configured to: in response to meeting the set of exit configuration criteria, initiate (e.g., with delaying unit 1020) a delay period for a predetermined period of time; detect (e.g., with detecting unit 1018) a subsequent user input corresponding to a subsequent rotation of the rotatable input mechanism unit during the delay period; and adjust (e.g., with adjusting unit 1012) the brightness level in accordance with the subsequent user input and maintain the brightness configuration session.

The operations described above with reference to FIGS. 7 and 8 are, optionally, implemented by components depicted in FIGS. 1A-1B or FIGS. 9-10. For example, receiving operation 702, increasing operation 704, and forgo increasing operation 706 are, optionally, implemented by event sorter 170, event recognizer 180, and event handler 190. Further, for example, receiving operation 802, adjusting operation 804, ending operation 806, ceasing adjusting operation 808, maintaining operation 810, and continuing adjusting operation 812 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Turning now to FIGS. 11A-11Q, exemplary user interfaces corresponding to a theater mode feature, hereinafter referred to as a "quiet mode," at an electronic device are shown in accordance with various embodiments described below, including the processes described in FIGS. 12A-12C. In the quiet mode setting, when the quiet mode is on, the device both ignores wrist gestures for turning on the display and silences incoming alerts. The electronic device may include a similar electronic device as shown above in regard to FIGS. 5A and 6A-6J. For example, the electronic device 500 may include a touch sensitive display screen 504 and one or more hardware buttons, such as a rotatable input mechanism 506 and/or a depressible button 508 (e.g., a power button), as discussed above for FIG. 5A. In some cases, the electronic device 500 is a wearable device such as a smart watch that includes the rotatable input mechanism 506, which may interchangeably be referred to herein as a rotatable crown.

At FIG. 11A, a user interface for a control panel 1100 containing a plurality of selectable affordances 1102, 1104, 1106, 1108, 1110, and 1112 is displayed. The control panel 1100 may be displayed in response to an upward swipe 1114 on the display screen 504 by the user. In the present example, the plurality of selectable affordances 1102, 1104, 1106, 1108, 1110, and 1112 includes a first row having a battery level or power percentage affordance 1102 and an airplane mode affordance 1104 corresponding to an airplane mode, a second row having a silent mode affordance 1106 corresponding to a silent mode for notifications and a sleep mode affordance 1108 corresponding to a sleep mode for notifications, and a third row having a quiet mode affordance 1110 corresponding to the quiet mode mentioned above and a lock affordance 1112 corresponding to a locked mode at the electronic device 500. Each of the affordances displayed at the control panel 1100 permits the user to turn on and/or off a setting corresponding to the affordance by a touch gesture (e.g., tapping) on the affordance, and/or provides information related to the device (e.g., battery level percentage). The control panel 1100 further includes a connection status 1116, which indicates whether the electronic device 500 is in communication (e.g., blue tooth, WiFi, or other wireless connection) with one or more external devices, such as a phone, tablet, or laptop.

In some cases, the control panel 1100 is displayed in response to and/or revealed along with movement of the upward swipe 1114 on a home screen, such as a user interface indicating a current date and/or time. For instance, the control panel 1100 is displayed as being pulled upward from a bottom of the display screen 504 toward a top of the display screen 504 to gradually cover the home screen as the swipe gesture 1114 traverses from a bottom to a top of the screen 504. A swipe gesture in the opposite direction (e.g., a downward swipe gesture) pulls the control panel 1100 back to the bottom of the display screen 504 where it is hidden, while gradually revealing the home screen. In some cases, the control panel 1100 includes additional affordances or information that are brought into view by scrolling vertically or horizontally with a swipe gesture across the display screen 504, or scrolled vertically via rotation at the rotatable input mechanism 506.

At FIGS. 11A and 11B, a user may tap on the quiet mode affordance 1110 (e.g., soft button represented by a popcorn glyph) to engage a quiet mode as described further below. Engaging the quiet mode automatically activates a separate device setting referred to as the silent mode, whereby alerts (e.g., text messages, phone calls, e-mails, news updates, notifications from applications on the device 500, etc.) received by the electronic device 500 do not cause the electronic device 500 to emit an audible output (and/or visual output) corresponding to the alert. In some cases, a change in the quiet mode and/or silent mode setting at the device 500 is also automatically implemented at one or more external devices connected to the device 500, as indicated by the connection status 1116. As shown in FIG. 11B, activation of the quiet mode causes the appearance of the quiet mode affordance 1110a and the silent mode affordance 1106a to be updated. For example, the appearances of the two affordances 1110a, 1106b are updated with highlighting to indicate that the quiet mode and the silent mode are active, while unselected affordances 1102, 1104, 1108, and 1112 are not currently active or selected and therefore not highlighted.

Figure 11C:
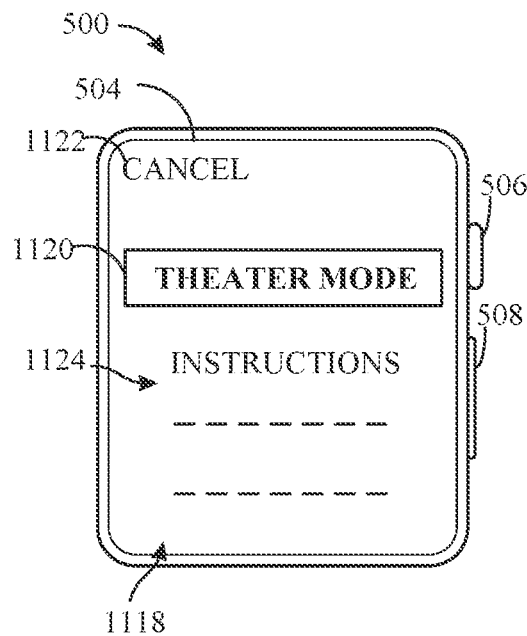

In response to receiving the user request for quiet mode, such as the user selection of the quiet mode affordance 1110 at FIG. 11A, the device displays an instruction screen 1118 (e.g., a confirmation screen) as shown in FIG. 11C. The instruction screen 1118 may include a quiet mode confirmation affordance 1120 (e.g., "theater mode" affordance or soft button), a cancel affordance 1122, and instructions 1124 that indicate that activation of the quiet mode includes activation of the silent mode, that activation of the quiet mode at the device 500 also engages the quiet mode on other connected external devices, a description of features implemented during quiet mode, how to activate the display screen during quiet mode, and/or how to turn off the quiet mode after it is entered. In some cases, the instruction screen 1118 is displayed in response to each user request for activation of the quiet mode. For example, the display screen 504 transitions from displaying the control panel 1100 to displaying the instruction screen 1118. At the instruction screen 1118, in response to detecting a user input on the cancel affordance 1122, the device 500 foregoes activation of the quiet mode and returns to displaying the control panel 1100 or displaying the home screen. It is further contemplated that while activation of the quiet mode automatically activates the silent mode, in some cases, the user can selectively deactivate the silent mode after activating the quiet mode by unhighlighting (e.g., tapping on) the silent mode affordance 1106*a* while the quiet mode affordance 1110*a* remains highlighted. In that case, notifications received at the device 500 while in quiet mode causes the device 500 to emit audible outputs and/or display notifications when alerts are received as with a normal notifications operation, while wrist gestures do not activate the display screen 504 in accordance with the quiet mode being active. As noted above, such settings entered by the user at the control panel 1100 can be relayed to or otherwise automatically implemented at the connected external device.

In some cases, in response to detecting a user input on the quiet mode confirmation affordance 1120, the device 500 activates and enters the quiet mode, where user inputs such as wrist gestures that normally turn on the display screen 504 from an off state are now ignored and do not cause activation or turning on of the display screen 504. For instance, wrist gestures may continue to be detected by the accelerometer at the device 500 but not registered for activating or turning on the display screen 504. Further, the simultaneous and automatic activation of the silent mode causes the device 500 to forego output of audible notifications corresponding to alerts (e.g., text messages, phone calls, e-mails, news updates, notifications from applications on the device 500, etc.) received while the quiet mode is active.

Figure 11D:
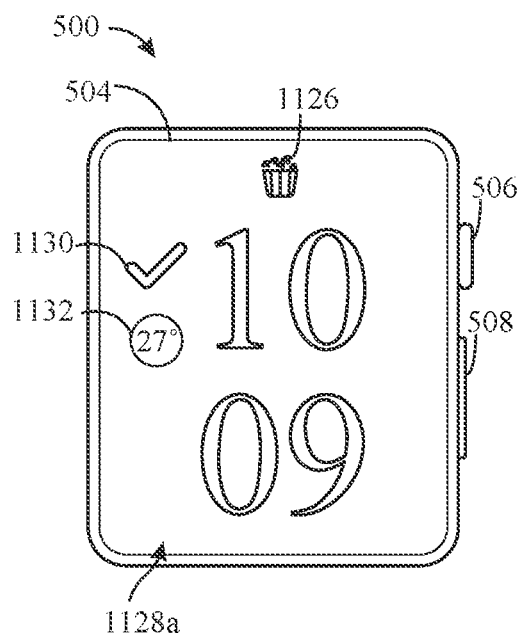

While the device 500 is in quiet mode, a quiet mode icon 1126 is displayed on a home screen 1128*a* when the display 504 is activated (e.g., by physical inputs as discussed below) to indicate that the quiet mode is active. For example, as shown in FIG. 11D, the quiet mode icon 1126 is a popcorn glyph and is displayed above a current time (e.g., 10:09) on the home screen 1128*a*, which further include icons indicating other status, information, and/or notifications for applications at the device 500, such as a checkmark 1130 and a current temperature 1132. Other glyphs can be used for the quiet mode icon 1126, such as an audience glyph or a movie ticket glyph. Further, the quiet mode icon 1126 can be displayed adjacent to other icons 1130, 1132, at other locations on the display screen 504, such as a corner of the display screen 504 or a bottom of the display screen 504. In practice, displaying the quiet mode icon 1126 provides a technical benefit of informing the user that the device 500 is currently ignoring wrist gestures and is silent to incoming notifications, which may prevent the user from speculating that the device has malfunctioned since it is operating in a special setting. It is contemplated that the quiet mode feature may be implemented by the user in situations where the user does not wish to activate the display screen 504 in response to movement of the wrist, such as a wrist turn or wrist raise. Such situations may arise in low-lit environments such as a movie theater where the user does not want to cause a disturbance or gain unwanted attention. The present systems and methods described herein provide quick and easy access to turning on and off the quiet mode from a home screen (e.g., home screen 1128) on the display screen 504. It is noted that the quiet mode feature may also be activated or deactivated via other control panels, such as a general settings panel on the device 500 or at the externally connected device. Further, it is noted that the quiet mode icon 1126 may be displayed in a different color to indicate whether a full quiet mode is active (e.g., the device is quiet to wrist gestures and is silent to displaying or audibly outputting notifications for alerts), or whether a "partial" quiet mode is active (e.g., the user deselects the silent mode feature such that only wrist gestures are ignored while notifications are still emitted/output for display). In other cases, user selection for turning off the silent mode while the quiet mode is active simultaneously turns off the quiet mode.

Still further, the quiet mode can be set as active for a predetermined period of time and/or based on a geographic location of the device 500 and automatically turn off to revert to normal operating mode after lapse of the predetermined period of time and/or after the geographic location of the device 500 changes from a designated "quiet mode" location.

Figure 11E:
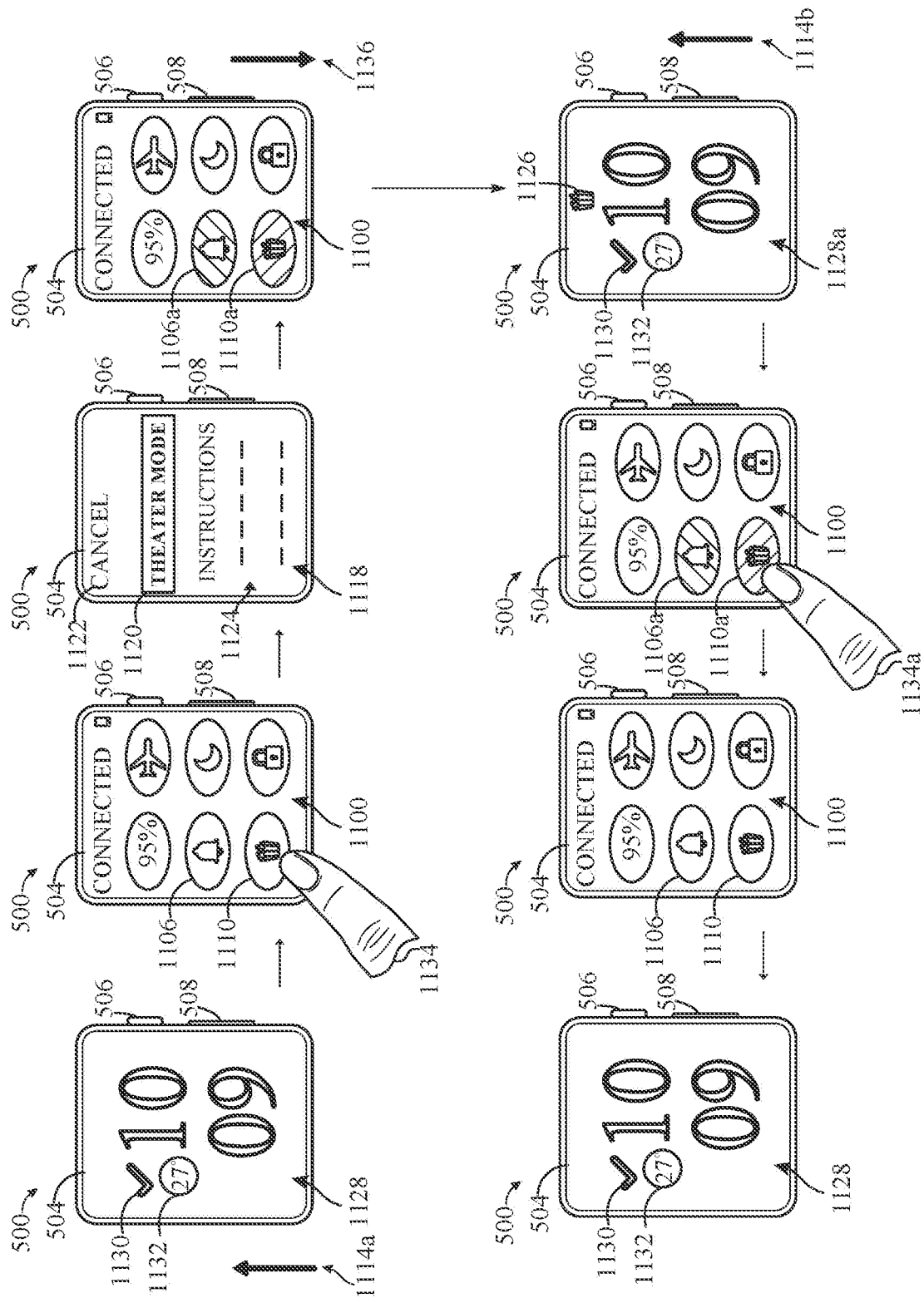

Turning now to FIG. 11E, a flow of example user interfaces for activating, entering, and deactivating the quiet mode is shown. Initially, the device 504 displays home screen 1128 when the display screen 504 is active. In response to an upward swipe gesture 1114*a* on the display screen 504 while the home screen 1128 is shown, the control panel 1100 is pulled upwardly across the display screen 504. A user request to activate the quiet mode feature is registered in response to a tap 1134 or other touch input on the quiet mode affordance 1110. In response to the user request 1134 to activate the quiet mode, the instruction screen 1118 is displayed in place of the control panel 1100. As discussed above, the instruction screen 1118 provides instructions for entering and using the quiet mode feature (e.g., how to turn on the display screen during quiet mode, how to exit quiet mode, silent mode is automatically activated along with quiet mode, and so on), along with the cancel affordance 1122 for foregoing quiet mode and the confirmation affordance 1120 for entering quiet mode. In FIG. 11E, in response to a user input on the confirmation affordance 1120 to enter quiet mode, the instruction screen 1118 is removed from display and the control panel 1100 is resumed for display, with the quiet mode affordance 1110*a* and silent mode affordance 1106*a* shown as highlighted to indicate that the modes are turned on and active. In some cases, the device 500 may emit a vibration upon entering the quiet mode and/or silent mode as further confirmation to the user that the device 500 has entered the quiet mode of operation.

As further shown in FIG. 11E, in response to a downward swipe gesture 1136 on the control panel 1100, the control panel 1100 is removed from display and a home screen 1128*a* is displayed. While the device is in quiet mode, the home screen 1128*a* includes or otherwise displays the quiet mode icon 1126 along with any other icons, such as the checkmark icon 1130 and the temperature icon 1132. In some examples, after receiving the user input on the confirmation affordance 1120 to enter quiet mode, the device 500 enters quiet mode, removes the instruction screen 1118 from display, and jumps directly to displaying the home screen 1128*a* having the quiet mode affordance 1126, rather than to displaying the control panel 1100 with the highlighted affordances 1106*a*, 1110*a*.

The quiet mode can be turned off or otherwise deactivated at any time in response to a user request to deactivate the quiet mode. For instance, as further shown at FIG. 11E, an upward swipe gesture 1114*b* on the home screen 1128*a* having the quiet mode icon 1126 brings up the control panel 1100 for display. In response to a user tap 1134*a* or other touch input on the highlighted quiet mode affordance 1110*a*, the device removes highlighting of both the quiet mode affordance 1106 and the silent mode affordance 1110 and exits, ends, or otherwise turns off both the quiet mode and the silent mode. With the quiet mode (and therefore, also the silent mode) off, the quiet mode icon 1126 is removed from the final display of the home screen 1128. It is noted that the silent mode may be turned on independently of the quiet mode by user selection of the silent mode affordance 1106, and a corresponding silent mode icon (not shown) may be displayed at the home screen 1128 to indicate that the silent mode is active. It is further noted that while the home screen

1128, 1128*a* is shown having a current time, other home screens can be contemplated, such as a user interface having plurality of affordances corresponding to a plurality of applications or a user interface of a particular application.

Figure 11F:
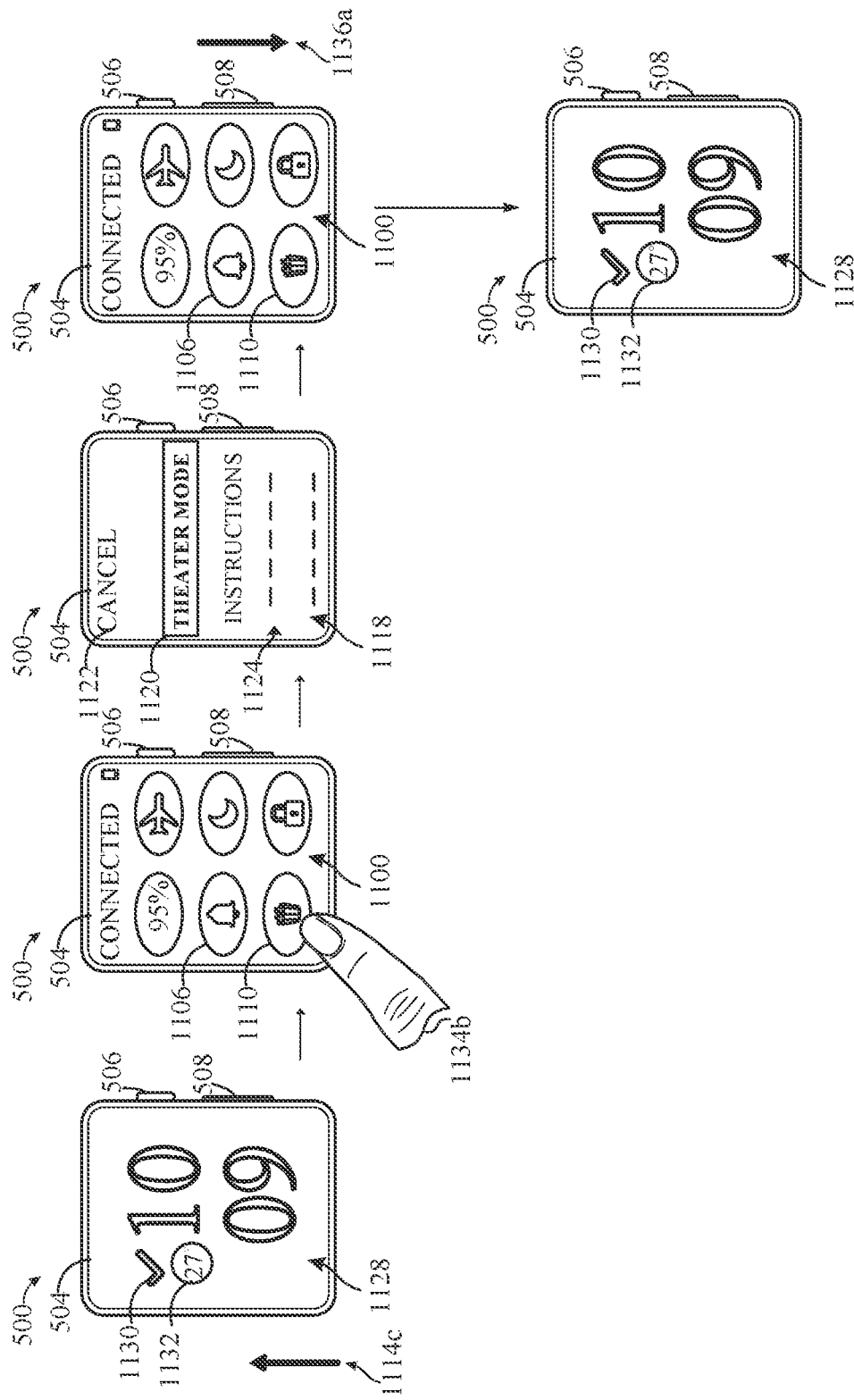
Figure 11G:
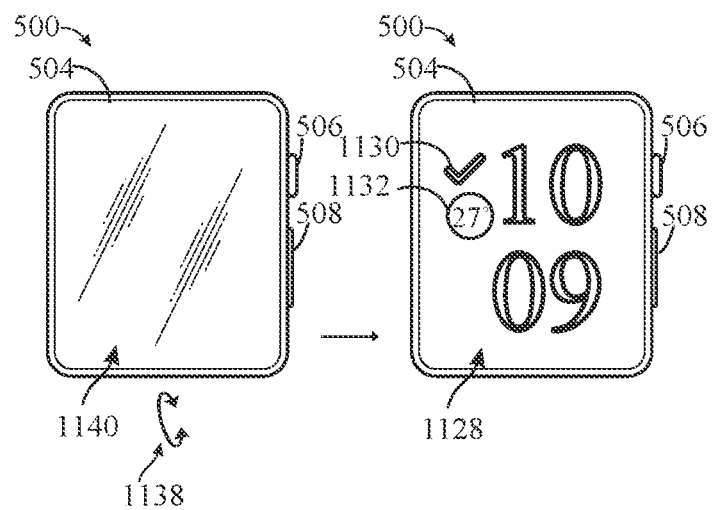
Figure 11H:
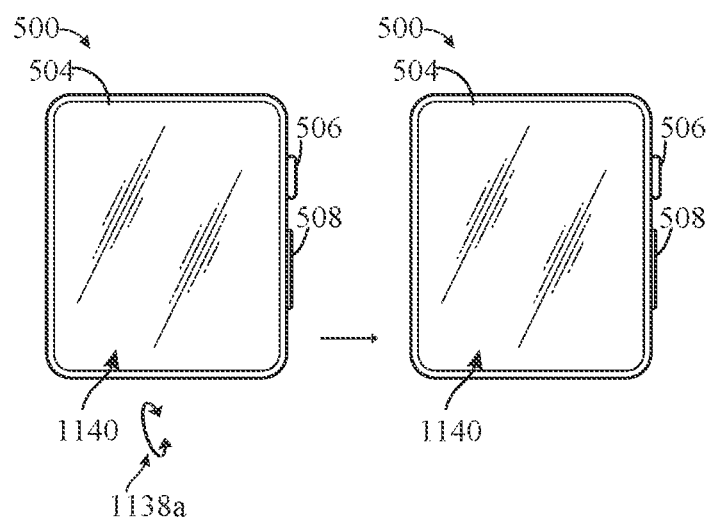

Turning now to FIG. 11F, a flow of example user interfaces for foregoing entry of, or otherwise canceling entry of, the quiet mode from the instruction screen 1118 is shown. In response to an upward swipe 1114*c* on the home screen 1128 at the display screen 504, the control panel 1100 is displayed. A user request to activate the quiet mode feature is registered in response to a tap 1134*b* or other touch input on the quiet mode affordance 1100 at the control panel 1100. In response to the user request 1134*b* to activate the quiet mode, the control panel 1100 is removed from display or otherwise replaced with display of the instruction screen 1118. The instruction screen 1118 provides instructions and options to enter the quiet mode by selecting the confirmation affordance 1120 or forego entry of the quiet mode by selecting the cancel affordance 1122. As shown at FIG. 11F, in response to a user request to forego further entry of the quiet mode by tapping or otherwise touching the cancel affordance 1122, the device resumes display of the control panel 1100 with the quiet mode affordance 1110 and silent mode affordance 1106 in their original, unhighlighted appearance. In response to a downward swipe gesture 1136*a* on the control panel 1100, the home screen 1128 is redisplayed as originally presented, without the quiet mode icon 1126 as shown in at least FIG. 11E, since the quiet mode is not active. In some examples, in response to the user selection of the cancel affordance 1122, the device 500 skips redisplay of the control panel 1100 and directly proceeds to redisplaying the home screen 1128.

As demonstrated in FIGS. 11G-11Q, when the quiet mode is active, the display screen 504 activates from the off or inactive state only in response to certain user inputs, such as physical inputs including touch inputs received on the touch-sensitive display screen 504, depression, and/or rotation of hardware at the device 500. For example, the device 500 ignores gestures (e.g., wrist flick, wrist movement) detected by its accelerometer (e.g., accelerometer 168 of FIG. 1A) that would normally activate the display screen, such as a wrist turn when the device is a wearable smart watch, which under normal operation would activate the screen 504 from the off or inactive state. For instance, as demonstrated at FIG. 11G where the quiet mode is inactive, a wrist gesture 1138 detected by the accelerometer at the device 500 with an inactive state 1140 of the display screen causes activation of the display screen 504 and display of the home screen 1128. On the other hand, as demonstrated at FIG. 11H where the quiet mode is active, in response to a wrist gesture 1138*a* such as a wrist turn or wrist raise, or other user input that is detected by the accelerometer at the device which would normally activate the display screen 504 when the quiet mode is off, the device 504 maintains the inactive state 1140 of the display screen 504 by foregoing activation of the display screen 504.

Figure 11I:
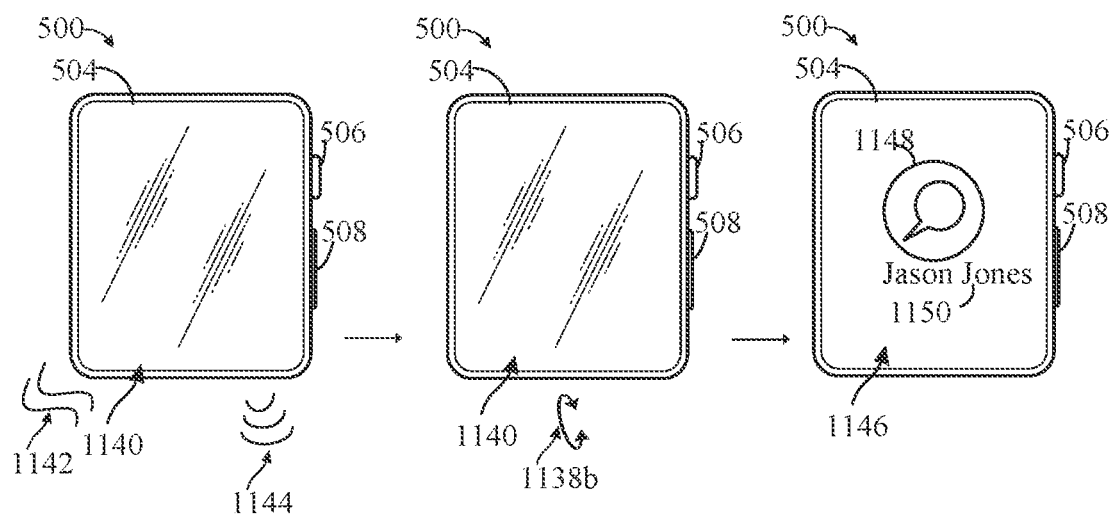
Figure 11J:
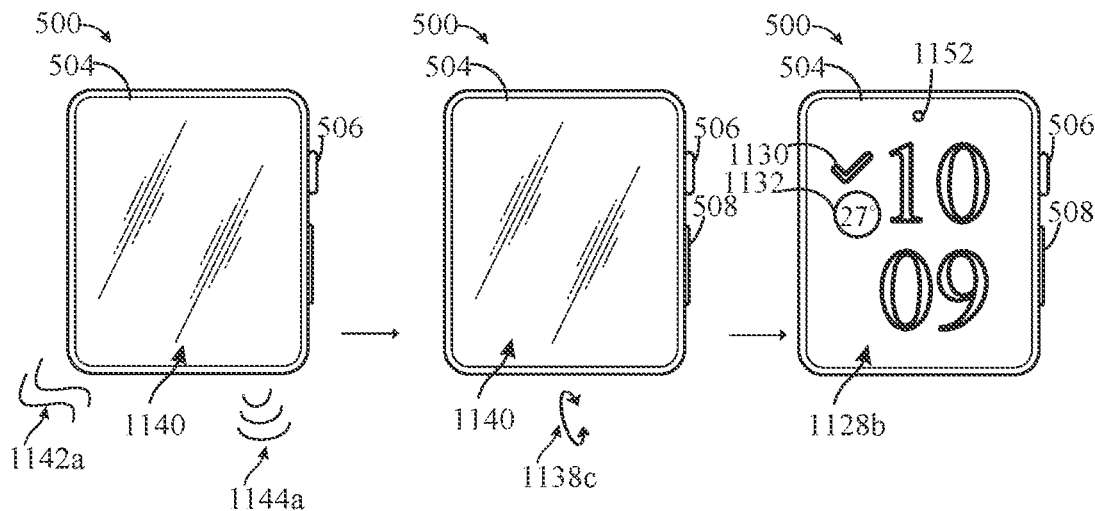
Figure 11K:
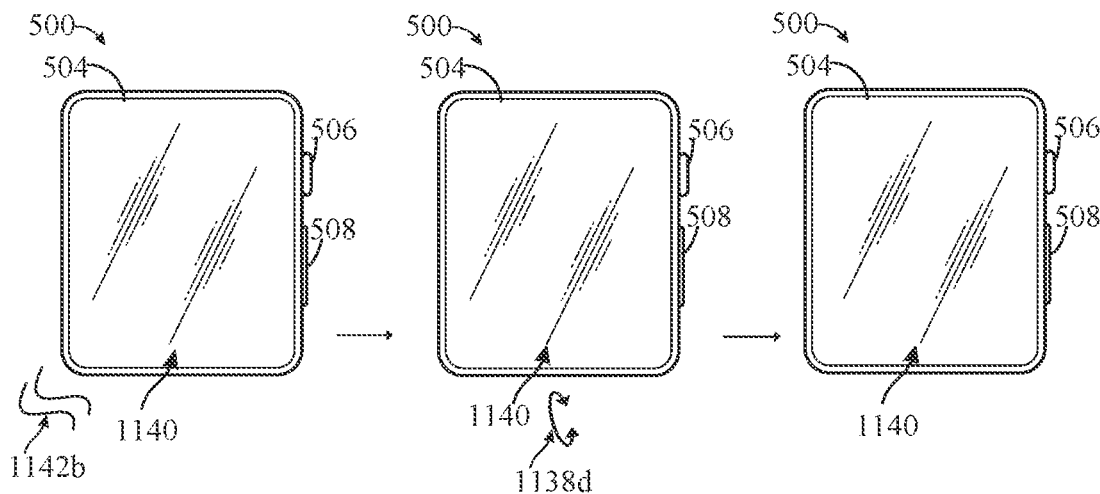

Turning to FIGS. 11I-11K, when an alert is received at the device 500 while the quiet mode is active, the device 500 does not emit audible or visual output of notifications corresponding to the incoming alert. However, other perceptual outputs such as vibrational or otherwise tactile outputs may be emitted to alert the user. For example, as shown at FIG. 11I where the quiet mode is inactive and the display screen 504 is in an inactive state 1140, the device 500 emits a vibrational output 1142 and/or an audible output 1144 to notify the user of an alert. In response to receiving a wrist gesture 1138*b*, or other movement registered by the accelerometer as a request to activate the display screen 504, the device activates the display screen 504 and displays a visual notification corresponding to the received alert. Here, the visual notification includes indication of an application type 1148 (e.g., a text message icon) and information 1150 associated with the alert, such as a first portion of the information or a source name of the alert (e.g., sender of the text message is a contact named Jason Jones).

In some examples, the visual notification 1146 for the incoming alert is displayed when the wrist gesture 1138*b* is detected within a predetermined time interval after receiving the alert or after emitting the vibrational output 1142 and/or audible output 1144. For example, as shown in FIG. 11J where the display screen 504 is in the inactive state 1140 and the quiet mode is off, a wrist gesture 1138*c* is received after the predetermined time interval has passed after emitting a vibrational output 1142*a* and/or audible output 1144*a*. In that case, in response to detecting the wrist gesture 1138*c*, the device activates the display screen 504 and displays home screen 1128*b* showing the current time and an unread notification(s) icon or indicator 1152 (e.g., a circle or dot).

FIG. 11K demonstrates that while the quiet mode is active, the device 500 does not output audible or visual outputs in response to incoming alerts and wrist gestures, since both the silent mode and the quiet mode for the display screen 504 are on. For instance, initially, the display screen 504 is off or otherwise in the inactive state 1140. The device 500 emits a vibrational output 1142*b* in response to receiving an alert while the audible output is silenced or otherwise not emitted, since the quiet mode includes activation of the silent mode. Thereafter, the device 500 detects a wrist gesture 1138*d* or other input at the accelerometer that normally causes activation of the display screen 504. However, the active quiet mode causes the wrist gesture 1138*d* to be ignored by the device 500 and the display screen 504 to remain in the inactive state 1140.

It is noted that the examples of quiet mode illustrated above in FIGS. 11I-11K can include variations. For instance, while a vibrational output corresponding to alerts can be emitted during quiet mode, in some examples, no perceptual output (e.g., audible, visual, tactile such as vibrational) is emitted at all when the quiet mode is active. In another example, while the device is in quiet mode and a vibrational output corresponding to an alert is emitted, if a wrist gesture is received within an immediate time interval after the vibrational output while the device 500 is in quiet mode, the device 500 momentarily foregoes ignoring the wrist gesture during that immediate time interval and turns on the display screen 504 to display a visual notification corresponding to the alert, while maintaining the device 500 in quiet mode.

FIGS. 11L-11Q illustrate various user inputs, such as physical inputs that are not wrist gestures detected at the accelerometer of the device 500, that activate the display screen 504 or otherwise turn the display screen 504 on from an off state while the quiet mode is active. As shown below, the physical inputs can include inputs received on a surface of the device, such as a touch input (e.g., tap or force press) on the touch-sensitive display screen, housing, depression of a button such as a power button, and/or rotation of a rotatable input mechanism at the device 500. Activating the display screen 504 can include turning on the display screen 504 by increasing a brightness level of the display screen 504 to a predetermined/maximum brightness level. In some examples, the physical inputs activate the display screen 504 from the inactive state 1140 regardless of whether the quiet mode is active or inactive.

Figure 11L:
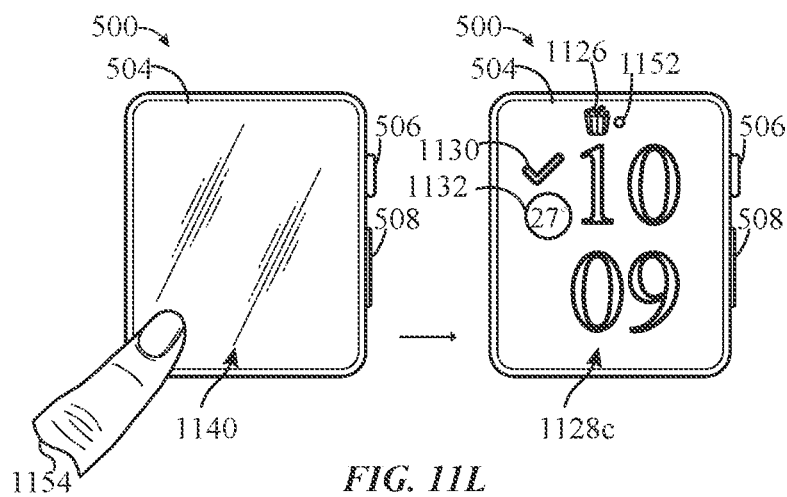

For instance, as shown at FIG. 11L, the device 500 is in the quiet mode (e.g., quiet mode is active) and the display screen 504 is initially in the inactive state 1140. In response to detecting a touch input on a surface of the device 500, such as a tap gesture 1154 on the touch-sensitive display screen 504, the device 500 activates the display screen 504 by turning on the display screen 504 and displaying a user interface corresponding to a home screen 1128c, which includes a current time and quiet mode icon 1126 indicating that the quiet mode is active. Other icons on the home screen 1128c can be displayed, such as checkmark icon 1130, temperature icon 1132, and the unread notifications icon 1152 indicating that there are unread alerts at the device 500. It is contemplated that similar tap gestures as gesture 1154 activate the display screen 504 in similar fashion when the quiet mode is off or inactive, whereby activation of the display screen 504 would not include displaying the quiet mode icon 1126 when the quiet mode is inactive.

Figure 11M:
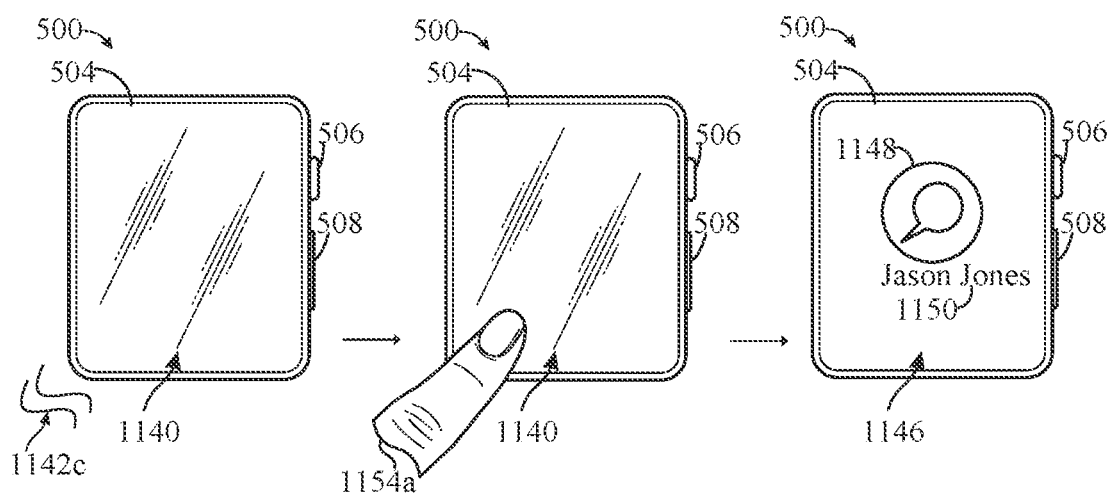
Figure 11N:
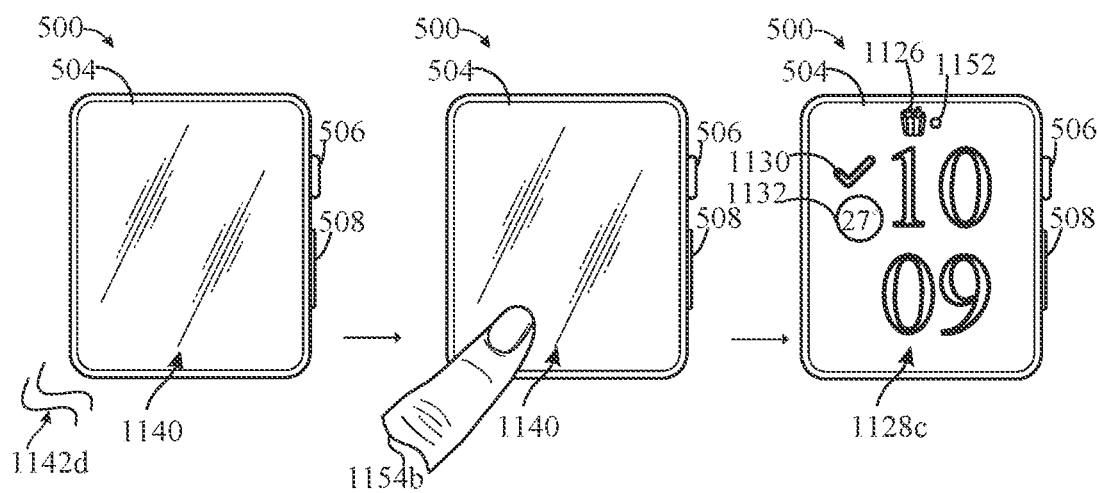

As shown at FIG. 11M, the device 500 is in operating in the quiet mode and the display screen 504 is initially in the inactive state 1140. The device 500 receives an alert and notifies the user by emitting a vibrational output 1142c. Audible outputs are silenced in accordance with the automatic activation of the silent mode along with the quiet mode. When a user input such as tap gesture 1154a is detected on the display screen 504 within a predetermined time interval after emission of vibrational output 1142c, the display screen 504 activates and displays the visual notification 1146. In some cases, after displaying the visual notification 1146 for a preset period of time, the device 500 automatically transitions the display screen 504 to displaying a second portion of the notification, such as by activating the application associated with the application type icon 1148 and displaying further information associated with the alert (e.g., displaying the message from Jason Jones). Still, in some cases as shown at FIG. 11N, when a tap gesture 1154b is detected on the inactive display screen 504 after passage of the predetermined time interval after emitting the vibrational output 1142d, the display screen 504 activates and displays the home screen 1128c, which includes the unread notifications indicator 1152 along with the quiet mode icon 1126.

Figure 11O:
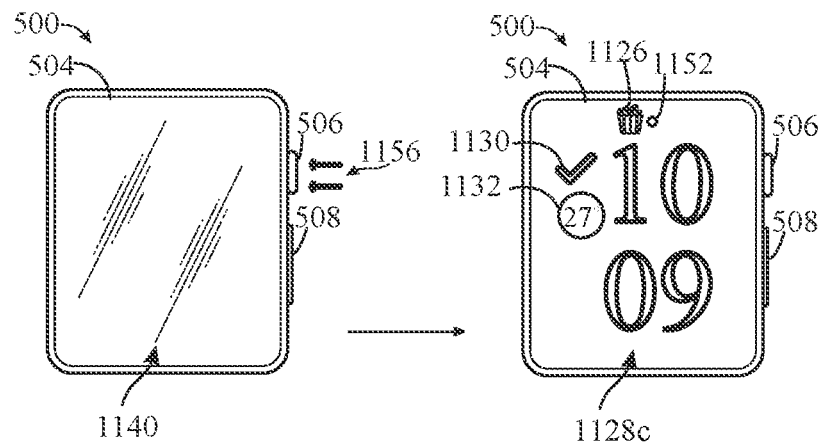
Figure 11P:
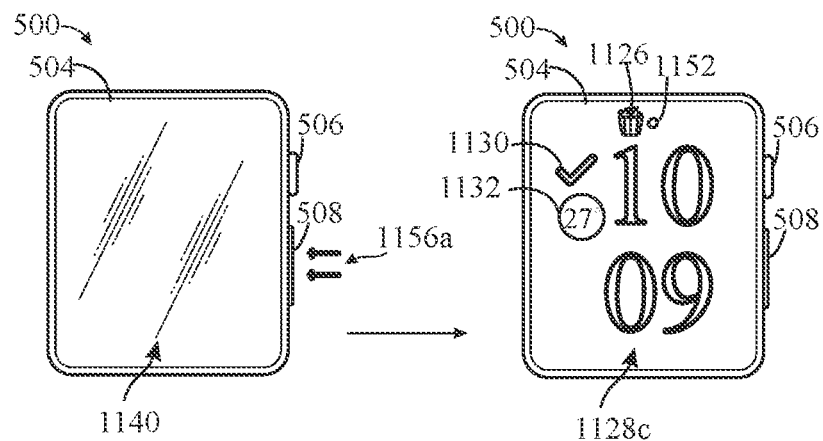

Turning now to FIGS. 11O-11P, in some examples, the electronic device 500 includes a hardware button such as the rotatable input mechanism 506 and/or the depressible button 508 (e.g., power on/off button), and the physical input includes a user pressing on or otherwise depressing the hardware button, which activates the display screen 504, regardless of whether device 500 is in the quiet mode or not. For example, FIG. 11O illustrates that in response to depression 1156 of the rotatable input mechanism 506 while the display screen 504 in the inactive state 1140 and the quiet mode is on, the display screen 504 is activated and displays the home screen 1128c. As the device 500 is in the quiet mode, the home screen 1128c includes the quiet mode icon 1126. Similarly, FIG. 11P shows that in response to depression 1156a of the depressible button 508 while the display screen 504 is in the inactive state and the quiet mode is on, the display screen 504 is activated and displays the home screen 1128c. It is contemplated that the display screen 504 is turned on to a maximum or otherwise predetermined brightness level in response to depression of either hardware button regardless of whether the device 500 is in the quiet mode or not operating in the quiet mode.

Turning now to FIG. 11Q, the electronic device 500 includes the rotatable input mechanism 506 and the physical input includes a rotation 1158 of the rotatable input mechanism 506 that gradually turns on the display screen 504 during quiet mode operation. For instance, the device 500 activates the display screen 504 by increasing a brightness level of the display screen 504 toward a predetermined (e.g., maximum) brightness level at a rate that varies in accordance with the rotational velocity of the rotation at the rotatable input mechanism 504, as discussed in various embodiments described above in regard to FIGS. 6A-6J.

As shown at FIG. 11Q, the device 500 is initially in the inactive state 1140 and gradually turns on the display screen 504 by fading into view the home screen 1128d to the maximum brightness level at home screen 1128c, with the rate of fading-in varying in accordance with a rotational speed of the user's rotations 1158 and 1158a of the rotatable crown 506. At the maximum brightness level as shown at the home screen 1128c, the device 500 can gradually turns off or otherwise fades-out the home screen 1128c to a dimmed home screen 1128d at a rate that corresponds to the rotation 1158b detected at the rotatable input mechanism 506. Further rotation 1158c during the faded home screen 1128d continues to gradually darken the display screen 504 via alpha blending toward a dark display, in which the display screen 504 enters the inactive state 1140. The rotations for fading-in and fading-out of view are defined by opposing directions of rotation, as discussed above for FIGS. 6A-6J. In some examples, the brightness level reached at the displayed home screen 1128c is less than a maximum brightness level prior to decreasing the brightness level toward a minimum brightness level (e.g., display-off state). Further, in some examples, the device 500 turns off or otherwise enters the inactive state 1140 automatically after a predetermined time interval passes where no further user input is received.

As further shown in FIG. 11Q, the partially-bright home screen 1128d and fully-bright home screen 1128c include similarly faded user interface elements, including a faded quiet mode icon 1126a, faded unread notifications icon 1152a, faded checkmark icon 11530a, faded temperature icon 1132a, and faded current time. As discussed above in regard to FIGS. 6A-6J, each user interface element can be faded at different rates, for example so that the time fades-in more quickly than the icons or indicators, or the time lingers and fades-out more slowly than other icons or indicators. While FIG. 11Q demonstrates activating the display screen 504 when the device 500 is in quiet mode, it is noted that rotation of the rotatable input mechanism 506 can also activate the display screen 504 while the quiet mode is off, as described above in FIGS. 6A-6J.

Turning back to FIG. 11E, as described above, the quiet mode can be toggled on and off at any time by the user via the control panel 1100. When the quiet mode is active, the control panel 1100 is displayed with the quiet mode affordance 1110a and the silent mode affordance 1106a as highlighted to indicate that the quiet mode and the silent mode are active. In response to a user input on the quiet mode affordance 1110a, the device 500 exits the quiet mode (and thus also exits the silent mode), and removes the highlighting of the affordances 1110, 1106 to indicate that the modes are off or inactive. The control panel 1100 is removed from display to resume the home screen 1128 by a downward swipe 1136 on the control panel 1100.

FIGS. 12A-12C is a flow diagram illustrating for a method for quiet mode, in accordance with some embodiments as discussed above in regard to FIGS. 11A-11Q. Method 1200 is performed at a device (e.g., 100, 300, 500) with a display screen and hardware buttons, such as a rotatable input mechanism and/or a depressible button.

Some operations in method 1200 are, optionally, combined, the order of some operations are, optionally changed, and some operations are, optionally, omitted. Further, the operations described above in FIGS. 7 and 8 and below in FIGS. 12A-12C can be, optionally, combined and/or interchanged.

As shown in method 1200 at FIGS. 12A-12C, the device (1202) can optionally receive a user input (e.g., wrist gesture 1138 at FIG. 11G, wrist gesture 1138a at FIG. 11H, wrist gesture 1138b at FIG. 11I, wrist gesture 1138c at FIG. 11J, wrist gesture 1138d at FIG. 11K) at the electronic device, wherein the user input is registered by the accelerometer (e.g., accelerometer 168 at FIG. 1A). As shown in method 1200 at FIG. 12C, the device (1204) can optionally, in accordance with a determination that the user input is received while a quiet mode is active, maintain the display screen in an inactive state (e.g., inactive state 1140 at FIG. 11H). The device (1206) can optionally, in accordance with a determination that the user input is received while the quiet mode is inactive, activate, in response to the user input (e.g., wrist gesture 1138 at FIG. 11G), the display screen from the inactive state (e.g., activate display screen 504 to display home screen 1128 at FIG. 11G). The device (1208) can optionally receive an alert at the electronic device (e.g., FIGS. 11I-11K). The device (1210) can optionally, in accordance with a determination that the alert is received while the quiet mode is active (e.g., FIG. 11K), forego output of an audible notification corresponding to the alert. The device (1212) can optionally, in accordance with a determination that the alert is received while the quiet mode is inactive, output the audible notification (e.g., audible output 1114 at FIG. 11I, audible output 1114a at FIG. 11J).

As shown in method 1200 at FIG. 12A, the device (1214) can optionally, in accordance with a determination that the user input is received while the quiet mode is active and the user input is a physical input (e.g., tap input 1154 at FIG. 11L, tap input 1154a at FIG. 11M, tap input 1154b at FIG. 11N, depression 1156 at FIG. 11O, depression 1156a at FIG. 11P, rotation 1158 at FIG. 11Q) on a surface (e.g., display screen 504 at FIGS. 11L-11N, rotatable input mechanism 506 at FIGS. 11O and 11Q, depressible button 508 at FIG. 11P) of the electronic device, activate, in response to the user input, the display screen from the inactive state (e.g., FIGS. 11L-11Q).

At the device (1216), the physical input can optionally comprise a touch input on the display screen and activating the display screen can optionally comprise turning on the display screen (e.g., tap input 1154 at FIG. 11L, tap input 1154a at FIG. 11M, tap input 1154b at FIG. 11N).

The device (1218) can optionally include a hardware button and the physical input can optionally comprise a depression of the hardware button, further wherein activating the display screen comprises turning on the display screen (e.g., depression 1156 at FIG. 11O, depression 1156a at FIG. 11P).

The device (1220) can optionally include a rotatable input mechanism and the physical input can optionally comprise a rotation of the rotatable input mechanism (e.g., rotation 1158 of rotatable input mechanism 506 at FIG. 11Q).

The device (1222) can optionally activate the display screen by increasing a brightness level of the display screen toward a predetermined brightness level at a rate that varies in accordance with the rotational velocity of the rotation at the rotatable input mechanism (e.g., rotations 1158 and 1158a of rotatable input mechanism 506 at FIG. 11Q).

The device (1224) can optionally, in accordance with the determination that the user input is received while the quiet mode is active, maintain the quiet mode as active (e.g., FIGS. 11H, 11K, and 11L-11Q).

As shown in method 1200 continued at FIG. 12B, the device (1226) can optionally receive a user request (e.g., tap 1134 at FIG. 11E, tap 1134b at FIG. 11F) to activate the quiet mode from an inactive state, wherein activating the quiet mode further comprises activating a silent mode at the electronic device (e.g., activated silent mode affordance 1106a at FIGS. 11B and 11E).

At the device (1228), the user request can optionally comprise a touch input (e.g., tap 1134 at FIG. 11E, tap 1134b at FIG. 11F) on a quiet mode affordance (e.g., quiet mode affordance 1110 at FIGS. 11E and 11F) of a control panel (e.g., control panel 1100 at FIGS. 11E and 11F) displayed on the display screen.

The device (1230) can optionally, in response to the touch input on the quiet mode affordance, highlight display of the quiet mode affordance and a silent mode affordance (e.g., highlighted quiet mode affordance 1110a and silent mode affordance 1106a at FIGS. 11B and 11E) displayed on the control panel on the display screen.

The device (1232) can optionally receiving a second user request to deactivate the quiet mode, wherein the second user request comprises a second touch input on the highlighted quiet mode affordance (e.g., tap 1134a on highlighted quiet mode affordance 1110a at FIG. 11E); and in response to the second user request, deactivate the quiet mode and the silent mode from the active state to the inactive state and removing highlighting of the displayed quiet mode affordance and the silent mode affordance (e.g., unhighlighted quiet mode affordance 1110 and silent mode affordance 1106 at FIG. 11E).

The device (1234) can optionally, in response to the user request to activate the quiet mode, display an instruction screen (e.g., instruction screen 1118 at FIGS. 11E and 11F) having instructions (e.g., instructions 1124 at FIGS. 11E and 11F), a confirmation affordance (e.g., confirmation affordance 1120 at FIGS. 11E and 11F), and a cancellation affordance (e.g., cancellation affordance 1122 at FIGS. 11E and 11F); in accordance with a determination that the confirmation affordance is selected, remove display of the instruction screen and activating the quiet mode (e.g., FIG. 11E); and in accordance with a determination that the cancellation affordance is selected, remove display of the instruction screen and forego activation of the quiet mode (e.g., FIG. 11F).

As shown in method 1200 continued at FIG. 12C, the device (1236) can optionally activate the display screen by displaying a user interface having a quiet mode icon that indicates the quiet mode is active (e.g., quiet mode icon 1126 at FIGS. 11D, 11E, 11L-11Q).

At the device (1238), the user input and the alert can optionally not be received simultaneously by the electronic device (e.g., FIGS. 11H-11Q).

Note that details of the processes described above with respect to method 1200 (e.g., FIGS. 12A-12C) are also applicable in an analogous manner to the methods described above in FIGS. 7 and 8. For example, method 1200 optionally includes one or more of the characteristics of the various methods described above with reference to method 700 and method 800. For example, method 1200 can include that the device (704) can optionally receive a first input corresponding to a rotation of the rotatable input mechanism, and/or the method 1200 can include that the device (802) can optionally receive a first input corresponding to a rotation of the rotatable input mechanism, wherein the first input initiates a brightness configuration session. For brevity, these details are not repeated.

Figure 13:
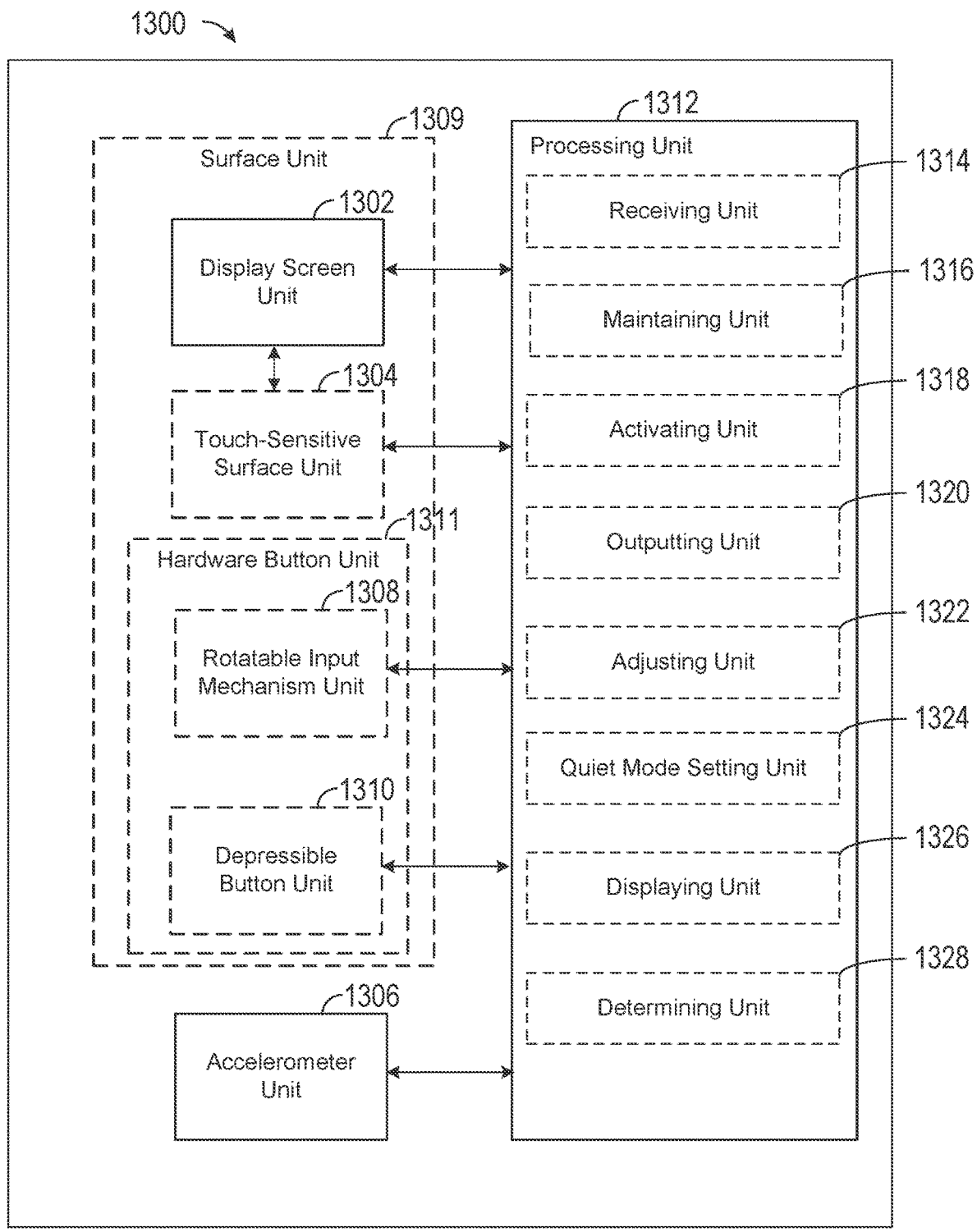
FIG. 13 is a functional block diagram of an example electronic device, in accordance with some embodiments.

In accordance with some embodiments, FIG. 13 shows an exemplary functional block diagram of an electronic device 1300 configured in accordance with the principles of the various described embodiments. In accordance with some embodiments, the functional blocks of electronic device 1300 are configured to perform the techniques described above. The functional blocks of the device 1300 are, optionally, implemented by hardware, software, or a combination of hardware and software to carry out the principles of the various described examples. It is understood by persons of skill in the art that the functional blocks described in FIG. 13 are, optionally, combined or separated into sub-blocks to implement the principles of the various described examples. Therefore, the description herein optionally supports any possible combination or separation or further definition of the functional blocks described herein.

As shown at FIG. 13, the device 1300 includes a display screen unit 1302 configured to display a graphic user interface, optionally, a touch-sensitive surface unit 1304 configured to receive touch contacts, an accelerometer unit 1306 configured to detect movement of the device 1300, and a processing unit 1312 coupled to the display screen unit 1302, the accelerometer unit 1306, and, optionally, the touch-sensitive surface unit 1304, a rotatable input mechanism unit 1308, and/or depressible button unit 1310. The processing unit 1312 can further be coupled to surface unit 1309 which can include display screen unit 1302, touch sensitive surface unit 1304, hardware button unit 1311, rotatable input mechanism unit 1308, and/or depressible button unit 1310. The processing unit 1312 can further be coupled to the hardware button unit 1311, which can include rotatable input mechanism unit 1308 and/or depressible button unit 1310. In some embodiments, the processing unit 1312 includes a receiving unit 1314, maintaining unit 1316, activating unit 1318, outputting unit 1320, adjusting unit 1322, quiet mode setting unit 1324, displaying unit 1326, and determining unit 1328.

The processing unit 1312 is configured to: receive (e.g., with receiving unit 1314) a user input at the electronic device, wherein the user input is registered by the accelerometer unit 1306; maintain (e.g., with maintaining unit 1316), in accordance with a determination that the user input is received while a quiet mode is active, the display screen unit 1302 in an inactive state; activate (e.g., with activating unit 1318), in accordance with a determination that the user input is received while the quiet mode is inactive, in response to the user input, the display screen unit 1302 from the inactive state; receive (e.g., with receiving unit 1314) an alert at the electronic device 1300; foregoing output (e.g., with outputting unit 1320), in accordance with a determination that the alert is received while the quiet mode is active, of an audible notification corresponding to the alert; and outputting (e.g., with outputting unit 1320), in accordance with a determination that the alert is received while the quiet mode is inactive, the audible notification.

In some embodiments, processing unit 1312 is further configured to, in accordance with a determination that the user input is received while the quiet mode is active and the user input is a physical input on a surface unit 1309 of the electronic device 1300, activating (e.g., with activating unit 1318), in response to the user input, the display screen unit 1302 from the inactive state.

In some embodiments, the physical input comprises a touch input on the display screen unit 1302 and activating (e.g., with activating unit 1318) the display screen unit 1302 comprises turning on the display screen unit 1302.

In some embodiments, the electronic device 1300 includes a hardware button unit 1311 and the physical input comprises a depression of the hardware button unit 1311, further wherein activating (e.g., with activating unit 1318) the display screen unit 1302 comprises turning on the display screen unit 1302.

In some embodiments, the electronic device 1300 includes a rotatable input mechanism unit 1308 and the physical input comprises a rotation of the rotatable input mechanism unit 1308.

In some embodiments, the processing unit 1312 is further configured to activate (e.g., with activating unit 1318) the display screen unit by increasing (e.g., with adjusting unit 1322) a brightness level of the display screen unit toward a predetermined brightness level at a rate that varies in accordance with the rotational velocity of the rotation at the rotatable input mechanism unit 1308.

In some embodiments, the processing unit 1312 is further configured to maintain (e.g., with maintaining unit 1316), in accordance with the determination that the user input is received while the quiet mode is active, the quiet mode as active.

In some embodiments, the user input and the alert are not received (e.g., with receiving unit 1314) simultaneously by the electronic device 1300.

In some embodiments, the processing unit 1312 is further configured to a quiet mode setting unit configured to receive (e.g., with receiving unit 1314) a user request to activate the quiet mode from an inactive state, wherein activating (e.g., with quiet mode setting unit 1324) the quiet mode further comprises activating a silent mode at the electronic device 1300.

In some embodiments, the user request comprises a touch input on a quiet mode affordance of a control panel displayed (e.g., with displaying unit 1326) on the display screen unit.

In some embodiments, the processing unit 1312 is further configured to, in response to the touch input on the quiet mode affordance, highlight display (e.g., with displaying unit 1326) of the quiet mode affordance and a silent mode affordance displayed (e.g., with displaying unit 1326) on the control panel on the display screen unit 1302.

In some embodiments, the processing unit 1312 is further configured to receive (e.g., with receiving unit 1314) a second user request to deactivate the quiet mode, wherein the second user request comprises a second touch input on the highlighted quiet mode affordance; and in response to the second user request, deactivate (e.g., with quiet mode setting unit 1324) the quiet mode and the silent mode from the active state to the inactive state and removing highlighting (e.g., with displaying unit 1326) of the displayed quiet mode affordance and the silent mode affordance.

In some embodiments, the processing unit 1312 is further configured to, in response to the user request to activate the quiet mode, display (e.g., with displaying unit 1326) an instruction screen having instructions, a confirmation affordance, and a cancellation affordance; in accordance with a determination that the confirmation affordance is selected, remove display of (e.g., with displaying unit 1326) the instruction screen and activating (e.g., with quiet mode setting unit 1324) the quiet mode; and in accordance with a determination that the cancellation affordance is selected, remove display of (e.g., with displaying unit 1326) the instruction screen and foregoing activation of (e.g., with quiet mode setting unit 1324) the quiet mode.

In some embodiments, activating (e.g., with activating unit 1318) the display screen unit 1302 comprises displaying (e.g., with displaying unit 1326) a user interface having a quiet mode icon that indicates the quiet mode is active.

In some embodiments, the processing unit 1312 is further configured to determine (e.g., with determining unit 1328) any of the following: that the user input is received while the quiet mode is active, that the user input is received while the quiet mode is inactive, that the alert is received while the quiet mode is active, that the alert is received while the quiet mode is inactive, that the user input is received while the quiet mode is active and the user input is a physical input on the surface unit 1309 of the electronic device 1300, that the user input is received while the quiet mode is active, that the confirmation affordance is selected, and/or that the cancellation affordance is selected.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. An electronic device, comprising:
a display screen;
a rotatable input mechanism;
one or more processors; and
a memory storing one or more programs configured to be executed by the one or more processors, the one or more programs including instructions, which when executed by the one or more processors, cause the one or more processors to:
receive a first input corresponding to a first rotation of the rotatable input mechanism;
in response to receiving the first input:
in accordance with a determination that a set of brightness adjustment criteria is met, wherein the set of brightness adjustment criteria includes a criterion that is met when a brightness level of the display screen is below a maximum brightness level of the display screen, increase the brightness level of the display screen to a second brightness level below the maximum brightness level; and
in accordance with a determination that the set of brightness adjustment criteria is not met, forgo increasing the brightness level of the display screen;
after increasing the brightness level of the display screen to the second brightness level, receive a second input other than a rotation of the rotatable input mechanism;
while the display screen is at the second brightness level, in response to receiving the second input, perform a function corresponding to the second input while maintaining the brightness level of the display screen at the second brightness level;
after performing the function corresponding to the second input while the brightness level of the display screen is maintained at the second brightness level, receive a third input corresponding to a second rotation of the rotatable input mechanism separate from the first rotation of the rotatable input mechanism; and
in response to receiving the third input, maintain the brightness level of the display screen at the second brightness level.

2. The electronic device of claim 1, wherein:
the set of brightness adjustment criteria includes a criterion that is met when the display screen is initially off.

3. The electronic device of claim 1, wherein:
the set of brightness adjustment criteria includes a criterion that is met when a brightness adjustment mode is on.

4. The electronic device of claim 1, the one or more programs further including instructions, which when executed by the one or more processors, cause the one or more processors to:
in accordance with the determination that the first input does not meet the set of brightness adjustment criteria, perform a function different from adjusting the brightness level.

5. The electronic device of claim 1, the one or more programs further including instructions, which when executed by the one or more processors, cause the one or more processors to:
in accordance with the determination that the first input meets the set of brightness adjustment criteria, enter a brightness configuration session.

6. The electronic device of claim 5, the one or more programs further including instructions, which when executed by the one or more processors, cause the one or more processors to:
in accordance with the determination that the first input meets the set of brightness adjustment criteria:
define a first direction based on the first input as a request to increase the brightness level of the display screen during the brightness configuration session, and
define a second direction opposite to the first direction as a request to decrease the brightness level during the brightness configuration session.

7. The electronic device of claim 6, the one or more programs further including instructions, which when executed by the one or more processors, cause the one or more processors to:
upon lapse of a threshold period of time after receiving the first input, exit the brightness configuration session;
after exiting the brightness configuration session, receive a third input corresponding to rotation of the rotatable input mechanism in the first direction; and
in accordance with a determination that the third input meets the set of brightness adjustment criteria, increase the brightness level and enter a new brightness configuration session.

8. The electronic device of claim 7, the one or more programs further including instructions, which when executed by the one or more processors, cause the one or more processors to:
while in the new brightness configuration session, receive a fourth input corresponding to a rotation in the second direction opposite to the first direction; and in response to receiving the fourth input, decrease the brightness level while maintaining the new brightness configuration session.

9. The electronic device of claim 1, wherein:
increasing the brightness level of the display screen comprises changing the brightness level at a variable rate based on a rotational velocity of the first input.

10. The electronic device of claim 1, the one or more programs further including instructions, which when executed by the one or more processors, cause the one or more processors to:
adjust the brightness level by alpha blending a user interface displayed on the display screen with a masking layer, wherein the masking layer alternately:
increases in transparency to increase the brightness level towards a maximum brightness level; and
decreases in transparency to decrease the brightness level towards a minimum brightness level.

11. The electronic device of claim 10, the one or more programs further including instructions, which when executed by the one or more processors, cause the one or more processors to:
in accordance with a determination that a maximum brightness level is met, cease the alpha blending and remove the masking layer.

12. The electronic device of claim 1, the one or more programs further including instructions, which when executed by the one or more processors, cause the one or more processors to:
receive a fifth input corresponding to rotation of the rotatable input mechanism;
determine that a rotational velocity of the fifth input exceeds a threshold rotational velocity per unit time; and
in accordance with the determination, automatically adjust the brightness level toward a third predetermined brightness level.

13. The electronic device of claim 1, the one or more programs further including instructions, which when executed by the one or more processors, cause the one or more processors to:
detect a touch gesture on the display screen, while the display screen is at a brightness level lower than a third predetermined brightness level, within a period of time after receiving the first input; and
in response to detecting the touch gesture, automatically adjust the brightness level toward the third predetermined brightness level.

14. The electronic device of claim 1, the one or more programs further including instructions, which when executed by the one or more processors, cause the one or more processors to:
automatically completing adjusting the brightness level to meet a maximum or a minimum brightness level upon reaching a threshold brightness level.

15. The electronic device of claim 1, the one or more programs further including instructions, which when executed by the one or more processors, cause the one or more processors to:
display a user interface on the display screen comprising at least a first displayed element and a second displayed element, wherein a brightness level of the first displayed element is adjusted at a different rate than a brightness level of the second displayed element, further wherein the brightness levels of the first displayed element and the second displayed element are adjusted simultaneously.

16. A non-transitory computer readable storage medium storing one or more programs configured to be executed by one or more processors of an electronic device with a display screen and a rotatable input mechanism, wherein the one or more programs, when executed by the one or more processors, cause the one or more processors to:
receive a first input corresponding to a first rotation of the rotatable input mechanism;
in response to receiving the first input:
in accordance with a determination that a set of brightness adjustment criteria is met, wherein the set of brightness adjustment criteria includes a criterion that is met when a brightness level of the display screen is below a maximum brightness level of the display screen, increase the brightness level of the display screen to a second brightness level below the maximum brightness level; and
in accordance with a determination that the set of brightness adjustment criteria is not met, forgo increasing the brightness level of the display screen;
after increasing the brightness level of the display screen to the second brightness level, receive a second input other than a rotation of the rotatable input mechanism;
while the display screen is at the second brightness level, in response to receiving the second input, perform a function corresponding to the second input while maintaining the brightness level of the display screen at the second brightness level;
after performing the function corresponding to the second input while the brightness level of the display screen is maintained at the second brightness level, receive a third input corresponding to a second rotation of the rotatable input mechanism separate from the first rotation of the rotatable input mechanism; and
in response to receiving the third input, maintain the brightness level of the display screen at the second brightness level.

17. The non-transitory computer readable storage medium of claim 16, wherein:
the set of brightness adjustment criteria includes a criterion that is met when the display screen is initially off.

18. The non-transitory computer readable storage medium of claim 16, wherein:
the set of brightness adjustment criteria includes a criterion that is met when a brightness adjustment mode is on.

19. The non-transitory computer readable storage medium of claim 16, wherein the one or more programs, when executed by the one or more processors, further cause the one or more processors to:
in accordance with the determination that the first input does not meet the set of brightness adjustment criteria, perform a function different from adjusting the brightness level.

20. The non-transitory computer readable storage medium of claim 16, wherein the one or more programs, when executed by the one or more processors, further cause the one or more processors to:
in accordance with the determination that the first input meets the set of brightness adjustment criteria, enter a brightness configuration session.

21. The non-transitory computer readable storage medium of claim 20, wherein the one or more programs, when executed by the one or more processors, further cause the one or more processors:

in accordance with the determination that the first input meets the set of brightness adjustment criteria:
define a first direction based on the first input as a request to increase the brightness level of the display screen during the brightness configuration session; and
define a second direction opposite to the first direction as a request to decrease the brightness level during the brightness configuration session.

22. The non-transitory computer readable storage medium of claim 21, wherein the one or more programs, when executed by the one or more processors, further cause the one or more processors to:
upon lapse of a threshold period of time after receiving the first input, exit the brightness configuration session;
after exiting the brightness configuration session, receive a third input corresponding to rotation of the rotatable input mechanism in the first direction; and
in accordance with a determination that the third input meets the set of brightness adjustment criteria, increase the brightness level and enter a new brightness configuration session.

23. The non-transitory computer readable storage medium of claim 22, wherein the one or more programs, when executed by the one or more processors, further cause the one or more processors to:
while in the new brightness configuration session, receive a fourth input corresponding to a rotation in the second direction opposite to the first direction; and
in response to receiving the fourth input, decrease the brightness level while maintaining the new brightness configuration session.

24. The non-transitory computer readable storage medium of claim 16, wherein:
increasing the brightness level of the display screen comprises changing the brightness level at a variable rate based on a rotational velocity of the first input.

25. The non-transitory computer readable storage medium of claim 16, wherein the one or more programs, when executed by the one or more processors, further cause the one or more processors to:
adjust the brightness level by alpha blending a user interface displayed on the display screen with a masking layer, wherein the masking layer alternately:
increases in transparency to increase the brightness level towards a maximum brightness level; and
decreases in transparency to decrease the brightness level towards a minimum brightness level.

26. The non-transitory computer readable storage medium of claim 25, wherein the one or more programs, when executed by the one or more processors, further cause the one or more processors to:
in accordance with a determination that a maximum brightness level is met, cease the alpha blending and remove the masking layer.

27. The non-transitory computer readable storage medium of claim 16, wherein the one or more programs, when executed by the one or more processors, further cause the one or more processors to:
receive a fifth input corresponding to rotation of the rotatable input mechanism;
determine that a rotational velocity of the fifth input exceeds a threshold rotational velocity per unit time; and
in accordance with the determination, automatically adjust the brightness level toward a third predetermined brightness level.

28. The non-transitory computer readable storage medium of claim 16, wherein the one or more programs, when executed by the one or more processors, further cause the one or more processors to:
detect a touch gesture on the display screen, while the display screen is at a brightness level lower than a third predetermined brightness level, within a period of time after receiving the first input; and
in response to detecting the touch gesture, automatically adjust the brightness level toward the third predetermined brightness level.

29. The non-transitory computer readable storage medium of claim 16, wherein the one or more programs, when executed by the one or more processors, further cause the one or more processors to:
automatically completing adjusting the brightness level to meet a maximum or a minimum brightness level upon reaching a threshold brightness level.

30. The non-transitory computer readable storage medium of claim 16, wherein the one or more programs, when executed by the one or more processors, further cause the one or more processors to:
display a user interface on the display screen comprising at least a first displayed element and a second displayed element, wherein a brightness level of the first displayed element is adjusted at a different rate than a brightness level of the second displayed element, further wherein the brightness levels of the first displayed element and the second displayed element are adjusted simultaneously.

31. A method, performed by one or more processors of an electronic device with a rotatable input mechanism and a display screen, the method comprising:
at the electronic device with the rotatable input mechanism and the display screen:
receiving a first input corresponding to a first rotation of the rotatable input mechanism;
in response to receiving the first input:
in accordance with a determination that a set of brightness adjustment criteria is met, wherein the set of brightness adjustment criteria includes a criterion that is met when a brightness level of the display screen is below a maximum brightness level of the display screen, increasing the brightness level of the display screen to a second brightness level below the maximum brightness level; and
in accordance with a determination that the set of brightness adjustment criteria is not met, forgo increasing the brightness level of the display screen;
after increasing the brightness level of the display screen to the second brightness level, receiving a second input other than a rotation of the rotatable input mechanism;
while the display screen is at the second brightness level, in response to receiving the second input, performing a function corresponding to the second input while maintaining the brightness level of the display screen at the second brightness level;
after performing the function corresponding to the second input while the brightness level of the display screen is maintained at the second brightness level, receiving a third input corresponding to a second rotation of the rotatable input mechanism separate from the first rotation of the rotatable input mechanism; and in response to receiving the third input, maintaining the brightness level of the display screen at the second brightness level.

32. The method of claim 31, wherein:
the set of brightness adjustment criteria includes a criterion that is met when the display screen is initially off.

33. The method of claim 31, wherein:
the set of brightness adjustment criteria includes a criterion that is met when a brightness adjustment mode is on.

34. The method of claim 31, further comprising:
in accordance with the determination that the first input does not meet the set of brightness adjustment criteria, performing a function different from adjusting the brightness level.

35. The method of claim 31, further comprising:
in accordance with the determination that the first input meets the set of brightness adjustment criteria, entering a brightness configuration session.

36. The method of claim 35, further comprising:
in accordance with the determination that the first input meets the set of brightness adjustment criteria:
defining a first direction based on the first input as a request to increase the brightness level of the display screen during the brightness configuration session, and
defining a second direction opposite to the first direction as a request to decrease the brightness level during the brightness configuration session.

37. The method of claim 36, further comprising:
upon lapse of a threshold period of time after receiving the first input, exiting the brightness configuration session;
after exiting the brightness configuration session, receiving a third input corresponding to rotation of the rotatable input mechanism in the first direction; and
in accordance with a determination that the third input meets the set of brightness adjustment criteria, increasing the brightness level and entering a new brightness configuration session.

38. The method of claim 37, further comprising:
while in the new brightness configuration session, receiving a fourth input corresponding to a rotation in the second direction opposite to the first direction; and
in response to receiving the fourth input, decreasing the brightness level while maintaining the new brightness configuration session.

39. The method of claim 31, wherein:
increasing the brightness level of the display screen comprises changing the brightness level at a variable rate based on a rotational velocity of the first input.

40. The method of claim 31, further comprising:
adjusting the brightness level by alpha blending a user interface displayed on the display screen with a masking layer, wherein the masking layer alternately:
increases in transparency to increase the brightness level towards a maximum brightness level; and
decreases in transparency to decrease the brightness level towards a minimum brightness level.

41. The method of claim 40, further comprising:
in accordance with a determination that a maximum brightness level is met, ceasing the alpha blending and removing the masking layer.

42. The method of claim 31, further comprising:
receiving a fifth input corresponding to rotation of the rotatable input mechanism;
determining that a rotational velocity of the fifth input exceeds a threshold rotational velocity per unit time; and
in accordance with the determination, automatically adjusting the brightness level toward a third predetermined brightness level.

43. The method of claim 31, further comprising:
detecting a touch gesture on the display screen, while the display screen is at a brightness level lower than a third predetermined brightness level, within a period of time after receiving the first input; and
in response to detecting the touch gesture, automatically adjusting the brightness level toward the third predetermined brightness level.

44. The method of claim 31, further comprising:
automatically completing adjusting the brightness level to meet a maximum or a minimum brightness level upon reaching a threshold brightness level.

45. The method of claim 31, further comprising:
displaying a user interface on the display screen comprising at least a first displayed element and a second displayed element, wherein a brightness level of the first displayed element is adjusted at a different rate than a brightness level of the second displayed element, further wherein the brightness levels of the first displayed element and the second displayed element are adjusted simultaneously.

* * * * *

UNITED STATES PATENT AND TRADEMARK OFFICE
CERTIFICATE OF CORRECTION

| | | |
|---|---|---|
| PATENT NO. | : 12,050,771 B2 | Page 1 of 1 |
| APPLICATION NO. | : 17/697749 | |
| DATED | : July 30, 2024 | |
| INVENTOR(S) | : Kevin Tyler McAtee et al. | |

It is certified that error appears in the above-identified patent and that said Letters Patent is hereby corrected as shown below:

In the Claims
Column 66, Line 16, Claim 29, delete "completing" and insert --complete--.

Signed and Sealed this
Twenty-fifth Day of February, 2025

Coke Morgan Stewart
*Acting Director of the United States Patent and Trademark Office*